United States Patent [19]
Pollock

[11] Patent Number: 5,706,406
[45] Date of Patent: Jan. 6, 1998

[54] ARCHITECTURE FOR AN ARTIFICIAL AGENT THAT REASONS DEFEASIBLY

[76] Inventor: John L. Pollock, 3518 N. Fox, Tucson, Ariz. 85716

[21] Appl. No.: 445,995

[22] Filed: May 22, 1995

[51] Int. Cl.$^6$ ................................................ G06F 15/18
[52] U.S. Cl. ................................................ 395/55; 395/51
[58] Field of Search ................................. 395/51, 55

[56] References Cited

PUBLICATIONS

J.L. Pollock, "How to reason defeasibly," Artificial Intelligence 57, pp. 1–42, Sep. 1992.
P. Besnard and E. Gregoire, "DRUMS: Defeasible Reasoning and Uncertainty Management Systems," AI Communications, vol. 6(1), pp. 24–46, Mar. 1993.
J.L. Pollock, "OSCAR—A General–Purpose Defeasible Reasoner," Automated Deduction in Nonstandard Logics—1993 AAAI Fall Symposium, pp. 134–141, Oct. 1993.
M.R. Cravo and J.P. Martins, "A Practical System for Defeasible Reasoning and Belief Revision," ECSQARU '93, Symbolic and Quantitative Approaches to Reasoning and Uncertainty, pp. 65–72, Nov. 1993.
R.L. Causey, "EVID: A System of interactive defeasible reasoning," Decision Support Systems, vol. 11(2), pp. 103–131, Feb. 1994.
P. Geerts and D. Vermeir, "Ordered logic: defeasible reasoning for multiple agents," Decision Support Systems, vol. 11(2), pp. 157–190, Feb. 1994.
J.L. Pollock, "Justification and defeat," Artificial Intelligence 67, pp. 377–407, Jun. 1994.
H. Shu, "A Logical Framework for Defeasible Reasoning," Proc. 3rd Pacific Rim Int'l. Conf. on Artificial Intelligence, pp. 226–232, Aug. 1994.
L.M. Pereira, et al., "Logic Programming for Non–Monotonic Reasoning," Lecture Notes in Artificial Intelligence—Knowledge Representation and Reasoning under Uncertainty, pp. 107–121, Dec. 1994.

*Primary Examiner*—Robert W. Downs
*Attorney, Agent, or Firm*—James E. Brunton

[57] ABSTRACT

A method for defeasible reasoning including a method for analyzing data input, reasoning to conclusions on the basis of that data and adopting and executing plans on the basis of those conclusions. The processes are defeasible in the sense that, as reasoning proceeds or new data is input to the system, both conclusions and plans may be retracted and replaced by new conclusions and plans that are better supported by the new data and reasoning. The methods of the invention are useful as controlling mechanisms for a variety of applications, including robotics, operational assembly lines, and as on-line "assistants" for computer work. The methods can also be used as an advisor in many applications, including medical diagnosis, fault diagnosis in manufacturing and transportation scheduling. Additionally, submethods that draw conclusions on the basis of defeasible reasoning can be used as an inference-engine for automated data analysis.

29 Claims, 16 Drawing Sheets

Microfiche Appendix Included
(4 Microfiche, 214 Pages)

ARCHITECTURE FOR AN ARTIFICIAL AGENT THAT REASONS DEFEASIBLY

BACKGROUND OF THE INVENTION

FIELD OF THE INVENTION

The present invention relates generally to the field of information processing and automated decision making. More particularly, the invention concerns a defeasible reasoning method for analyzing data input, reasoning to conclusions on the basis of that data and adopting and executing plans on the basis of the conclusions reached.

DISCUSSION OF THE INVENTION

Deductive reasoning is well understood, and a number of automated deductive reasoners have been constructed in the past. However, the kind of reasoning that is involved in real-world planning is not usually deductive. The data supports conclusions only provisionally, and when new data is input to the system or the system draws new conclusions on the basis of the data it already has, other conclusions may become unreasonable and have to be retracted. If plans were constructed by using the retracted conclusions, then the plans must also be retracted. Such reasoning and planning is said to be "defeasible", and the withdrawn conclusion are said to be "defeated". See for example, *Readings in Nonmonotonic Reasoning*, by M. Ginsberg, Morgan Kaufmann (1987). The process of determining whether a conclusion is defeated is herein called "the defeat-status computation".

In constructing a system that performs automated defeasible reasoning (a defeasible Inference-engine), three issues must be addressed. First, it must be determined how the reasoning to tentative conclusions should proceed. Second, it must be determined by what criterion tentative conclusions should be evaluated in order to determine their defeat-status. Third, it must be determined how the process of computing defeat-statuses is actually to be carried out.

When integrating the system of defeasible reasoning into an artificial agent that is also capable of planning and executing plans, a fourth issue must be addressed. This concerns how the adoption of plans (as opposed to the construction of plans) is to proceed, and how plan execution is to be directed, based upon the conclusions the inference-engine has produced.

A system for reasoning to tentative conclusion based upon the "natural deduction" deductive reasoner is described in the *Journal of Automated Reasoning* 6, pp. 419–462 (1990). A related system is described in *Psychological Review* 90 pp. 38–71 (1983). The present invention, while similar in some respects to the deductive reasoners described in the aforementioned article, is considerably more efficient and reasons not only deductively, but also with defeasible inference schemes.

For computing defeat status, it must be recognized that tentative conclusions can be defeated in either of two ways. First, a conclusion can be defeated by another conclusion that simply denies the first conclusion. This is called "rebutting defeat". (See, for example, *Contemporary Theories of Knowledge*. Totowa, N. J.: Rowman and Littlefield, 1986 and the related discussion of "normal defaults" in *Artificial Intelligence* pp. 81–132 (1980) R. Reiter.) Second, a conclusion can be defeated by another conclusion that attacks the connection between the first conclusion and the basis upon which it is drawn. This is called "undercutting defeat".

There are many proposals that have been made regarding the criterion to use in determining when tentative conclusion are defeated, and the literature addressed at finding a satisfactory criterion is immense. A critical discussion of earlier proposals is contained in *Artificial Intelligence* 67, pp. 377–408 (1994).

The overall structure of the defeasible inference-engine of the present invention is somewhat reminiscent of truth maintenance systems, however, the present invention differs from existing truth maintenance systems in many ways, including (1) truth maintenance systems have usually recognized only rebutting defeat (not undercutting defeat), and (2) they have included only very rudimentary automated reasoners, whereas the present invention includes a very sophisticated and powerful automated reasoner. (See, for example, *Artificial Intelligence* 12, pp. 231–272 (1979), Jon Doyle.

SUMMARY OF THE INVENTION

By way of introductory summary, the present invention concerns a programmable architecture or system for a rational agent, based upon a general-purpose defeasible reasoner that can also be employed as a stand-alone reasoner for processing problems presented directly to the rational agent. In this regard, a rational agent can be considered as having four basic constituents:

One or more mechanisms for proposing goals.

A mechanism for evaluating the "goodness" of plans.

A mechanism for searching for and adopting plans on the basis of their comparative evaluations by the plan evaluator.

A mechanism for initiating action on the basis of adopted plans (together, possibly, with built-in or learned plan-schemas).

The aforementioned mechanisms constitute a system of "practical cognition". Plan evaluation and adoption is based in part on what beliefs the agent has about its situation. Accordingly, an important part of a rational agent is a system of "epistemic cognition" producing such beliefs. A novel aspect of the present invention is that the bulk of the work involved in finding, evaluating, and choosing plans and directing action is done by epistemic cognition rather than by dedicated special-purpose modules devoted to practical cognition.

One form of the method of the present invention begins with a situation-evaluator, which produces a (real-measurable) degree of liking for the agent's current situation. This is presumed to be sensitive to the agent's beliefs about its situation. The likability of a situation is the degree the agent would like it (as determined by the situation-evaluator) if it had true beliefs about all relevant aspects of the situation. The objective of the agent's reasoning is to put itself in situations that are more likable than the situations in which it would find itself if it did not take action.

Ideally, plans are evaluated in terms of the expected likability of their being adopted. This involves both reasoning about likabilities and reasoning about probabilities. Such reasoning is computationally difficult, so the architecture of the invention also allows the use of shortcut procedures for producing approximate evaluations of plans. Such shortcut procedures are called Q&I modules ("quick and inflexible"). When the output of Q&I modules conflicts with the output of explicit reasoning, the agent overrides the Q&I modules and adopts the conclusion of the reasoning.

In the method of the present invention goals are also judged suitable or unsuitable on the basis of their expected likability. The function of goals is to direct the course of planning. The use of goals constitutes a control structure for planning. Without goals, the agent would have to survey plans at random. The chances of finding good plans in that way are minuscule. With the help of goals, planning is constrained, and because suitable goals have high expected likability, there is a (defeasible) presumption that plans having a high likelihood of achieving suitable goals will also have high expected likabilities. This provides a defeasible basis for adopting plans without going through the onerous process of computing their expected likabilities.

Shortcut procedures for the choice of goals are indispensable in any realistic agent, because the agent must be able to function in its environment before it acquires the general knowledge that is required for evaluating the suitability of goals. In the present invention these take the form of specific Q&I modules called optative dispositions, which are dispositions to adopt goals. Some optative dispositions may be built-in from the beginning, and others can be acquired by conditioning mechanisms. The output of an optative disposition is called a "desire". Desiring something is taken as a defeasible ground for choosing it as a goal, but a belief to the effect that the object of desire does not have satisfactorily high expected likability will override the desire.

Traditional prior art planning systems employ "planning algorithms" to literally "compute" plans. But this becomes problematic in a realistic rational agent. This is in part because planning must be based upon the agent's beliefs about its situation and about general features of the world, but such beliefs are defeasible. A rational agent must be prepared to withdraw beliefs that come in conflict with new beliefs acquired either through perception or simply by further reasoning from other beliefs. At the core of the present invention is a sophisticated defeasible epistemic reasoner. But the fact that epistemic reasoning is defeasible creates a problem for planning. If a rational agent retracts beliefs upon which planning was based, it must be prepared to modify its plans as well.

In fact, planning must be defeasible for two different reasons. First, factual beliefs about the world may change, and this can affect the evaluation of plans. A second source of defeasibility results from the fact that the rationality of adopting a plan depends in part on what alternative plans are available. Plan adoption cannot await the production of all possible alternative plans, because there are infinitely many of them. Plan adoption must instead proceed on the basis of what plans have been discovered so far, and when new plans are found that are better than previously adopted plans, the rational agent must be prepared to change its mind and adopt the new plans in place of the old plans.

In principle, the defeasibility of planning could be accommodated by constructing a "defeasible practical reasoner", dedicated to reasoning defeasibly about plans and actions. However, the architecture of the present invention is based upon the observation that a simpler alternative is available, namely the existence of a defeasible epistemic reasoner, that can be made to serve double duty as a defeasible practical reasoner through a technical trick called "doxastification". Corresponding to the adoption of a plan is the "epistemic judgment" (i.e., belief that it should be an adopted plan. This judgment is epistemic in name only. It requires no "objective fact" to anchor it or give it truth conditions. It is merely a computational device whose sole purpose is to allow the use of defeasible epistemic reasoning to accomplish defeasible practical reasoning. By way of abbreviation "o should be an adopted plan" as "o is adoptable". In the methods of the present invention, planning proceeds by epistemic reasoning about plan adoptability and action is directed on the basis of beliefs about plan adoptability. The belief that a plan is adoptable, together with the belief that the preconditions for one of its plan steps are satisfied, constitutes a reason for believing that the action prescribed by the plan step is "executable". This again involves doxastification. Acts judged executable are sent to a module called the ACTION INITIATOR, which initiates their execution.

In summary, in carrying out the methods of the present invention, the bulk of the computational work involved in practical cognition is relegated to epistemic cognition. Accordingly, the present invention comprises a sophisticated system of epistemic cognition, based upon a general-purpose defeasible reasoner. Practical cognition functions by passing queries to epistemic cognition. These queries comprise the list of ultimate-epistemic-interests. The introduction of a query initiates epistemic cognition aimed at answering it, and queries are stored along with instructions for what to do with an answer. Suitable goals are encoded as a permanent member of ultimate-epistemic-interests. When a goal is found, the corresponding instruction is to insert a new query into ultimate-epistemic-interests regarding the discovery of adoptable plans aimed at achieving the goal. When such a plan is found, a query is inserted regarding the satisfaction of the preconditions of its plan steps. When that query is answered affirmatively, the corresponding instruction is to pass the prescribed action to the ACTION-INITIATOR. Thus most of the work of practical cognition is performed by passing queries to ultimate-epistemic-interests with appropriate instructions for what to do with answers to the queries. In many cases, those instructions take the form of inserting new queries into ultimate-epistemic-interests.

DESCRIPTION OF THE INVENTION

The system of the present invention is adapted to receive two kinds of input, namely percepts provided by perception, and desires produced by optative dispositions. Epistemic cognition produces beliefs about adoptable plans, and these beliefs are used to initiate action. Both inputs and the results of inference are stored as nodes in the inference-graph. They are also placed in the inference queue, which is a queue of inferences waiting to be performed.

When used as a free-standing reasoner, the system of the invention can be given unsupported premises in the list premises. Premises are triples (formula supporting strengths), where "formula" is the precise formula, "supposition" is the supposition, and "strength" is the degree-of-justification posited for the sequent built out of the supposition and formula. If strength is 1, the premises is assumed to be a necessary truth, and is used as such in deductive reasoning. If strength is not 1, the premise can be defeated by finding a rebutting defeater, but no sense can be made of undercutting defeat for premises.

This general architecture of the invention can be encoded as follows:

Insert the members of permanent-ultimate-epistemic-interests into ultimate-epistemic-interests, and insert them into the inference-queue.

Insert the members of premises into the inference-queue, adopting interest in rebutting defeaters for those that are not necessary truths.

Initialize global-assignment-tree.

Do the following repeatedly and in parallel:
Run non-doxastic environmental input through the optative dispositions, insert the resulting desires into the inference-queue, and encode this input in nodes of the inference-graph. Update the desire-strengths of desires already on the inference-queue, and adjust their priorities in light of changes in desire-strength.

Insert new perceptual states into the inference-queue and encode this input in nodes of the inference-graph. Update the saliences of percepts already on the inference-queue and adjust their priorities in light of changes in salience.

THINK

INITIATE-ACTIONS

For use as a free-standing reasoner that is not embedded in an agent, the following, (hereinafter designated as "COGITATE") comprises a variant of the invention that does not deal with percepts, desires, or actions:

Insert the members of permanent-ultimate-epistemic-interests into ultimate-epistemic-interests, and insert them into the inference-queue.

Insert the members of premises into the inference-queue, adopting interest in rebutting defeaters for those that are not necessary truths.

Initialize global-assignment-tree.

Do the following repeatedly:
THINK-OR-DIE

THINK-OR-DIE as used in the aforementioned variant differs from THINK only in that when the inference-queue becomes empty, the reasoner stops.

Figure 1:
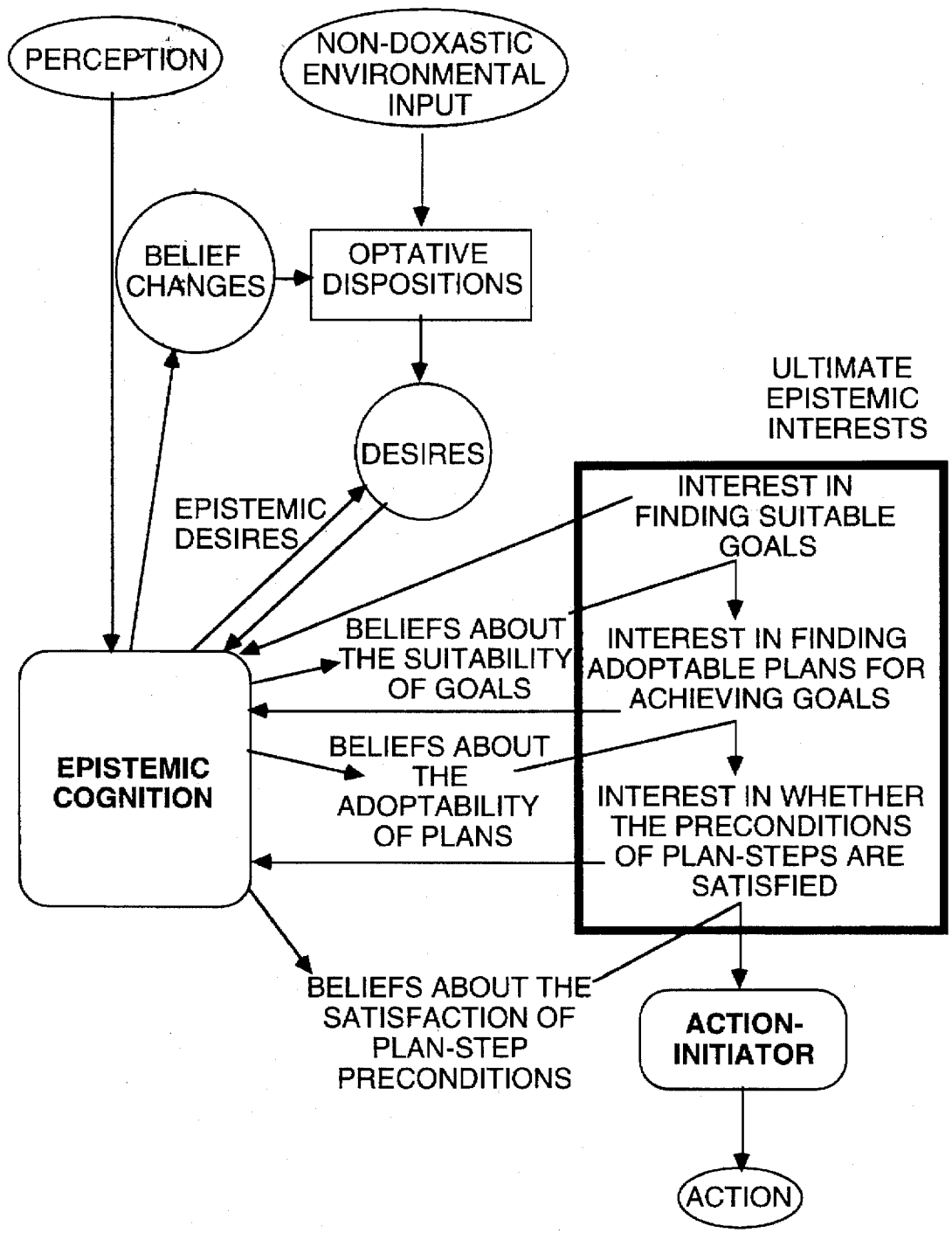
FIG. 1 is a generally diagrammatic view illustrating the flow of data in practical cognition.

Referring now to the drawings and particularly to FIG. 1, one form of the method of the invention is there illustrated and can be seen to comprise a system of epistemic cognition taking input from both perception and desire formation, and passing actions to an action-initiator. As indicated in FIG. 1, the architecture of the invention there depicted has two levels. The lowest level consists of the system of epistemic cognition, together with various hooks to practical cognition and action. The higher level consists of the system of practical cognition and, in a manner presently to be described, is implemented in the lower level via doxastification.

As to the defeasible reasoner, it is based upon seven fundamental ideas. These are (1) an argument-based account of defeasible reasoning, (2) an analysis of defeat-status given a set of interrelated arguments, (3) a process for computing defeat-status, (4) an interest-driven monotonic reasoner, (5) an account of undefeated-degrees-of-support, degrees of interest, and their interactions. Each of these fundamental ideas will be discussed further in the paragraphs which follow.

The basic conception of defeasible reasoning is that reasoning consists of the construction of arguments, where reasons are the atomic links in arguments. Defeasibility arises from the fact that some reasons are subject to defeat. These are "prima facie reasons" and the considerations that defeat them are "defeaters". A "rebutting defeater" is a reason for denying the conclusion of the reason. An "undercutting defeater" attacks the connection between the premises and the conclusion, and can be regarded as a reason for denying that the premises wouldn't be true unless the conclusion were true. In the discussion which follow, the following abbreviation will be used: The term "It is false that P wouldn't be true unless Q were true" will be abbreviated as "(P⊗Q)". Reasons that are not defeasible are "conclusive".

Figure 2:
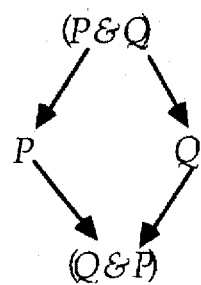
FIG. 2 is a generally diagrammatic view of a simple inference-graph.

A convenient way to encode arguments is as "inference-graphs". The nodes of an inference-graph represent premises and conclusions, and the links between the nodes represent dependency relations. A simple inference-graph is diagramed in FIG. 2. The "node-basis" of a node is the set of nodes from which it is inferred. One can combine all of the reasoning of the reasoner into a single global inference-graph, and that will be the central data-structure used by the reasoner. Defeat relations can be encoded by adding a separate category of "defeat links" to the inference-graph. It is important to emphasize that, for now, it is assumed that if the same conclusion is obtained by two different arguments, this is represented by two different nodes. In this way, one can take the nodes to have univocal defeat-statuses. In effect, each node encodes an argument for the conclusion represented at that node. A more efficient form of inferencegraph will be defined in the paragraphs which follow.

Given a set of arguments some of which may support defeaters for inferences contained in others, an account of which of these arguments are defeated and which are undefeated is required. Such an account may be as follows wherein we first define:

A node of the inference-graph is initial if and only if its node-basis and list of node-defeaters is empty.

σ is a partial status assignment if and only if σ is a function assigning "defeated" and "undefeated" to a subset of the nodes of an inference-graph in such a way that:
1. σ assigns "undefeated" to all initial nodes;
2. σ assigns "undefeated" to a node n if and only if σ assigns "undefeated" to all the members of the node-basis of n and σ assigns "defeated" to all node-defeaters of n; and
3. σ assigns "defeated" to a node n if and only if either some member of the node-basis of n is assigned "defeated", or some node-defeaters of n and is assigned "undefeated".

σ is a status assignment if and only if σ is a partial status assignment and σ is not properly contained in any other partial status assignment A node is undefeated if and only if every status assignment assigns "undefeated" to it; otherwise it is defeated.

In the attempt to build a defeasible reasoner, a natural first inclination is to suppose that when a conclusion is defeated, the reasoner should stop reasoning from it unless or until it is subsequently reinstated. It turns out, however, that such a proposal cannot work. Consider two long arguments, and suppose the final step of each defeats an early step of the other. It follows from the analysis of defeat-status that both arguments are defeated. They undergo "collective defeat". But a reasoner that stopped reasoning from a conclusion once it was defeated would never discover the collective defeat, because having completed one of the arguments, it would cease developing the other one. For this reason, an i.d.e.-adequate reasoner must continue reasoning from conclusions even when they are defeated. This suggests that such a reasoner should simply flag conclusions as defeated, and go on reasoning. Defeat-status may affect the priorities that are assigned to performing various inference steps, so that undefeated conclusions are given some precedence over defeated ones, but inferences from defeated conclusions must still go forth. Such a reasoner is identified herein as a "flagbased" reasoner. One can think of a flag-based reasoner as consisting of two largely autonomous modules—a "monotonic reasoner" that reasons and builds the inference-graph, without paying much attention (except in prioritizing inferences) to defeat-status, and a module that computes or recomputes defeatstatuses as new inferences are made. Such a reasoner has the form of a simple loop:

(loop
   (draw-a-conclusion)
   (recompute-defeat-statuses))

The monotonic reasoner of the present invention is based upon the previously mentioned deductive reasoner as described in *The Journal of Automated Reasoning*. This is an "interest-driven suppositional reasoner" for first-order logic. The reference to suppositional reasoning simply means that it can accommodate natural deduction rules like conditionalization, reasoning by cases, and reductio-adabsurdum. For this purpose, the nodes of the inference-graph are taken to encode sequents rather than formulas. A sequent is a pair <X,P>, where X is a set of formulas (the supposition of the sequent) and P is an individual formula. The sense in which the reasoner is interest-driven is that it reasons both backwards from the desired conclusions and forwards from the given premises. Reasoning backwards can be regarded as deriving interests from interests. This is related to backwards chaining and forwards chaining, but it is not quite the same thing. The difference lies in the fact that different rules of inference and different reason schemas are employed for backwards reasoning and for forwards reasoning. The motivation for this is that natural rules of inference are often very reasonable when applied in one direction but combinatorially explosive when applied in the other. For instance the rule of addition tells us to infer the disjunction $(P \lor Q)$ from the disjunct P. As a rule of backwards reasoning, this is eminently reasonable. It tells us that if one wants to establish a disjunction, one way to do that is to try to get the first disjunct. But as a rule of forwards reasoning it would be catastrophic. It would have the reasoner infer every disjunction involving any conclusion it obtains.

One can think of interest-driven reasoning as consisting of three operations: (1) we reason forwards from previously drawn conclusions to new conclusions; (2) we reason backwards from interests to interests; (3) when we have reasoned backwards to a set of sequents as interests, and forwards to the same set of sequents as conclusions, then we discharge interest and conclude the sequent that led to those interests. For example, suppose we are given the premises P and $(P \rightarrow Q)$ and are interested in the conclusion $(Q \lor R)$. From the latter, we could reason backwards to interest in Q and in R (using addition as our rule of inference). From the premises we could reason forwards to Q (using modus ponens). We then have Q both as a conclusion and an interest, so we can discharge interest. Our interest in Q derived from our interest in $(Q \lor R)$, so when we discharge interest, we conclude $(Q \lor R)$, and we are through.

This reasoning proceeds in accordance with three procedures:

REASON-FORWARDS

If a set of sequents X is a forwards reason for a sequent S, some member of X is newly concluded, and the other members of X have already been concluded, then conclude S.

REASON-BACKWARDS

If interest is adopted in a sequent S, and a set X of sequents is a backwards reason for S, then adopt interest in any members of X that have not already been concluded. If every member of X has been concluded, conclude S.

DISCHARGE-INTERESTS

If interest was adopted in the members of X as a way of getting the sequent S, and some member of X is concluded and the other members of X have already been concluded, then conclude S.

However, as formulated, these procedures are not adequate for some interest-driven reasoning. To see why, first note that, as a theoretical matter, there can be not only the forwards reasons and the "simple" backwards reasons discussed in the preceding paragraphs, but also generalized backwards reasons. In a generalized backwards reason, the premises are segregated into two sets:

$$\frac{<\Gamma_1, p_1>, \ldots, <\Gamma_n, p_n>}{<\Gamma_{n+1}, q_1>, \ldots, <\Gamma_{n+m}, q_m>}$$
$$<\Gamma, r>$$

where the premises in the first set (the forwards premises) function in a forwards direction and the premises in the second set (the backwards premises) function in a backwards direction. In other words, given interest in $<\Gamma,r>$, the reasoner reasons backwards to interest in $<\Gamma_{n+1}, q_1>, \ldots, <\Gamma_{n+m}, q_m>$, but only if the reasoner has already established $<\Gamma_1, p_1>, \ldots, <\Gamma_n, p_n>$ A simple example of a generalized backwards reason would be the following:

$$\frac{<\Gamma, (\forall x)(Fx \to Gx)>}{<\Gamma, Fa>}$$
$$<\Gamma, Ga>$$

The effect of this reason will be that whenever the reasoner adopts interest in Ga, it will look at all universal generalizations $(\forall x)(Fx \to Gx)$ that it has already concluded, and adopt interest in their antecedents as a way of establishing Ga.

One can regard generalized backwards reasons as the most general form of backwards reasons, henceforth calling them simply "backwards reasons". The simple backwards reasons previously discussed represent the special case in which the set of forwards premises is empty. To accommodate reasoning with these generalized backwards reasons, one can revise REASON-BACKWARDS and DISCHARGE-INTERESTS as follows:

REASON-BACKWARDS

If interest is adopted in a sequent S, and a pair <X,Y> of sets of sequents is a backwards reason for S, where X is the set of forwards premises and Y is the set of backwards premises, then if every member of X has been concluded, adopt interest in any members of Y that have not already been concluded. If all members of both X and Y have been concluded, conclude S. If some members of X have not been concluded, then simply record <X,Y> as a potential reason for S, for use by DISCHARGE-INTERESTS.

DISCHARGE-INTERESTS

If interest was adopted in the members of Y as a way of getting the sequent S, and some member of Y is concluded and the other members of Y have already been concluded, then conclude S. If the pair <X,Y> has been recorded as a potential backwards reason for S, and some member of X is newly concluded and the other members of X have already been concluded, then adopt interest in any members of Y that have not already been concluded. If all members of both X and Y have been concluded, conclude S.

To illustrate the importance of this generalization of interest-driven reasoning, consider the following formulation of reductio-ad-absurdum:

$$\frac{<\Gamma \cup \{\sim p\}, (q \ \& \sim q)>}{<\Gamma, p>}$$

This rule cannot be regarded as a simple backwards reason. Used for backwards reasoning it would have us adopt interest in infinitely many contradictions. This problem can be solved by adopting the following variant of the rule as a generalized backwards reason:

$$\frac{<\Gamma \cup \{\sim p\}, q>}{<\Gamma \cup \{\sim p\}, \sim q>}$$
$$<\Gamma, p>$$

The effect of this is that, in trying to derive a contradiction from the supposition $\Gamma \cup \{\sim p\}$, the reasoner only looks for contradictions one of whose conjuncts have already been concluded. This avoids infinite branching, and when combined with other rules of inference, turns out to be sufficient to enable the construction of a deductive reasoner complete for first-order logic.

Reasoning forwards builds the inference-graph, and reasoning backwards builds the interest-graph. When the two graphs meet, interests are discharged, with the result that sequents that are of interest (as recorded in the interest-graph) are concluded and incorporated into the inference-graph. In the agent-architecture, queries posed by practical cognition form termini in the interest-graph. When the system of the present invention is treated as a stand-alone defeasible reasoner, these queries are supplied by the operator. When such queries are answered, the agent does something with the answers. What the agent does is determined by the purpose of the query. This is accomplished by storing instructions for what to do with an answer along with the query in ultimate-epistemic-interests.

As a deductive reasoner, this monotonic reasoner turns out to be surprisingly efficient. However, the original motivation for developing it was to incorporate it into a system of defeasible reasoning. This is because standard deductive reasoners based upon resolution refutation cannot serve that purpose. Such systems, in effect, always reason by reductio-ad-absurdum, but reductio-ad-absurdum is invalid for reasoning involving prima facie reasons. If a contradiction is obtained from some premises by reasoning via prima facie reasons, that does not support an inference to the negation of the premises. Instead it defeats the defeasible inferences.

In deductive reasoning, all reasons are equally good (i.e., perfect). But defeasible reasons can vary in strength. This has important consequences for the behavior of a defeasible reasoner. For instance, given an argument for a conclusion and a stronger argument for its negation, the stronger argument wins. A common view in epistemology has been that argument strengths should behave like probabilities, but the system of the present invention instead computes argument-strengths in terms of the "weakest link" principle. According to this principle, the strength of an argument, and the degree of support it confers on its conclusion, is the minimum of the (stipulated) degrees of justification of the input premises used and the strengths of the reasons used.

One of the main roles of degrees of support lies in the adjudication of disputes. Given an argument for P and another argument for ~P, the stronger argument wins, i.e., the conclusion of the stronger argument is justified and the weaker argument is defeated. If the arguments are equally strong, they defeat each other collectively, and neither conclusion is justified. More generally, given nodes $\alpha$ and $\beta$ of the inference-graph where the sequent supported by $\alpha$ has the syntactical form of a rebutting or undercutting defeater for $\beta$, $\alpha$ defeats $\beta$ if and only if the degree of support for $\alpha$ is at least as great as the degree of support for $\beta$.

Interests also come in degrees. A rational agent has practical goals, and this leads to queries regarding how to satisfy those goals being sent to the epistemic reasoner. The reasoner thus becomes interested in answering those queries, and that initiates backwards reasoning. But some of the goals will typically be more important than others, and this is reflected by differing degrees of interest in the queries deriving from those goals. One effect of those degrees of interest is to prioritize the backwards reasoning—preference is given to answering more important questions first.

The methods of the present invention impose an important constraint on undefeated-degrees-of-support and degrees of interest. Basically, more important questions require better answers. In other words, when the agent reasons backwards to a certain question and forwards to an answer, the answer is only deemed adequate if the undefeated-degree-of-support is at least as great as the degree of interest.

Figure 3:
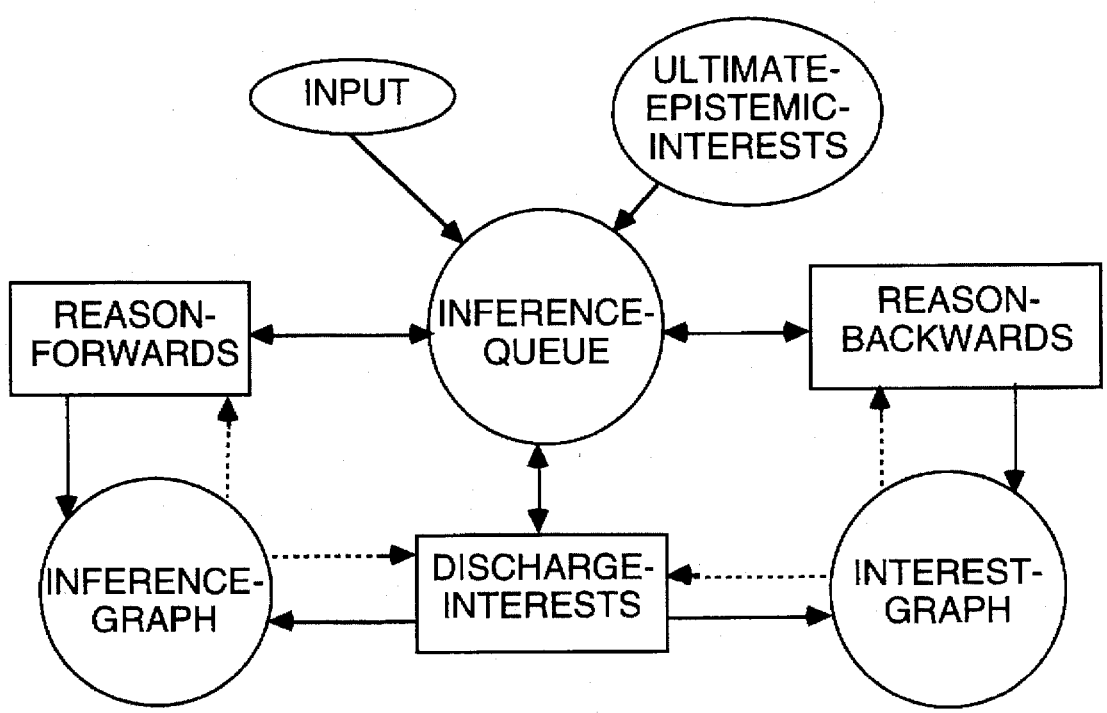
FIG. 3 is a generally diagrammatic view of the structure of the monotonic reasoner.

The basic control structure for the inference operations is the inference-queue. This is an ordered queue of inferences (either backwards or forwards) waiting to be performed. The details of the ordering can be changed without changing the architecture of the present invention, but it is presumed that the ordering is sensitive to degrees of support and degrees of interest. The general structure of the monotonic reasoner is diagramed in FIG. 3, where a solid arrow indicates that an operation alters the contents of a data-structure and a dashed arrow indicates that an operation retrieves information from a data-structure.

Figure 4:
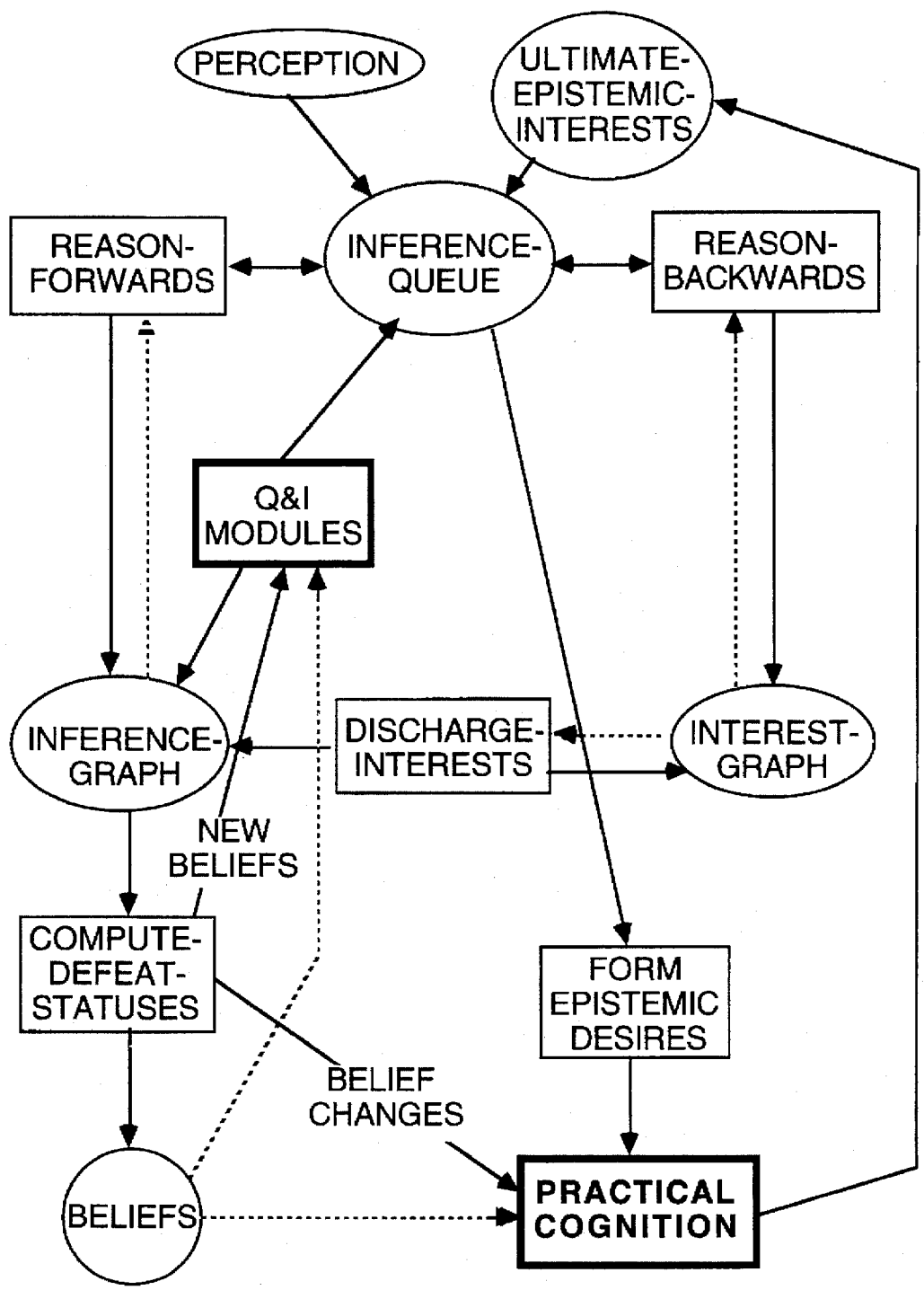
FIG. 4 is a generally diagrammatic view illustrating the flow of data in epistemic cognition.

Integrating the monotonic reasoner into the rest of the system produces the architecture diagramed in FIG. 4.

In a defeat status computation, the tentative conclusions produced by the automated reasoner will be stored as nodes of an inference-graph. When a conclusion is inferred from some other conclusions (the basis), it is linked to those conclusions by a support-link, and the basis forms the link-basis for the support-link. The supported-node for a support-link is the node for which it is a support-link. As previously mentioned an inference-graph can either be a simple inference-graph or an and/or inference-graph. The defining characteristic of a simple inference-graph is that no node has more than one support-link. If the reasoner produces multiple inferences to the same conclusion from different bases, this must be recorded as distinct nodes encoding the same conclusion. By contrast, in an and/or inference-graph, an inference-node can have more than one support-link, indicating that the automated reasoner has found multiple ways of inferring it from different bases.

Figure 5:
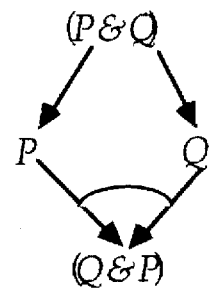
FIG. 5 is a generally diagrammatic view illustrating an "and/or" inference-graph.

Referring to FIG. 5, inference-graphs can be diagramed by drawing arrows between nodes, the arrows connecting a node to the nodes from which it is inferred. If a node is inferred from several other nodes as part of a single inference, the arrows connecting it to those nodes will be linked by an arc, and they jointly comprise a support link. FIG. 5 is a simple example of an inference-graph wherein (Q&P) is inferred from (P&Q).

Nodes and support-links will be assigned strengths (positive real numbers), with 0 the lower bound of strengths. These strengths are indicative of how good the cumulative inferences are that derive them from the original data. If a node has no support-links, it is among the given data and has a stipulated strength. The strength of a node that does have support-links is the maximum of the strengths of those support-links, and the strength of a support-link is the maximum of the strengths of the nodes in its link-basis and a strength associated with the reason-schema or rule of inference used in the inference encoded by the support-link (the link-rule of the link). In contexts in which strengths are not an issue, we can arbitrarily set all strengths equal to the same fixed value. The preferred process for computing strength is the weakest-link principle used in the methods of the present invention, the processes described herein can be applied using any process for computing strengths.

Conflicts between nodes arise from defeat-relations between nodes and support-links. It is assumed that defeat-relations result from (1) a combination of the defeating node having adequate strength relative to the defeated link, and (2) some other relations that can be determined to hold independently of determining defeat status. The most obvious relations are syntactical. For example, the defeating node might encode a conclusion that denies the conclusion of the supported-node of the support-link. For simplicity, all the relations other than strength will be referred to as the "syntactic defeat relations", although they might include more than merely syntactical relations. In the preferred forms of the methods of the present invention, they include only syntactic relations. A node is a defeater for a support-link if and only if the node stands in the syntactic relations to the link, and the strength of the node is at least as great as that of the link.

It was argued in *Artificial Intelligence* at pp. 377-408, that, when using simple inference-graphs, the criterion that should be used in determining whether a tentative conclusion produced by a defeasible reasoner should be an ultimately accepted conclusion for the data analyzer is that it should be undefeated, in the sense defined by the following four definitions:

A node of the inference-graph is initial if and only if its node-basis and list of node-defeaters is empty.

σ is a partial status assignment if and only if σ is a function assigning "defeated" and "undefeated" to a subset of the nodes of an inference-graph in such a way that:
1. σ assigns "undefeated" to all initial nodes;
2. σ assigns "undefeated" to a node α if and only if σ assigns "undefeated" to all the members of the node-basis of α and σ assigns "defeated" to all node-defeaters of α; and
3. σ assigns "defeated" to a node α if and only if either some member of the node-basis of α is assigned "defeated", or some node-defeaters of α and is assigned "undefeated".

σ is a status assignment if and only if σ is a partial status assignment and σ is not properly contained in any other partial status assignment A node is undefeated if and only if every status assignment assigns "undefeated" to it; otherwise it is defeated.

Because a node of a simple inference-graph corresponds to a single argument, the "goodness" of the conclusion it encodes is its node-strength if the node is undefeated, or 0 if it is defeated. Hereinafter this will be referred to as the undefeated-degree-of-support of the node.

Figure 6:
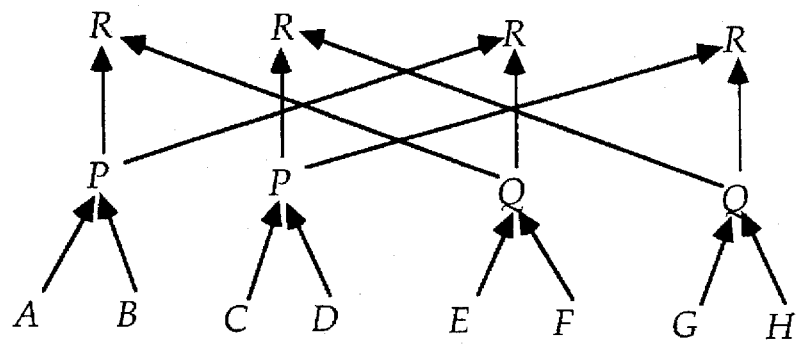
FIG. 6 is a generally diagrammatic view illustrating a simple inference-graph with multiple arguments for single conclusions.
Figure 7:
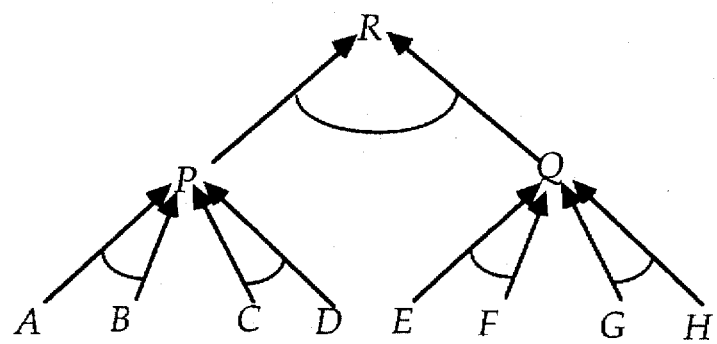
FIG. 7 is a generally diagrammatic view showing diagrams an "and/or" inference-graph recording the same information as the simple inference-graph of FIG. 6.

In a reasoner that performs complex reasoning and often produces multiple arguments for a single conclusion, the use of simple inference-graphs is an inefficient representation of the reasoning, because it leads to needless duplication. If there are two arguments supporting a single conclusion, then any further reasoning from that conclusion will generate two different nodes. If there are two arguments for each of two conclusions, and another inference proceeds from those two conclusions, the latter will have to be represented by four different nodes in the inference-graph, and so on. This is illustrated in FIG. 6, where P and Q are each inferred in two separate ways, and then R is inferred from P and Q. Referring to FIG. 7, it can be seen that one can construct an and/or inference-graph encoding the same reasoning as the standard inference-graph in FIG. 6, and it does so with many fewer nodes.

Although and/or graphs provide an efficient representation of reasoning, they complicate the computation of defeat-status. Using simple inference-graphs, one can use the defeat-status computation to compute defeat-statuses, and then use the computed defeat-statuses to compute the undefeated-degrees-of-support for the nodes in the inference-graph. The undefeated-degree-of-support for a node is zero if it is defeated, and it is its strength otherwise.

Figure 8:
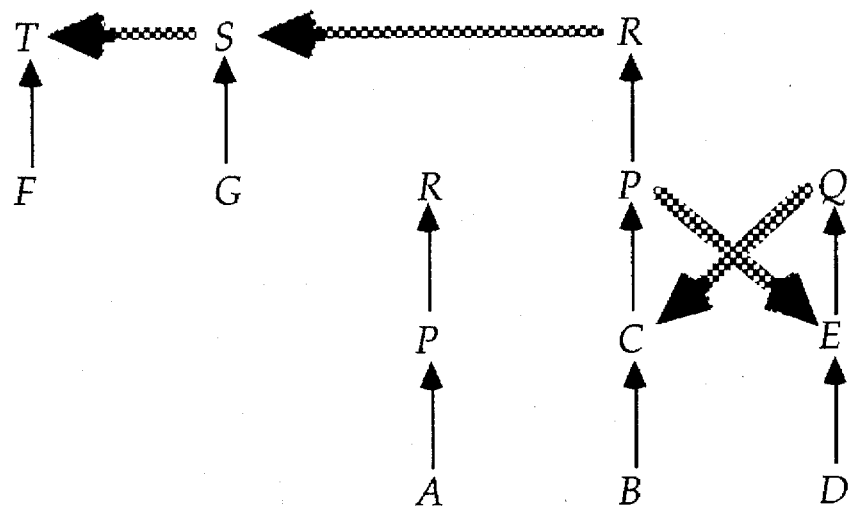
FIG. 8 is a generally diagrammatic view showing a simple inference-graph.
Figure 9:
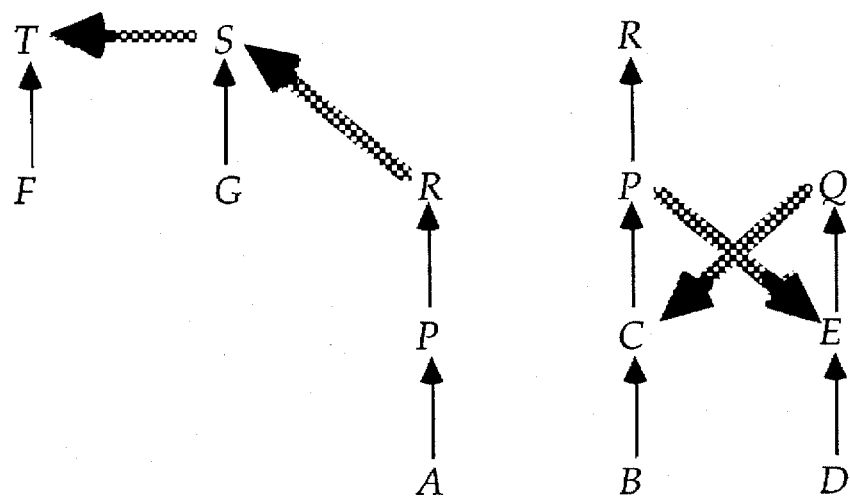
FIG. 9 is a generally diagrammatic view showing a simple inference-graph with the same support structure as that of FIG. 8, but showing different defeat-links.
Figure 10:
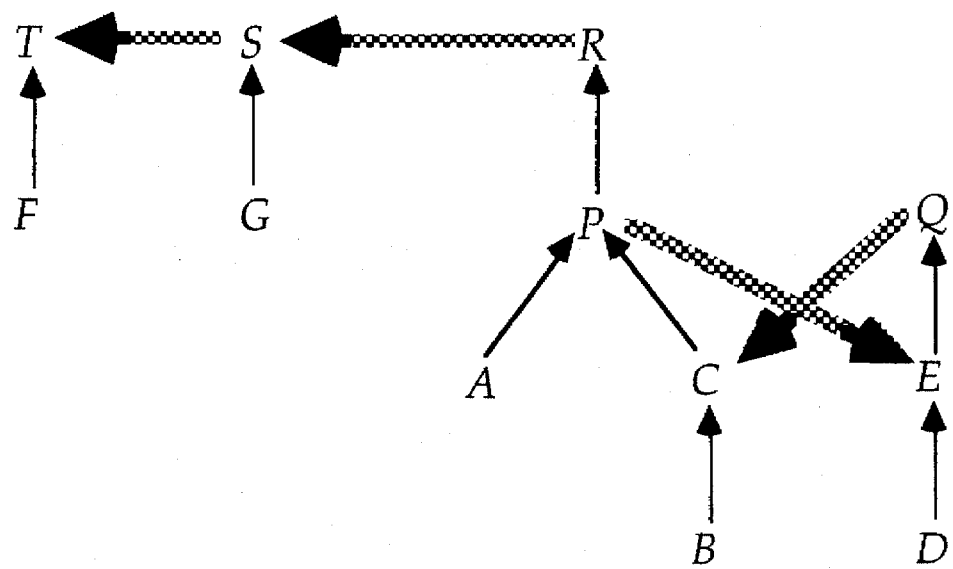
FIG. 10 is a generally diagrammatic view illustrating an "and/or" inference-graph recording the same support structure as the simple inference-graphs of FIGS. 7 and 8.

With and/or inference-graphs, one can no longer separate the computation of defeat-statuses and undefeated-degrees-of-support. To illustrate, consider the two inference-graphs in FIGS. 8 and 9, wherein defeat-relations are indicated using cross-sectional arrows of the form '⤳'. These inference-graphs could arise from different degrees of support for the two nodes supporting R. As indicated in FIG. 8, only the rightmost node is strong enough to defeat S, whereas in FIG. 9, only the leftmost node is strong enough to defeat S. The difference has repercussions, because in FIG. 8, T is defeated, but in FIG. 9, T is undefeated. The difficulty is now that if one tries to represent these as and/or graphs, one arrives at the same graph, depicted in FIG. 10. This representation cannot distinguish between the situation diagramed in FIG. 8 and that diagramed in FIG. 9.

Figure 11:
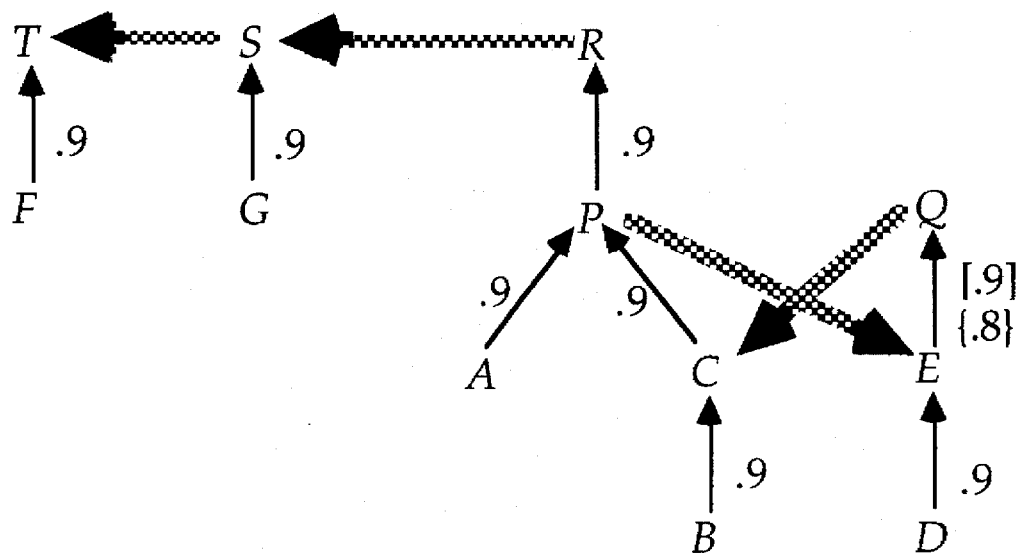
FIG. 11 is a generally diagrammatic view similar to FIG. 10, but showing strengths added for the support-links.

This difficulty can be avoided by attaching strengths to the support-arrows. For example, as shown in FIG. 11, if one attaches the strengths in brackets, we get a representation of FIG. 4, and if we attach the strengths in braces, the result is the representation in FIG. 9.

With this modification, one can construct a defeat-status computation that is equivalent to that for simple inference-graphs. The trick is to take the defeat-status of a node to be its undefeated-degree-of-support rather than just a status of "defeated" or "undefeated". If all arguments supporting a node are defeated, then the undefeated-degree-of-support is 0. Otherwise, the undefeated-degree-of-support is the maximum of the strengths of the undefeated arguments. We take the maximal-degree-of-support of a node to be the maximum of the strengths of all the arguments supporting it. One can then modify the definition of "status assignment" used for simple inference-graphs as follows:

A node of the inference-graph is initial if and only if its node-basis and list of node-defeaters is empty.

σ is a partial status assignment if and only if σ is a function assigning real numbers to a subset of the nodes of an inference-graph and to the support-links of those nodes in such a way that:

1. σ assigns its maximal-degree-of-support to any initial node;
2. If σ assigns a value α to a defeat-node for a support-link and assigns a value less than or equal to α to some member of the link-basis, then σ assigns 0 to the link;
3. Otherwise, if σ assigns values to every member of the link-basis of a link and every link-defeater for the link, σ assigns to the link the minimum of the strength of the link-rule and the numbers σ assigns to the members of the link-basis.
4. If every support-link of a node is assigned 0, the node is assigned 0;
5. If some support-link of a node is assigned a value greater than 0, the node is assigned the maximum of the values assigned to its support-links.
6. If every support-link of a node that is assigned a value is assigned 0, but some support-link of the node is not assigned a value, then the node is not assigned a value.

σ is a status assignment if and only if σ is a partial status assignment and σ is not properly contained in any other partial status assignment Now the question arises how defeat-statuses (or undefeated-degrees-of-support) should be determined for the nodes of the inference-graph. One simple way of computing undefeated-degrees-of-support is the following:

The undefeated-degree-of-support of a node of the and/or inference-graph is 0 if some status-assignment fails to assign a value to it; otherwise it is the minimum of the values assigned to it by status assignments.

This is not obviously wrong, and the method of the present invention can be made to compute undefeated-degrees-of-support in this way by executing the instruction '(compute-undefeated-degrées-of-support-simply)'. However, this way of computing undefeated-degrees-of-support for nodes of an and/or inference-graph is not equivalent to the preceding method of computing undefeated-degrees-of-support for a simple inference-graph. Equivalence would require the truth of the following Correspondence Theorem:

A node of the and/or inference-graph is undefeated (has a nonzero undefeated-degree-of-support) if and only if one of the corresponding nodes of the simple inference-graph is undefeated.

Figure 12:
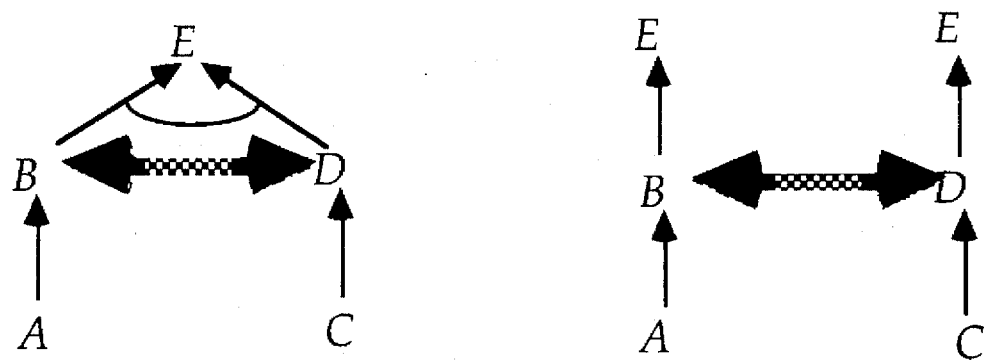
FIG. 12 is a generally diagrammatic view illustrating a counterexample to the Correspondence Theorem.

However, the simple computation of undefeated-degrees-of-support does not make the Correspondence Theorem true. FIG. 12 is a counterexample, with the simple inference-graph on the right and the corresponding and/or graph on the left. In the simple graph, there are two status-assignments, and one assigns "undefeated" to the left "E" and the other assigns "undefeated" to the right "E, but neither "E" is assigned "undefeated" by both status-assignments, so both are defeated. In the and/or graph, there are also two status-assignments, and each assigns "undefeated" to "E" (by making a different argument undefeated). Thus on the above proposal, "E" would be undefeated in the and/or inference-graph, but defeated in the simple inference-graph.

This example makes it clear that the difficulty lies in the fact that, in the and/or graph, there is no argument that comes out undefeated on both assignments. Each simple inference-graph can be rewritten as an and/or graph, and then each node of the and/or graph corresponds to a set of nodes of the simple graph. A node of the simple inference-graph, on the other hand, corresponds to an argument in the and/or graph. An argument is a kind of connected sub-tree of the graph. More precisely:

An argument from an and/or inference-graph $\mathcal{G}$ for a node N is a subset $\mathcal{A}$ of the nodes and support-links of the graph such that (1) if a node in $\mathcal{A}$ has any support-links in $\mathcal{G}$, exactly one of them is in $\mathcal{A}$, (2) if a support-link is in $\mathcal{A}$ then the nodes in its support-link-basis are also in $\mathcal{A}$, and (3) N is in $\mathcal{A}$.

Nodes in the simple inference-graph correspond one-one to arguments in the and/or inference-graph. The definition of a partial status-assignment for and/or graphs just amounts to saying that a node is assigned "undefeated" if it is either an initial node or some argument for it consists of nodes and links that are assigned "undefeated", and it is assigned "defeated" if it is not an initial node and every argument for it contains a link that is assigned "defeated". This suggests that the correct analysis of defeat-status for and/or inference-graphs should be:

An argument is undefeated relative to an and/or inference-graph if and only if every status assignment assigns a non-zero value to all nodes and links in the argument.

The strength of an argument is the minimum of the node-strengths of the members of input occurring in it and the reason-strengths of the support-link-rules of the support-links occurring in it.

The undefeated-degree-of-support of a node of an and/or inference-graph is the maximum of the strengths of the undefeated arguments for it.

With this definition it becomes simple to prove the Correspondence Theorem by induction on the length of the arguments. To compute undefeated-degrees-of-support efficiently, one can store the list of arguments for a node along with the node in the list of node-arguments, and along with each argument will be stored its strength (which does not change), and the list of defeating-status-assignments (or defeating-assignment-trees—see below) for a support-link will be stored along with the support-link. The latter will be updated each time the set of status assignments is updated, and then undefeated-degrees-of-support can be computed very simply. The method of the present invention can be made to compute undefeated-degrees-of-support in this way by executing '(compute-undefeated-degrees-of-support-complexly)'. This is the default computation used in carrying out the methods of the invention.

One problem solved by the present invention is that of constructing a process for efficiently computing defeat-statuses for nodes of an inference-graph. That process will be described below for and/or inference-graphs, and a slightly simplified version will then be described for simple inference-graphs.

For the purpose of computing defeat-statuses for nodes of an and/or inference-graph, it is convenient to redefine (partial) status assignments to be functions assigning either a number (the undefeated-degree-of-support) or "unassigned":

$\sigma$ is a partial status assignment if and only if $\sigma$ is a function assigning "unassigned" or real numbers between 0 and 1 to a subset of the nodes of an inference-graph and to the support-links of those nodes in such a way that:

1. $\sigma$ assigns its maximal-degree-of-support to any initial node;
2. If $\sigma$ assigns a numerical value $\alpha$ to a defeat-node for a support-link and assigns a numerical value less than or equal to $\alpha$ to some member of the link-basis, then $\sigma$ assigns 0 to the link;
3. Otherwise, if $\sigma$ assigns numerical values to every member of the link-basis of a link and every link-defeater for the link, $\sigma$ assigns to the link the minimum of the strength of the link-rule and the numbers $\sigma$ assigns to the members of the link-basis;
4. If every support-link of a node is assigned 0, the node is assigned 0;
5. If some support-link of a node is assigned a value greater than 0, the node is assigned the maximum of the values assigned to its support-links;
6. If every support-link of a node that is assigned a value is assigned 0, but some support-link of the node is not assigned a value, then the node is not assigned a value;
7. $\sigma$ assigns "unassigned" to a support-link if it does not assign 0 to any member of the support-link-basis, it does not assign to any support-link-defeater a number greater than a number assigned to a member of the support-link-basis, and it either assigns "unassigned" to some member of the support-link-basis or to some support-link-defeater;
8. $\sigma$ assigns "unassigned" to a node if some support-link for the node is assigned "unassigned", and all support-links not assigned "unassigned" are assigned 0.

If $\sigma$ and $\eta$ are partial status assignments, $\sigma$ is a proper sub-assignment of $\eta$ if and only if $\sigma$ and $\eta$ have the same domain, $\sigma \neq \eta$, and for every node or link to which $\sigma$ assigns something other than "unassigned", $\eta$ assigns the same value.

$\sigma$ is a status assignment if and only if $\sigma$ is a partial status assignment and $\sigma$ is not a proper sub-assignment of any other partial status assignment.

Given a partial assignment to a subset of the inference-nodes and support-links of the inference-graph and a set of stipulated assignments arb to some additional nodes, define the assignment-closure of arb and that assignment to be the minimal partial assignment containing arb and the given partial assignment, or bill if there is none. This can be constructed by recursively applying the following rules until no further inference-nodes or support-links receive assignments or some inference-node or support-link receives inconsistent assignments:

if some member of the support-link-defeaters has been assigned a numerical value greater than or equal to a numerical value assigned to some member of the link-basis or to the strength of the support-link-rule, assign 0 to the link;

otherwise, if all support-link-defeaters and all members of the support-link-basis have been assigned values:
if some member of the support-link-basis of a support-link has been assigned "unassigned", assign "unassigned" to the link;
otherwise:
if some support-link-defeater for the link has been assigned "unassigned", assign "unassigned" to the link;
otherwise, let val be the minimum of the strength of the support-link-rule and the numbers assigned to the members of the support-link-basis, and assign val to the link;

if some support-link is assigned two different values, the assignment-closure is NIL;

if every support-link of a node is assigned 0, the node is assigned 0;

if some support-link of a node is assigned a numerical value greater than 0, and every support-link of the node is assigned some value, the node is assigned the maximum of the numerical values assigned to its support-links;

if every support-link of a node is assigned some value, and every support-link of the node that is assigned a numerical value is assigned 0, but some support-link of the node is assigned "unassigned", then the node is assigned "unassigned".

Before discussing the algorithm for generating all maximal partial-assignments, consider a related (but simpler) algorithm for producing all total assignments, where the latter are defined as follows:

A total assignment is a partial assignment that does not assign "unassigned" to any node.

The following algorithm will generate all total assignments:

Let $\sigma_0$ be the assignment-closure of the partial assignment that assigns "undefeated" to all initial nodes, and let P-ass=$\{\sigma_0\}$.

Let Ass=$\emptyset$.

Repeat the following until no new assignments are generated:

- If P-ass is empty, exit the loop.
- Let σ be the first member of P-ass:
  - Delete σ from P-ass.
  - Let L be a support-link which has not been assigned a status but for which all members of the link-basis have been assinged non-zero values.
  - If there is no such node as L, insert σ into Ass.
  - If there is such an L then:
    - Let S be the set of all assignments that result from extending σ by assigning either 0 or the minimum value assigned to its link-basis to L.
    - Insert all non-empty assignment-closures of members of S into P-ass.
- If Ass is unchanged, exit the loop.

Return Ass as the set of assignments

This algorithm generates all total assignments by trying to build them up recursively from below (ordering nodes in terms of the "inference-ancestor" relation). When this leaves the status of a link undetermined, the algorithm considers all possible ways of assigning statuses to that link, and later removes any combinations of such "arbitrary" assignments whose assignment-closures prove to be inconsistent. The general idea is that assignments are generated recursively insofar as possible, but when that is not possible a generate-and-test procedure is used.

To modify the above algorithm so that it will generate all maximal partial assignments, instead of just deleting inconsistent arbitrary assignments, one must look at proper sub-assignments of them. When such a proper sub-assignment has a consistent assignment-closure, and it is not a proper sub-assignment of any other consistent assignment, then it must be included among the maximal partial assignments. To manage this, the algorithm must keep track of which nodes have been assigned statuses arbitrarily in the course of constructing an assignment. Let $\sigma_0$ be the assignment-closure of the partial assignment that assigns "undefeated" to all initial nodes. Let us take an "annotated-assignment" to be a pair $<\sigma,A>$ where A is an arbitrary assignment to some set of nodes and links, and σ is the assignment-closure of $\sigma_0 \cup A$. The algorithm constructs annotated-assignments.

COMPUTE-ASSIGNMENTS

Let $\sigma_0$ be the assignment-closure of the partial assignment that assigns its degree of justification to any initial node, and let P-ass={$<\sigma_0,\emptyset>$}.

Let Ass=∅.

Repeat the following until an exit instruction is encountered:

Return as the set of assignments the set of all σ such that for some A, $<\sigma,A>$ is in Ass.

The correctness of this algorithm turns on the following observations:

(1) Every partial assignment can be generated as the assignment-closure of the assignment to the initial nodes and an arbitrary assignment to some otherwise undetermined links.

(2) If a partial assignment is inconsistent, so is every extension of it.

The algorithm makes use of (1) in the same way the previous algorithm did. In light of (2), in ruling out inconsistent assignments, we can shrink the search space by ruling out inconsistent sub-assignments and then only test for consistency the extensions of the remaining consistent sub-assignments.

The process described by COMPUTE-ASSIGNMENTS works for computing defeat statuses when the inference-graphs are not very complicated, but for complicated inference-graphs it is unacceptably inefficient. The difficulty is that it constructs assignments for all nodes of the inference-graph simultaneously. Then when it finds an inconsistency in the assignment-closure, it considers all maximal consistent sub-assignments of that entire assignment. This has the result that if one presents two copies of the same problem to the algorithm simultaneously, the number of sub-assignments it considers will increase exponentially rather than linearly. To illustrate, consider the four-way collective defeat depicted in FIG. 13. The preceding algorithm for computing assignments produces four assignments (one assigning "defeated" to each of nodes 5,6,7,8), in 0.07 seconds. But when one considers composite problems consisting of multiple instances of this single problem, the situation deteriorates rapidly:

- If P-ass is empty, exit the loop.
- Let $<\sigma, A>$ be the first member of P-ass:
  - Delete $<\sigma, A>$ from P-ass:
  - Let L be a support-link that has not been assigned a status but for which all members of the link-basis have been assigned non-zero values.
  - If there is no such link as L, insert $<\sigma, A>$ into Ass.
  - If there is such an L then:
    - Let Ass* be set of all A∪X* such that X* is an arbitrary assignment of either 0, "unassigned", or the minimum value assinged to its link-basis to L.
    - Let S be the set of all maximal sub-assignments S* of members of Ass* such that the assignment-closure of S*∪$\sigma_0$ is non-empty.
    - For each member A of S:
      - If any member of P-ass is a sub-assignment of A, delete it from P-ass.
      - If any member of Ass is a sub-assignment of A, delete it from Ass.
      - If A is not a sub-assignment of any member of P-ass or Ass, insert A into P-ass.

Figure 13:
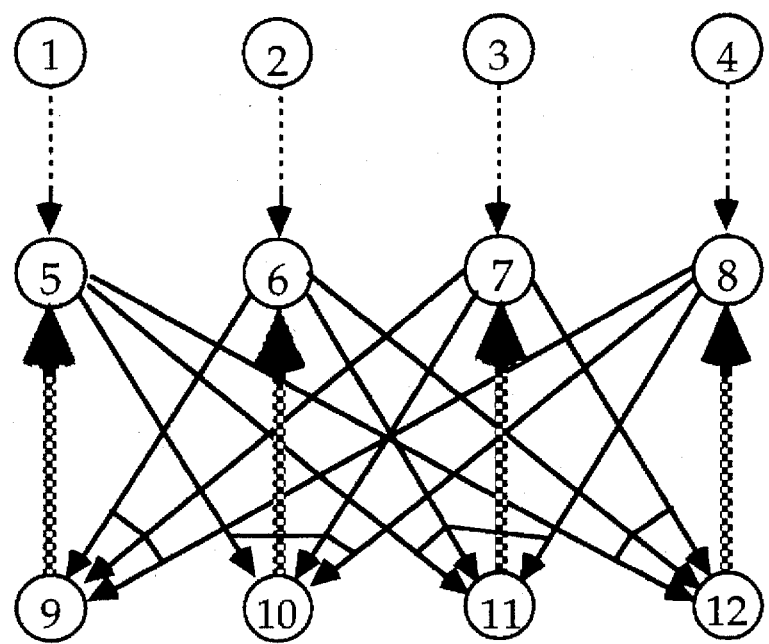
FIG. 13 is a generally diagrammatic view showing a case of four-way collective defeat.

| Figure 13 | 0.07 sec |
| --- | --- |
| | 4 assignments |
| 2 instances of #13 | 1.20 sec (increase by a factor of 17.14) |
| | 16 assignments |
| 3 instances of #13 | 18.24 sec (×260.57) |
| | 64 assignments |
| 4 instances of #13 | 310.67 sec (×4438.14) |
| | 256 assignments |

There is a better way of doing the computation. The different parts of the composite problem are really separate subproblems, and it should be possible to separate the computations, which would result in a linear increase in computational difficulty rather than an exponential one. Note that in realistic cases, this will be important, because the inference-graph of a real agent will generate a large base-assignment consisting of the assignment-closure of an assignment of "undefeated" to the initial nodes, and then a possibly large number of small independent problems consisting of collective defeat and kindred phenomena, each generating multiple extensions to the base assignment. It should be possible to handle each of these sets of multiple extensions independently, rather than lumping them all together.

The above problem is solved by one of the main processes covered by this patent. Let us define the inference/defeat-ancestors of a support-link to be the set of inference-nodes and support-links that can be reached by working backwards via support-links and defeat-links. Precisely:

node is an inference/defeat-ancestor of link if and only if either (1) node is a member of the link-basis of link or of a support-link that is an inference-defeat-ancestor of link, or (2) node is a defeater for link or for a support-link that is an inference-defeat-ancestor of link.

A support-link L is an inference/defeat-ancestor of link if and only if L is a support-link for an inference-node that is an inference/defeat-ancestor of link.

The inference/defeat-ancestors of a node are its support-links and their inference/defeat-ancestors.

Figure 14:
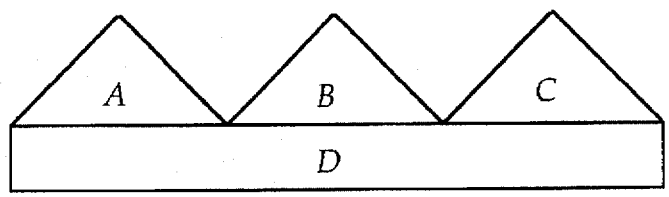
FIG. 14 a generally diagrammatic view diagraming the structure of triangle-sets.

In computing the defeat-status of a node or link, the only nodes and links that are relevant are its inference/defeat-ancestors. When presented with different subproblems embedded in a single inference-graph, one can divide the inference-graph into regions as in FIG. 14. Here D is the set of nodes and links assigned statuses by the base-assignment. The "triangle-sets" A, B, and C represent isolated subproblems. They are characterized by the fact that they are minimal sets X such that every inference/defeat-ancestor of a member of X is in either X or D. For the purpose of computing the defeat-statuses of the members of the triangle-sets, one can treat the A∪D, B∪D, and C∪D as separate inference-graphs. This will yield the same value for the defeat-status as a computation based upon the entire inference-graph.

The construction of triangle-sets can be made recursive, because there may be further triangle-sets that sprout above the existing ones. Notice, however, that higher-level triangle-sets must be relativized to assignments to the lower-level triangle-sets rather than to the lower-level triangle-sets themselves. This is because different assignments to a lower-level triangle-set may leave different sets of nodes unassigned and candidates for inclusion in a higher-level triangle-set.

Figure 15:
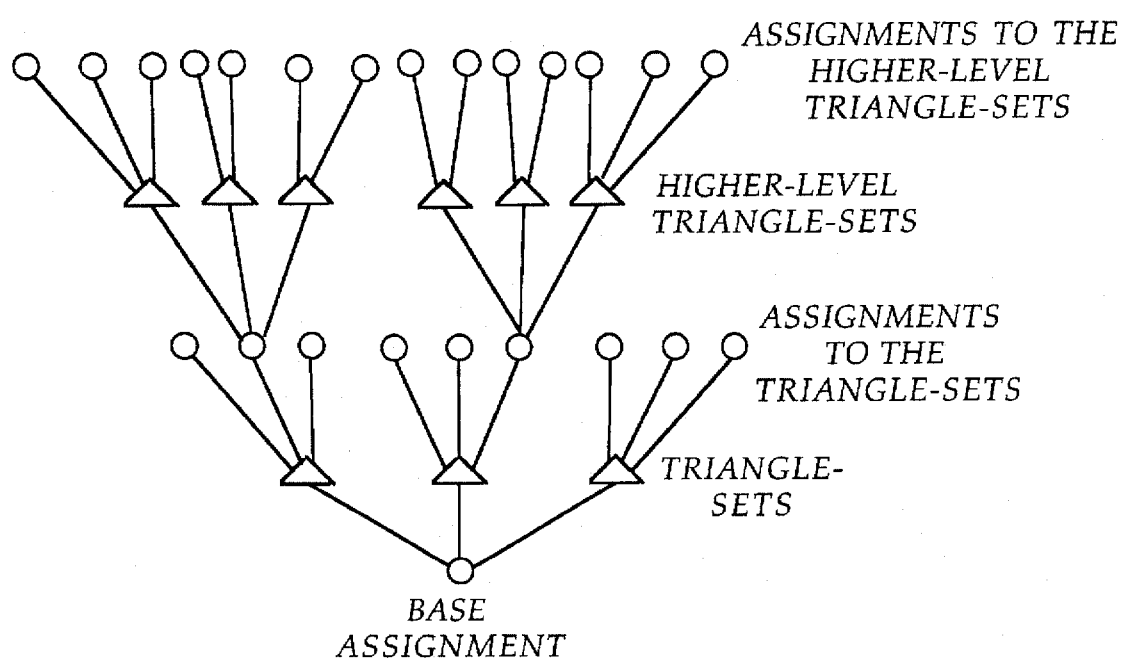
FIG. 15 is a generally diagrammatic view diagraming the structure of an assignment-tree.

A simple way to conceptualize the foregoing is in terms of an assignment-tree. The base of an assignment-tree is the base-assignment. That divides into a set of tree-nodes representing triangle-sets. Each of those tree-nodes gives rise to a set of assignments. Those assignments divide in turn into a new set of tree-nodes representing triangle-sets, and so on, as diagramed in FIG. 15. This can be accommodated formally by taking an assignment-tree to be a data-structure consisting of an assignment and the list of resulting triangle-sets, and taking a triangle-set to be a data-structure consisting of a set of inference-nodes and support-links (its domain) and the list of assignment-trees generated by the assignment-closures of maximal-consistent assignments to the inference-nodes and support-links in the triangle-sets. For the purpose of evaluating the defeat-statuses of the nodes of the inference-graph, we can construct the assignment-tree global-assignment-tree generated by the base-assignment. Then an inference-node node is undefeated if and only if the inference-graph contains an argument for node which is such that no assignment in global-assignment-tree assigns 0 or "unassigned" to any nodes or links in the argument The complete assignments operative in a triangle-set will be the result of appending all of the assignments on the branch of the assignment-tree leading from the base assignment to the triangle-set, and then appending to that the assignments to the triangle-set. The list of assignments on the branch leading to the triangle-set, beginning with the base assignment, will constitute the ancestor-assignments of the triangle-set. These will consist of the assignment to the parent-tree, and the assignment to its parent-tree, and so on. These are computed recursively by working backwards through the tree. The assignment-closure of a new partial assignment must accordingly be understood as relative to an assignment-tree. A node or link has a defeat-status in a tree if and only if it is assigned a status either by the assignment of the tree or one of its ancestor assignments.

Given an assignment-tree, the following returns a list of triangle-domains (taken to be sets of support-links), each ordered so that the link generating it is the first member:
COMPUTE-TRIANGLE-DOMAINS tree Let X be the set of all consequent-links of inference-nodes in the domain of the assignment of tree that do not have defeat-statuses in tree but whose support-link-bases consist of nodes that do have defeat-statuses in tree.

If X is empty, return the empty set.

If X is nonempty, let triangle-domains be empty. Then for each link in X:

Let triangle be the set of inference/defeat-ancestors of link.

If link is a member of triangle, and there is no triangle* already in triangle-domains such that the first member of triangle* is a member of triangle, then insert triangle into triangle-domains, ordering the members of triangle so that link is the first member.

Return the list triangle-domains.

global-assignment-tree is then computed by applying the following algorithm, with no arguments. Each time a triangle-set is constructed and assignments to it are computed, COMPUTE-ASSIGNMENT-TREE is called recursively with arguments listing the assignment to the domain of the triangle-set and the parent-tree.

COMPUTE-ASSIGNMENT-TREE optional-arguments: assignment parent-tree

If no values are provided for the optional-arguments:

Define assignment to be the assignment-closure of the partial assignment that assigns "undefeated" to all initial nodes.

Let tree be a new assignment-tree whose assignment is
assignment and whose parent-tree is parent-tree (if the
latter is provided).

Let triangles be the list of triangle-domains computed by
applying COMPUTE-TRIANGLE-DOMAINS to tree.

Set the list of triangle-sets of tree to be the result of
applying COMPUTE-TRIANGLE-SET to each member of triangles together with tree.

COMPUTE-TRIANGLE-SET triangle-domain tree

Let S be the set of all maximal consistent assignments to
triangle-domain relative to tree, computed by applying
COMPUTE-ASSIGNMENTS-TO-DOMAIN to tree
and triangle-domain, Construct triangle-set to be the triangle-set whose domain
is triangle-domain and whose list of assignment-trees
are generated by applying COMPUTE-
ASSIGNMENT-TREE to each member ass of S and
tree.

COMPUTE-ASSIGNMENTS-TO-DOMAIN tree triangle

Let link be the first member of triangle.

Where min-val is the minimum of the reason-strength of
the support-link-rule of link and the values assigned to
the members of the support-link-basis of link, let Ass*
be the set {{<link, 0>},{<link, min-val>}}.

Let P-ass be the set of all pairs <closure, A> where A is
in Ass*, closure is the assignment-closure of A relative
to tree, and closure is nonempty.

If P-ass is empty, return the list whose only member is the
assignment-closure of {<link,"unassigned">)} relative
to tree.

If P-ass is nonempty:
Let Ass=∅.
Repeat the following until an exit instruction is encountered:

- If P-ass is empty, exit the loop.
- Let <σ,A> be the first member of P-ass:
  - Delete <σ,A> from P-ass:
  - Let L be a link in triangle which has not been assigned a status by σ or tree, but for which all members of the support-link-basis have been assigned non-zero numerical values.
  - If there is no such link as L, insert <σ,A> into Ass.
  - If there is such an L then:
    - Let Ass* be the set of all A∪X* such that X* is an arbitrary assignment to L of 0 or of the minimum of the reason-strength of its support-link-rule and the values assigned to the members of its support-link-basis.
    - Let S be the set of all maximal sub-assignments S* of members of Ass* such that the assignment-closure of S* relative to tree is non-empty.
    - For each member A of S*, let closure be its assignment-closure relative to tree;
      - If any member of P-ass is a sub-assignment of closure, delete it from P-ass.
      - If any member of Ass is a sub-assignment of closure, delete it from Ass.
      - If A is not a sub-assignment of any member of P-ass or Ass, insert <closure,A> into P-ass.

Return as the set of assignments the set of all σ such
that for some A, <σ,A> is in Ass.

The difference between the performance of the algorithms
is illustrated dramatically by considering composites of FIG.
13 again. For a single instance of that problem, the original
assignments-algorithm is the same speed as the assignment-tree-algorithm. But when we consider composite problems,
the comparison changes dramatically:

|  | assignments-algorithm | assignment-tree-algorithm |
|---|---|---|
| Figure 13 | 0.07 sec<br>4 assignment | 0.07 sec<br>4 branches |
| 2 instances of #13 | 1.20 sec (×17.14)<br>16 assignments | 0.15 sec (×2.14)<br>8 branches |
| 3 instances of #13 | 8.24 sec (×260.57)<br>64 assignments | 0.25 sec (×3.57)<br>12 branches |
| 4 instances of #13 | 310.67 sec (×4438.14)<br>256 assignments | 0.35 sec (×5.0)<br>16 branches |

The difference is attributable to the fact that n copies of a
simple problem that produces k assignments and an
assignment-tree with k branches will produce $n^k$ assignments but will produce an assignment-tree with only n.k
branches. The times required to run the algorithms will be
roughly proportion to the number of assignments and
branches produced. The proportions are not exact because
partial branches and assignments may be produced and later
discovered to be inconsistent and so pared from the tree or
dropped from the list of assignments.

When applied to the special case of a simple inference-graph, the preceding processes can be modified a bit to read
as follows:

COMPUTE-TRIANGLE-DOMAINS tree

Let X be the set of all node-consequences of nodes in the
domain of the assignment of tree that do not have
defeat-statuses in tree but whose node-bases do have
defeat-statuses in tree.

If X is empty, return the empty set.

If X is nonempty, let triangle-domains be empty. Then for
each node in X:

Let triangle be the set of inference/defeat-ancestors of
node.

If node is a member of triangle, and there is no triangle*
already in triangle-domains such that the first member of triangle* is a member of triangle, then insert
triangle into triangle-domains, ordering the members
of triangle so that node is the first member.

Return the list triangle-domains.

COMPUTE-ASSIGNMENT-TREE optional-arguments:
assignment parent-tree

If no arguments are provided:
Define assignment to be the assignment-closure of the
partial assignment that assigns "undefeated" to all
initial nodes.

Let tree be a new assignment-tree whose assignment is assignment and whose parent-tree is parent-tree (if the latter is provided).

Let triangles be the list of triangle-domains computed by applying COMPUTE-TRIANGLE-DOMAINS to tree.

Set the list of triangle-sets of tree to be the result of applying COMPUTE-TRIANGLE-SET to each member of triangles together with tree.

COMPUTE-ASSIGNMENTS-TO-DOMAIN tree triangle

Let node be the first member of triangle.

Let Ass* be the set {{<node,NIL>},{<node,T>}}.

Let P-ass be the set of all pairs <closure,A> where A is in Ass*, closure is the assignment-closure of A relative to tree, and closure is nonempty.

If P-ass is empty, return the list whose only member is the assignment-closure of {<node,0>} relative to tree.

If P-ass is nonempty:
Let Ass=∅.
Repeat the following until an exit instruction is encountered:

- If P-ass is empty, exit the loop.
- Let <σ,A> be the first member of P-ass:
  - Delete <σ,A> from P-ass:
  - Let n be a node in triangle which has not been assigned a status by σ or tree, but for which all members of the node-basis have been assigned "undefeated".
  - If there is no such node as n, insert <σ,A> into Ass.
  - If there is such an n then:
    - Let Ass* be the set of all A∪X* such that X* is an arbitrary assignment of "defeated" of "undefeated" to n.
    - Let S be the set of all maximal sub-assignments S* of members of Ass* such that the assignment-closure of S* relative to tree is non-empty.
    - For each member A of S*, let closure be its assignment-closure relative to tree:
      - If any member of P-ass is a sub-assignment of closure, delete it from P-ass.
      - If any member of Ass is a sub-assignment of closure, delete it from Ass.
      - If A is not a sub-assignment of any member of P-ass or Ass, insert <closure,A> into P-ass.

Return as the set of assignments the set of all σ such that for some A, <σ,A> is in Ass.

The aforementioned algorithm is an efficient algorithm for computing defeat-statuses for an inference-graph that has already been constructed. This algorithm is sufficient for use in automated data analysis provided the reasoner is given a fixed set of data to analyze, and its next use will be on a new and unrelated set of data. However, in many cases, the reasoner will be faced with a continuous flow of new data added to the old data. In that case, it must construct its inference-graph one support-link at a time, and update the defeat-statuses with the addition of each link. The result of updating the assignment-tree with the addition of each link should be the same as the result of computing the assignment-tree as above for the completed inference-graph, however doing the latter explicitly will be much too inefficient to be practical in cases where the inference-graph has grown to good size.

One of the virtues of the assignment-tree algorithm is that it leads to an efficient procedure for updating the defeat-statuses of the nodes of the inference-graph in response to adding new support-links. When a link or set of links is added to the inference-graph, the only pre-existing nodes and links that can be affected are the inference/defeat-descendants of the support-link-targets of the new links. The latter concept is defined as follows:

The inference/defeat-descendants of a support-link consist of its target and all of the inference/defeat-descendants of its target; the inference/defeat-descendants of an inference-node consist of (1) all the consequent-links of the node and all the inference/defeat-descendants of those consequent-links, and (2) all the node-defeatees of the node and all the inference/defeat-descendants of those node-defeatees.

When new links are added, the changes to the inference-graph are confined to the new links and their inference/defeat-descendants. Call these the affected-nodes and affected-links. If the affected-nodes have no defeatees, we can just compute the assignments to the affected-nodes and affected-links at any point in the assignment tree at which they become computable, and add those assignments to the assignment-tree. Otherwise, we must update global-assignment-tree.

Updating a tree in response to adding a support-link is performed only if updating the lower-order trees has not changed anything. In updating a tree, it must first be determined whether its assignment assigns anything to affected-nodes or affected-links. If not, its triangle-sets are updated.

If these are unchanged, the updating procedure goes on to update the assignment-trees of the triangle-sets, and so on.

In updating a triangle-set, a check is made to determine whether any of the new links have computable statuses in the tree or whether any other affected-nodes or affected-links already occur in its domain. If neither of these conditions is satisfied, its assignment-trees are updated. But if some members of its domain are affected, the domain must be recomputed to be the set of inference/defeat-ancestors of the original domain. The new domain will contain some affected-nodes. Then the triangle-set must be recomputed from scratch and the old one replaced by the new one.

In updating an assignment-tree, let ass0 be the assignment to the unaffected-nodes and unaffected-links that are in the domain of the original assignment, and define closure to be the assignment-closure of ass0. The following possibilities exist:

If closure were inconsistent, then the new-links would have to render some of the arbitrary assignments inconsistent, in which case the domain of the enclosing triangle-set would contain affected nodes or links and so the recursion would not lead to this assignment-tree being updated. Hence we can assume that closure is consistent.

If closure makes the same assignments as the original assignment of the assignment-tree, then update the tree's triangle-sets. But if closure differs from the original assignment, redefine the assignment of the assignment-tree to be closure, and recompute the triangle-sets of the assignment-tree. If a triangle-domain is unchanged, then update the trees of that triangle-set. For triangle-domains that are different from the original ones, the triangle-sets must be computed from scratch.

Whenever one changes the assignment of an assignment-tree, one must change the list of defeating-assignment-trees for support-links whose assignments change, and recompute the undefeated-degrees-of-support of the support-link-targets and their inference-defeat descendants to reflect that change:

These observations produce the following process:
UPDATE-DEFEAT-STATUSES link

Let affected-nodes and affected-links consist of node and its inference/defeat-descendants. If every affected-node has an empty list of node-defeatees, compute the status-assignments for the affected-nodes and affected-links in the various subtrees of global-assignment-tree in which those status-assignments become computable, and insert the computed values into the subtrees. Otherwise, apply UPDATE-ASSIGNMENT-TREE to link, global-assignment-tree, affected-nodes and affected-links.

UPDATE-ASSIGNMENT-TREE link tree affected-nodes affected-links

Let assignment be the assignment of tree. If assignment does not assign statuses to any members of affected-nodes or affected-links other than link:
If link has a computable numerical status val relative to tree, let closure to be the assignment-closure of that assignment to link relative to tree. Redefine the assignment of tree to be the result of adding closure to assignment, and apply RECOMPUTE-TRIANGLE-SETS to link, tree affected-nodes and affected-links.
If link does not have a computable numerical status val relative to tree, apply UPDATE-TRIANGLE-SET to link, triangle-set, affected-nodes, affected-links, and tree for each triangle-set of tree.

Otherwise, let ass0 be the assignment to the unaffected-nodes and unaffected-links that are in the domain of assignment. Let closure be the assignment-closure of ass0 for the affected-nodes.
If closure agrees with assignment, apply UPDATE-TRIANGLE-SET to link, triangle-set, affected-nodes, affected-links, and tree for each triangle-set of tree.
Otherwise, redefine the assignment of the assignment-tree to be closure, and apply RECOMPUTE-TRIANGLE-SETS to link, tree affected-nodes and affected-links.

RECOMPUTE-TRIANGLE-SETS link tree affected-nodes affected-links

Recompute the triangle-domains of tree.
If a triangle-domain is unchanged, then apply UPDATE-TRIANGLE-SET to it (together with link, affected-nodes, affected-links, and tree).
For triangle-domains that are different from the original ones, replace the triangle-set by the result of applying COMPUTE-TRIANGLE-SET to the new domain and tree.

UPDATE-TRIANGLE-SET link triangle-set affected-nodes affected-links tree

If the domain of triangle-set does not contain any affected-links, and it does not contain any support-links having members of affected-nodes among their support-link-bases or support-link-defeaters, apply UPDATE-ASSIGNMENT-TREE to the assignment-trees of triangle-set (relative to node, affected-nodes, and affected-links). Otherwise:
Recompute the domain of triangle-set to be the set of inference/defeat-ancestors of the original domain.
Replace triangle-set in tree by a new triangle-set constructed by applying COMPUTE-TRIANGLE-SET to the new domain and the result of adding the assignment of tree to its ancestor assignments.

For use in connection with simple inference-graphs, the preceding processes can be modified as follows:
UPDATE-DEFEAT-STATUSES node If the list of node-defeatees of node is empty, compute defeat-statuses node and insert that into global-assignment-tree in the appropriate place. Otherwise, let affected-nodes consist of node and its inference/defeat-descendants. Then apply UPDATE-ASSIGNMENT-TREE to node, global-assignment-tree, and affected-nodes.

UPDATE-ASSIGNMENT-TREE node tree affected-nodes affected-links

Let assignment be the assignment of tree. If assignment does not assign statuses to any members of affected-nodes:
If node has a computable numerical status val relative to tree, let closure to be the assignment-closure of that assignment to node relative to tree. Redefine the assignment of tree to be the result of adding closure to assignment, and apply RECOMPUTE-TRIANGLE-SETS to node, tree and affected-nodes.
If node does not have a computable numerical status val relative to tree, apply UPDATE-TRIANGLE-SET to node, triangle-set, affected-nodes, and tree for each triangle-set of tree.

Otherwise, let ass0 be the assignment to the unaffected-nodes and unaffected-links that are in the domain of assignment. Let closure be the assignment-closure of ass0 for the affected-nodes.
If closure agrees with assignment, apply UPDATE-TRIANGLE-SET to node, triangle-set, affected-nodes, and tree for each triangle-set of tree.
Otherwise, redefine the assignment of the assignment-tree to be closure, and apply RECOMPUTE-TRIANGLE-SETS to node, tree and affected-nodes.

RECOMPUTE-TRIANGLE-SETS node tree affected-nodes

Recompute the triangle-domains of tree.
If a triangle-domain is unchanged, then apply UPDATE-TRIANGLE-SET to it (together with node,affected-nodes, and tree).
For triangle-domains that are different from the original ones, replace the triangle-set by the result of applying COMPUTE-TRIANGLE-SET to the new domain and the set consisting of assignment and ancestor-assignments.

UPDATE-TRIANGLE-SET node triangle-set affected-nodes tree

If triangle-set does not contain any affected-nodes in its domain, apply UPDATE-ASSIGNMENT-TREE to its assignment-trees (relative to node, triangle-set and affected-nodes). Otherwise:
Recompute the domain to be the set of inference/defeat-ancestors of the original domain.
Replace triangle-set in tree by a new triangle-set constructed by applying COMPUTE-TRIANGLE-SET to the new domain and the result of adding the assignment of tree to its ancestor assignments.

Updating defeat-statuses is initiated whenever a new support-link is constructed (by DRAW-CONCLUSION or DRAW-REDUCTIO-CONCLUSION, as discussed below), by executing UPDATE-BELIEFS:

UPDATE-BELIEFS link

UPDATE-DEFEAT-STATUSES link, letting affected-nodes be the inference-nodes that are inference/defeat-descendants of link.

COMPUTE-UNDEFEATED-DEGREES-OF-SUPPORT, letting new-beliefs be the list of nodes whose undefeated-degrees-of-support (i.e., defeat-statuses) increase as a result of this computation, and new-retractions be the list of nodes whose undefeated-degrees-of-support decrease as a result of this computation.

COMPUTE-INTEREST-GRAPH-DEFEAT-STATUSES using new-beliefs and new-retractions, letting altered-interests be the interest-graph nodes whose defeat-statuses change.

For each member S of new-beliefs, APPLY-OPTATIVE-DISPOSITIONS-TO S and APPLY-Q&I-MODULES-TO S.

DISCHARGE-ULTIMATE-EPISTEMIC-INTERESTS new-beliefs new-retractions, letting altered-queries be the list of queries whose query-answered-flags change value as a result.

RECOMPUTE-PRIORITIES using altered-interests and altered-queries, and reorder the inference-queue.

As indicated above, COMPUTE-UNDEFEATED-DEGREES-OF-SUPPORT can proceed in either of two ways, depending upon whether '(compute-undefeated-degrees-of-support-simply)' has been executed or '(compute-undefeated-degrees-of-support-complexly)' (the default) has been executed. In the former case, the undefeated-degree-of-support of a node is 0 if some subtree of assignment-tree assigns NIL to it; otherwise it is the minimum of the values assigned to it by subtrees of assignment-tree. Otherwise, the undefeated-degree-of-support of a node is taken to be the maximum of the strengths of the node-arguments none of whose links have any defeating-assignment-trees, or 0 if there are no such node-arguments.

By way of brief review, the monotonic reasoner is interest-driven. Reasoning forwards builds the inference-graph, and reasoning backwards builds the interest-graph. When the two graphs meet, interests are discharged, with the result that sequents that are of interest (as recorded in the interest-graph) are concluded and incorporated into the inference-graph. Queries posed by practical cognition form termini in the interest-graph. When such queries are answered, the agent does something with the answers. What the agent does is determined by the purpose of the query. This is accomplished by storing instructions for what to do with an answer along with the query in ultimate-epistemic-interests. Sometimes these instructions will produce new queries for insertion into ultimate-epistemic-interests and thereby initiate new backwards reasoning.

Interest comes in degrees, and so do the degrees-of-support for members of the inference-graph. In accordance with the weakest link principle, the degree-of-support for a support-link is the minimum of (1) the strength of the reason and (2) the maximal-degrees-of-support for the members of the link-basis. The maximal-degree-of-support for an inference-node is normally the maximum of the degrees of support for its support-links. Degrees of interest originate with the permanent members of ultimate-epistemic-interests. When new members of ultimate-epistemic-interests are produced, the instructions for producing them must also set their degrees of interest. Reasoning backwards from ultimate-epistemic-interests preserves the degree-of-interest. In general, if a sequent in the interest-graph is of interest for more than one reason (i.e., there are branches of the interest-graph leading from it to more than one query in ultimate-epistemic-interests), the degree-of-interest in the sequent is the minimum of the degrees of interest in the queries from which it derives. This indicates the minimal undefeated-degree-of-support an answer must have in order to satisfy (one source of) the interest.

A query in ultimate-epistemic-interests is only deemed to have been answered if the answer found has an undefeated-degree-of-support at least as great as the degree-of-interest in the query.

The basic control structure for these inference operations is the inference-queue. This is a queue of inferences (either backwards or forwards) waiting to be performed. The details of the ordering can be changed without changing the structure of the reasoner, but it is presumed that the ordering is sensitive to degrees of support and degrees of interest. This will be discussed in more detail below.

The basic data-structures used by epistemic cognition will be sequents, backwards and forwards reasons, the inference-graph, the lists of conclusions and processed-conclusions, the interest-graph, the inference-queue, and the list of ultimate-epistemic-interests.

Sequents will be ordered pairs <X,P> where X is the sequent-supposition and P is the sequent-formula. The sequent will generally be written in the form "P/X", which is often easier to read. Let us say that a sequent is concluded if and only if it is the node-sequent of some node of the inference-graph of kind "inference". A sequent can be concluded without being justified, because the node supporting it may be defeated. A sequent is justified to degree δ if and only if it is the node-sequent of a node of the inference-graph of kind "inference" whose undefeated-degree-of-support is δ. By the "principle of foreign adoptions", if a sequent has been concluded, it can automatically be used in inferences involving more inclusive suppositions, so it is also convenient to define a sequent Q/Y to subsume a sequent P/X if and only if P=Q and Y⊆X, and then say that a sequent is validated if and only if it is subsumed by some sequent that is concluded. In accordance with the principle of foreign adoptions, inferences will be from validated sequents rather than just from concluded sequents. I will say that a node of the inference-graph supports a sequent if and only if it is the node-sequent of that node, and the node validates a sequent P/X if and only if for some Y such that Y⊆X, P/Y is the node-sequent of that node.

The inference-graph

The inference-graph consists of a set of inference-nodes and support-links. A support-link is a data-structure encoding an inference, and has slots for the following information:

support-link-target—the inference-node supported by the link;

support-link-basis—the list of inference-nodes from which the inference is made;

support-link-rule—the reason licensing the inference; this can be either a substantive reason or a string naming a reason;

defeasible?—T if the inference is a defeasible one, and NIL otherwise;

support-link-defeaters—if the inference is defeasible, the set of inference-nodes having the syntactically appropriate form to defeat it (this ignores considerations of strength);

defeating-assignment-trees—the list of subtrees of the global-assignment-tree that assign 0 or "unassigned" to the support-link;

support-link-discount-factor—used in prioritizing reasoning, and discussed below in connection with the inference-queue;

discounted-link-strength—used in prioritizing reasoning, and discussed below in connection with the inference-queue;

support-link-nearest-defeasible-ancestors—defined below;

An inference-node N is a data-structure encoding the following information:

the node-sequent—in the most common case where N encodes the conclusion of an inference, this is the sequent inferred; in some cases N will encode nondoxastic input, specifically percepts and desires, and their contents will be encoded as sequents;

the node-kind—"inference", "percept", or "desire";

support-links—the support-links supporting the node;

node-justification—if the node has no support-links, this is a string describing its justification;

consequent-links—the list of support-links for which this node is a member of the support-link-basis;

old-undefeated-degree-of-support—the undefeated-degree-of-support prior to the last computation of defeat-statuses;

maximal-degree-of-support—the maximal strength of the support-links, used to verify that a node has adequate support for an interest-discharge (this will sometimes be abbreviated as "the strength of a node");

node-defeatees—the list of support-links L such that N is a node-defeater of L;

the undefeated-degree-of-support—the undefeated degree-of-support;

node-arguments—the list of arguments (lists of nodes and support-links) for N;

nearest-defeasible-ancestors—defined below;

answered-queries—the list of queries (see below) answered by the node;

generated-interests—if the node encodes a supposition, this is the list of interests generated from it;

generating-interests—if the node encodes a supposition, this is the list of interests that gave rise to the supposition;

cancelled-node—T if N has been cancelled, NIL otherwise;

discounted-node-strength—used in prioritizing reasoning, and discussed below in connection with the inference-queue;

processed?—T if the node has been processed (see below), NIL otherwise;

discharged-interests—lists the interests discharged by the conclusion;

interests-discharged?—T if the conclusion has been used to discharge interests, and NIL otherwise;

node-c-list—explained below;

processed-node-c-list—explained below;

node-queue-node—if the node is currently on the inference-queue, this lists the queue-node enqueing it;

enabling-interests—if the node is inferred by discharging interest-links, this is the list of resultant-interests of those interest-links;

node-arguments—the list of arguments for the node, and their strengths.

Using simple inference-graphs, the list of nearest-defeasible-ancestors of a node N is the list of the first defeasible nodes reached by working backwards along the support-links of N (or N itself if N is a defeasible node). In an and/or inference-graph a single node represents a set of nodes from a simple inference-graph, and accordingly, it must have a set of lists of nearest-defeasible-ancestors. The slot nearest-defeasible-ancestors holds that set of lists. This set of lists is computed as follows:

For each support-link L for N:

if L represents a defeasible inference, then {N} is the only member of the list of support-link-nearest-defeasible-ancestors of L;

otherwise, the union of each member of the crossproduct of the sets of nearest-defeasible-ancestors of the support-link-basis of L is inserted into the list of support-link-nearest-defeasible-ancestors of L.

The nearest-defeasible-ancestors of N is the union of the support-link-nearest-defeasible-ancestors for all support-links of N.

Figure 16:
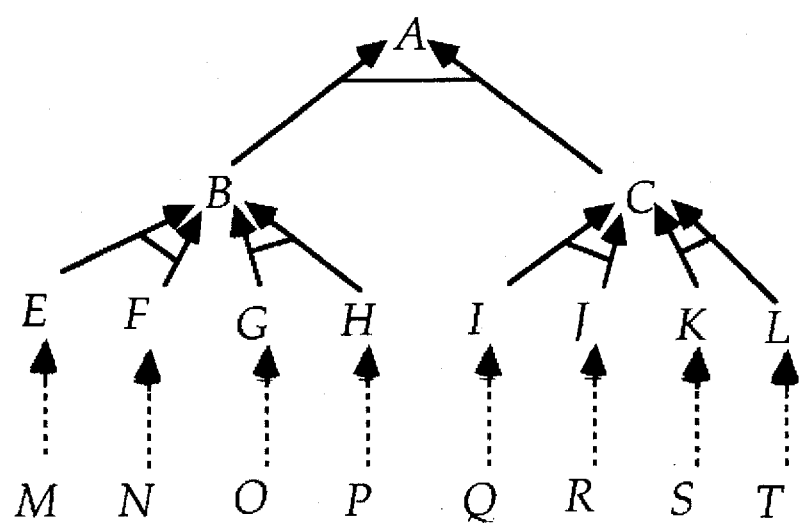
FIG. 16 is a generally diagrammatic view showing the nearest-defeasible-ancestors of a node.

For example, consider the inference-graph of FIG. 16. Dashed arrows indicate defeasible inferences and solid arrows indicate deductive inferences. Accordingly, the list of nearest-defeasible-ancestors for E is {{E}}, and similarly for F–L. The list of nearest-defeasible-ancestors for B is {{E,F},{G,H}}, and that for C is {{I,J},{K,L}}. Finally, the list of nearest-defeasible-ancestors for A is {{E,F,I,J},{E,F,K,L},{G,H,I,J},{G,H,K,L}}.

We can also define:

N is a deductive node if and only if the list of its nearest-defensible-ancestors is empty.

Conclusions and Processed-Conclusions

The set of inference-nodes will be stored in the list of conclusions, and inference rules will access that list rather than looking directly at the inference-graph. One complication arises for the appeal to conclusions. Consider a forwards-reason having multiple premises. For instance, suppose {P,Q} is a reason for R. Suppose P and Q are both on the inference-queue. If the reasoner retrieves P first, it will search the list of conclusions for Q, find it, and then make the inference to R. When it later retrieves Q from the inference-queue, if it searches the list of conclusions for P, it will find it, but one does not want the reasoner to repeat the inference to R. To avoid this, when the reasoner retrieves one premise from the inference-queue, in its search for the other premises, one only wants it to consider conclusions that have already been retrieved from the inference-queue. To achieve this, the reasoner will keep a separate list of processed-conclusions. A conclusion will be inserted into this list only when it is retrieved from the inference-queue.

In the interest of efficient search, conclusions and processed-conclusions are lists of indexed data structures rather than simple lists. They are characterized by lists of pairs <formula,conclusion-list> where formula is the sequent-formula of a node-sequent, and conclusion-list is the list of all conclusions whose node-sequents have that sequent-formula. It is more efficient, however, to replace the conclusion-lists by structures cared "c-lists", which encode the following information:

c-list-formula corresponding-i-list c-list-nodes link-defeatees—the list of interest-links (see below) defeated by the conclusions in the c-list.

The c-list for a formula is the unique c-list having that formula as its c-list-formula. The advantage of this approach is that in LISP one can keep a record in a node of the c-list in which the node is included, and as the node is updated by adding support-links, no changes have to be made to the c-list. This makes it easy to move back and forth between nodes and their c-lists.

The most costly operations performed in reasoning are searches through lists of inference-nodes and interests. In the method of the present invention, great effort has gone into minimizing search. The use of c-lists is one mechanism for doing this. When searching for an inference-node supporting a sequent, one first searches for the c-list-for the sequent-formula, and then one need only search the list of c-list-nodes of that c-list.

Another mechanism for minimizing search involves storing interests in similar structures called "i-lists", and to minimize the searches involved in discharging interest, whenever a c-list or i-list is constructed, the "corresponding" i-list and c-list involving the same formula is found (if it exists) and recorded in the slots "corresponding-i-list" and "corresponding-c-list". Once the corresponding i-list and c-list are found, the search never has to be repeated.

All searches are done by the functions C-LIST-FOR and I-LIST-FOR, and all insertions into conclusions and interests are done by the functions STORE-INFERENCE-NODE and STORE-INTEREST. Accordingly, only these functions will have to be modified if (as seems likely) conclusions and interests are subsequently modified to introduce more sophisticated indexing.

Ultimate-epistemic-interests

Querying epistemic cognition is done by inserting a query into ultimate-epistemic-interests. A query will be a data-structure encoding the following:

the query-formula—a formula expressing the question asked.

query-strength—the degree-of-interest, a number between 0 and 1.

query-queue-node—if the query is currently on the inference-queue, this lists the queue-node enqueing it.

deductive-query—T if the objective of the query is to determine whether the query-formula is deductively provable; NIL otherwise.

the positive-query-instruction—an instruction for what to do with an answer.

the negative-query-instruction—an instruction for what to do if an answer is withdrawn (explained below).

query-answers—the list of all inference-nodes whose node-sequents constitute answers to the query.

answered?—the "query-answered-flag"; this is T if any of the query-answers is justified to a degree greater than or equal to the degree-of-interest, NIL otherwise.

query-interest—the interest for the query-formula. Interests are discussed below.

There are two kinds of queries. Sometimes epistemic cognition is queried about whether something is true. In this case, the query-formula is a closed formula, and the query is a definite query. Sometimes epistemic cognition is asked to find something (anything) of a certain general sort (e.g., a plan). In this case, the query-formula contains free variables. For example, in instructing epistemic cognition to try to find a plan satisfying some condition C, the query-formula will be "x is a plan satisfying condition C", where x is a free variable. Such a query is an indefinite query. In the envisioned implementation, the query-formula for an indefinite query is constructed using a special quantifier: "(?x)φ". An answer to a definite query is an inference-node supporting the query-formula, and an answer to an indefinite query is an inference-node supporting an instance of the query-formula.

It can happen that an answer to a query is found, and the positive-query-instruction executed, but the answer is later retracted. In some cases there may be nothing that can be done about that. For example, if the answer led to the adoption and execution of a plan, there may be no way to take it back. If there is, that can be done by adopting another plan, using the same planning procedures. In special cases, there may be a predictable way of repairing or partially repairing the results of the mistake, and that can be built into the instructions accompanying the query. To accommodate this, the query is allowed to include instructions both for what to do when an answer is found—the positive-query-instruction—and for what to do if an answer is retracted—the negative-query-instruction. Either or both of these instructions can be omitted.

Some queries will be built into ultimate-epistemic-interests from the start, without having to be inserted by practical cognition. These will comprise the list of permanent-ultimate-epistemic-interests. Among the permanent-ultimate-epistemic-interests will be an interest in finding suitable goals. Here the interest is in finding situation types having positive expected likability. The instructions will be that when such a situation type is found, interest in finding minimally acceptable plans for achieving it is inserted into ultimate-epistemic-interests, and if the reasoner subsequently retracts the belief that a situation type has a positive expected likability, then the latter interest is withdrawn from ultimate-epistemic-interests.

In the doxastic implementation of practical reasoning in accordance with the methods of the present invention, the only way new ultimate epistemic interests are adopted is in response to instructions from queries already in ultimate-epistemic-interests. A general constraint on these instructions must be that whenever a new query is inserted into ultimate-epistemic-interests, this is done using the operation ADOPT-ULTIMATE-INTEREST. Let us say that a sequent is in interest if and only if it is the node-sequent of some interest-graph-node (see below). Then define:

ADOPT-ULTIMATE-INTEREST query

Insert query into ultimate-epistemic-interests.

For each inference-node C, if C answers query, insert C into the list of query-answers for query.

If some member of the list of query-answers for query is justified to a degree greater than or equal to the degree-of-interest in query:

Set answered? for query to T.

For each adequately justified inference-node C in the list of query-answers for query, perform the positive-query-instruction of query on the sequent-formula of the node-sequent of C.

Otherwise, set answered? for query to NIL.

If the query-formula of query is not already in interest, insert query into the inference-queue.

The details of inserting a query into the inference-queue will be discussed below.

The interest-graph

In the most general case, a backwards reason R has a list of forwards-premises, a list of backwards-premises, a desired-conclusion, and a list of variables to be used in pattern matching. If R is applicable to a desired-conclusion S, the reasoner matches S against the desired-conclusion, obtaining instantiations for some of the variables and thereby generating an interest-scheme <X,Y,S>. The reasoner then looks for ways of instantiating the forwards-premise schemes X so that they are validated by inference-nodes that have already been drawn and have the requisite undefeated-degree-of-support. A constraint on backwards reasons is that all the variables occur in the forwards premises and the conclusion, so once instances of the forwards-premises and the conclusion have been obtained, that uniquely determines the corresponding instance of the backwards-premises. Thus the reasoner obtains an instance $<X^*,Y^*,S>$ of R where the members of $X^*$ are validated by nodes having the requisite undefeated-degrees-of-support. The reasoner then reasons backwards and adopts interest in the members of $Y^*$.

Subsequently, when a new conclusion C is drawn, DISCHARGE-INTEREST-SCHEMES checks the interest-scheme $<X,Y,S>$ to see whether C can be used to instantiate some member of X, and if so whether the instantiation can be extended so that all members of X are instantiated to validated sequents. This yields a new instance $<X^{},Y^{},S>$ of R where, once again, the forwards-premises $X^{}$ are validated having the requisite undefeated-degrees-of-support, and then the reasoner reasons backwards and adopts interest in the members of $Y^{}$.

To implement the above reasoning, the interest-scheme $<X,Y,S>$ must be stored somewhere so that it can be accessed by DISCHARGE-INTEREST-SCHEMES. Along with it must be stored the list of variables remaining to be instantiated, and the undefeated-degrees-of-support required for validating instances. Accordingly, take an interest-scheme to be a data structure encoding the following information:

the instantiated-reason.

the instance-function—discussed below.

the forwards-basis—a list of formulas.

the backwards-basis—a list of formulas.

the instance-consequent—the sequent of interest.

the target-interest—the interest-graph node recording interest in the instance-conclusion.

the instance-variables—the set of variables to be used in finding instances of the forwards-basis by pattern matching.

the instance-strength—the degree of interest in the consequent, a number between 0 and 1.

instance-supposition—the sequent-supposition of the instance-consequent.

deductive-instance—T if the interest is in finding a deductive proof of the instance-consequent; NIL otherwise.

scheme-discharge—if the inference-rule involves discharging a supposition (e.g., conditionalization), this is the supposition to be discharged.

scheme-generating-node—if the interest scheme is generated by a supposition (as in conditionalization or reductio-ad-absurdum), this is the node encoding the supposition.

Reference to interest-schemes can be abbreviated by writing the septuple consisting of the values of the first seven slots. Interest-schemes to be accessed by DISCHARGE-INTEREST-SCHEMES will be stored in the list interest-schemes.

In most backwards-reasons, the list of forwards-premises is empty (i.e., they are "simple" backwards reasons). In that case, instantiating the reason-consequent uniquely determines the instantiation of the backwards-premises, and so no interest-schemes need be stored. The reasoner immediately adopts interest in the instantiated backwards-premises.

Reasoning backwards will build the interest-graph. The nodes of the interest-graph are either queries from ultimate-epistemic-interests or record sequents derivatively of interest. The latter will be referred to as "interests". The links either represent backwards reasons or connect sequents with queries for which they are answers. A link connects one node—the resultant-interest—with a list of sequents—the basis, in accordance with a backwards reason. The basis can be segregated into the forwards-basis and the backwards-basis, corresponding to the forwards-premises and backwards-premises of the reason. The members of the forwards-basis are already validated, so backwards reasoning begins with the resultant-interest and works backwards to the backwards-basis, adding its members to the interest-graph if necessary. Then further backwards reasoning from the backwards-basis will be initiated.

In the interest of efficiency, backwards reasoning from the backwards-basis will be done one element at a time. Only when an argument of adequate strength is found for the first element of the backwards-basis will the reasoner begin looking for an argument for the second member, and so forth. In this way, it will avoid expending its resources searching for arguments for some members when it is not possible to find arguments for other members.

When an argument is found for a member of the backwards-basis, the reasoner checks to see whether it is a deductive argument. A deductive argument is one in which none of the reasons employed are defeasible and no input states are used as premises, and no contingent premises are used. If the argument is deductive, the search for further arguments is cancelled. But if the argument is not deductive, then rather than cancelling the search for further arguments, the priority of the search is lowered.

To accommodate all of this, the interest-graph-links will be a set of links L encoding the following information:

the resultant-interest—the interest-graph node from which the backwards reasoning proceeds, or the query in ultimate-epistemic-interests for which the link records an answer.

the link-interests—the set of interests recording interest in members of the link-basis.

resultant-sequent—the interest-sequent of the resultant-interest.

resultant-formula—the sequent-formula of the resultant-sequent.

resultant-supposition—the sequent-supposition of the resultant sequent.

the link-basis—if the resultant-interest is a query, this is the unit set of a sequent that answers it; otherwise this is the potential basis for an inference to the interest-sequent of the resultant-interest, this being the union of the backwards and forwards premises of an instance of a backwards reason whose conclusion is that interest-sequent.

the link-rule—an indication of the rule of inference or substantive reason employed in such an inference, or "answer" if the resultant node is a query. In the latter case, the link is an "answer-link".

the basis-remainder—if the resultant-interest is not a query, this is the list of elements of the backwards-premises that (1) are not validated by any nodes of the inference-graph of strength greater than or equal to the degree-of-interest, and (2) for which interests have not yet been constructed; if the resultant-interest is a query, this is an answer not validated by any nodes of the inference-graph of strength greater than or equal to the degree-of-interest and for which an interest has not yet been constructed.

supporting-nodes—a list of inference-nodes (when the list is complete, it will be in the same order as the premises) validating the corresponding premises (backwards or forwards) and of adequate strength and satisfying any applicability-conditions for the premises.

link-defeaters—if the link-rule is defeasible, this is the pair of c-lists for the rebutting-defeater and undercutting-defeater for the inference described by the link. When the link is created, these c-lists are created with empty lists of c-list-nodes if they do not already exist.

the link-defeat-status—T if some inference-node in the c-list-nodes of one of the link-defeaters has a supposition contained in the resultant-supposition and a undefeated-degree-of-support greater than or equal to the degree-of-interest in the resultant-sequent; NIL otherwise. This represents a partial computation of defeat-status, proceeding just in terms of the validated members of the link-basis and the link-defeaters. It is used to lower the priority assigned to the backwards reasoning if L is defeated (according to this partial computation).

link-strength—the maximum-degree-of-interest conveyed by the link.

link-discharge—if the inference-rule involves discharging a supposition, this is the supposition to be discharged.

link-generating-node—if the link is generated by a supposition (e.g., in conditionalization), this is the node encoding the supposition.

cancelled-link-interests—the link-interests that have been obtained deductively and thereby cancelled.

pending-interest—the last adopted and only undischarged link-interest.

Interests will encode the sequents related by the interest-links. This will not be taken to include the queries from ultimate-epistemic-interests. Thus the interest-graph actually includes both the members of interests and the queries from ultimate-epistemic-interests. An interest will be a data structure encoding the following information:

the interest-sequent.

the interest-formula—sequent-formula of the interest-sequent.

the interest-supposition—sequent-supposition of the interest-sequent.

the right-links—the list of interest-graph-links in which the interest-sequent is a member of the link-basis.

the left-links—the list of interest-graph-links for which the present interest is the resultant-interest.

the degree-of-interest in the interest-sequent—a number between 0 and 1; for non-terminal nodes this is the minimum of the degrees of interest of the interests to which the given interest is linked by right-links.

the last-processed-degree-of-interest—if the reasoner has already attempted backwards reasoning from the interest-sequent with a lower degree-of-interest, this records that degree-of-interest.

the interest-defeat-status—NIL if the defeat-status of any of the right-links is NIL, T otherwise.

discharged-degree—the maximum degree of interest such that DISCHARGE-INTEREST-IN has been run on this interest with that maximal-degree-of-support. This is used in computing priorities.

deductive-interest—T if the objective of the interest is to find a deductive proof of the interest-sequent; NIL otherwise.

cancelled-interest—T if a deductive proof has been found for the interest-sequent; NIL otherwise.

interest-queue-node—if the interest is currently on the inference-queue, this lists the queue-node enqueing it.

interest-i-list—the i-list whose i-list-formula is the sequent-formula of the interest-sequent.

maximum-degree-of-interest—for interests having right links, this is the minimum of the degrees of interest of the nodes to which the given interest is linked by right-links; for other interests this is the degree-of-interest of the node.

interest-defeatees—if the node is of interest as a defeater for some inference-graph nodes, this lists those nodes.

generated-suppositions—the list of inference-nodes having the interest as a generating-interest.

generating-nodes—the list of inference-nodes encoding suppositions that give rise directly to the interest.

interest-priority—the interest-priority used in ordering the inference-queue.

Some nodes of the interest-graph will be termini. They represent the starting points for backwards reasoning rather than being for something else. These will be either queries from ultimate-epistemic-interests or interests in defeaters for defeasible inference steps performed by the reasoner. Terminal nodes are distinguished by having empty lists of right-links.

As in the case of inference-nodes, interests will be stored in the list interests, which is a list of i-lists. An i-list is a data structure encoding the following information:

i-list-formula.

corresponding-c-list—the c-list, if any, whose c-list-formula is the same as the i-list-formula.

i-list-interests—the list of interests in sequents having the i-list-formula as their sequent-formula.

i-list-queries—the list of queries in ultimate-epistemic-interests having the i-list-formula as their query-formula.

Reasons

Forwards-reasons will be data-structures encoding the following information:

reason-name.

reason-function—explained below.

reason-premises—a list of pairs <formula,applicability-condition>, where the applicability-conditions are constraints that must be satisfied by inference-nodes from which the inference is being made in accordance with the reason.

reason-conclusion—a formula.

reason-variables—the set of variables to be used in finding instances of the premises by pattern-matching.

defeasible-rule—T if the reason is a defeasible reason, NIL otherwise.

strength—a real number between 0 and 1.

discount-factor—a real number between 0 and 1, used in prioritizing reasoning involving the use of the forwards-reason.

One use of the applicability-condition in a premise is to check whether the sequent from which a forwards inference proceeds represents a desire, percept, or the result of an inference. The contents of percepts, desires, and inferences are all encoded as sequents, but the inferences that can be made from them depend upon which kind of item they are. For example, we reason quite differently from the desire that x be red, the percept of x's being red, and the conclusion that x is red. Appeal to the applicability-condition is the mechanism for making forwards-reasoning sensitive to this distinction. In the most familiar examples of forwards reasons, this is the only role played by the applicability-condition, but in principle the applicability-condition can be any kind of computable condition. In the discussion below of implementing reasoning in the propositional calculus and first-order logic, further uses of the applicability-condition will be illustrated. Normally, these will involve the imposition of syntactical constraints on the formulas to which inferences apply. The discount-factor will usually be 1, but by setting it lower we can lower the priority of reasoning using this reason. This will be illustrated below in connection with reasoning by reductio ad absurdum.

Reasons can be encoded in two different ways. In the simplest case, the reason-function slot is left empty. Then the reason is applied by pattern-matching. An instance of a forwards-reason will be an ordered pair of a list of premises and a conclusion resulting from (1) instantiating the reason-variables in such a way that the applicability-condition is satisfied and (2) (possibly) adding suppositions to all of the sequent-suppositions in such a way that the sequent-supposition of the consequent is the union of the sequent-suppositions of the premises. For example, the rule of simplification can be implemented as the following pair of reasons:

"simp1"

reason-function—NIL;

reason-premises—{<(P&Q),(λx)(the node-kind of x is "inference")>};

reason-consequent—P;

reason-variables—{P,Q};

defeasible-rule—NIL;

strength—1;

discount-factor—1.

"simp2"

reason-function—NIL;

reason-premises—{<(P&Q),(λx)(the node-kind of x is "inference")>};

reason-consequent—Q;

reason-variables—{P,Q};

defeasible-rule—NIL;

strength—1;

discount-factor—1.

An instance of simp1 would be, for example, <{<{A,B,C}, (D&E)>},<{A,B,C}, D>>.

However, pattern-matching is slow. Reason-functions provide a mechanism for compiling the pattern-matching, rendering the application of the reason more efficient. A reason-function is applied to inference-nodes and returns a list of triples <conclusion,basis,reason> where conclusion is the formula inferred, basis is the list of inference-nodes from which it is inferred, and reason is the reason justifying the inference. Using reason-functions, both forms of simplification can be combined into a single rule simp having the following reason-function:

(λc) (when the node-kind of c is "inference" (let p be the node-formula of c (when p is a conjunction (list (list (first-conjunct-of p) (list c) simp) (list (second-conjunct-of p) (list c) simp)))))

Backwards-reasons will be data-structures encoding the following information:

reason-name.

reason-function.

forwards-premises—a list of pairs <formula,applicability-condition>, where the applicability-conditions are constraints that must be satisfied by inference-nodes from which the inference is being made in accordance with the reason.

backwards-premises—a list of pairs <formula, <predicate1,predicate2>>, where predicate1 formulates a constraint that must be satisfied by an existing interest to which the backwards inference is being made in accordance with the reason, and predicate2 is a predicate which is applied to a new interest constructed for that purpose. The application of predicate2 should be such as to set the values of slots so that the resulting interest satisfies predicate1.

reason-conclusion—a formula.

reason-variables—the set of variables to be used in finding instances of the premises by pattern-matching.

defeasible-rule—T if the reason is a defeasible reason, NIL otherwise.

reason-condition—a condition that must be satisfied by the sequent of interest before the reason is to be deployed;

strength—a real number between 0 and 1.

discount-factor—a real number between 0 and 1, used in prioritizing reasoning involving the use of the forwards-reason.

reason-supposition—for rules like conditionalization that introduce new suppositions, this is the supposition introduced.

reason-length—the number of backwards-premises.

An instance of a backwards-reason will be an ordered triple of forwards-premises, backwards-premises, and conclusion, resulting from instantiating the reason-variables in such a way that the applicability-condition is satisfied and (possibly) adding suppositions to all of the sequent-suppositions in such a way that the sequent-supposition of the conclusion is the union of the sequent-suppositions of the premises. It will be assumed that backwards reasoning (and hence also discharging interest) accesses only inference-nodes of type "inference", so in most cases of backwards rules, the applicability-condition will be vacuous, which in LISP will be indicated by making it NIL.

The inference-queue

The inference-queue will enqueue inference-nodes encoding input states (which will be percepts resulting from perception, and primitive desires), new inference-nodes encoding the results of inferences, queries from ultimate-epistemic-interests, and new interests (interest-graph nodes). Accordingly, I will take the inference-queue to be an ordered list of data-structures called inference-queue-nodes, each encoding the following information:

the item enqueued—an inference-node, a query, or an interest-graph node;

the item-kind—an indication of whether the enqueued item is an inference-node, a query, or an interest-graph node;

item-complexity—discussed below;

discounted-strength -discussed below;

the degree-of-preference—discussed below.

The ordering of the nodes of the inference-queue will be done by the relation "x is i-preferred to y". Specifying this relation is part of the process of programming the invention. A simple preference relation that is used as the default appeals to two properties of the enqueued item. The first will be referred to as the "discounted-strength" of the item, and will be measured by a real number between 0 and 1. The discounted-strength of a desire is simply its desire-strength. The discounted-strength of a percept is its salience. The salience of a percept is treated as a primitive property whose value is specified by the perceptual input systems to which the method is attached. This may be treated in a more sophisticated way later. The discounted-strength of an inference-node of type "inference" will, in most cases, be measured by the undefeated-degree-of-support of the inference-node, but there are two complications. First, inference-nodes recording suppositions are generated by interests. For example, interest in a conditional will lead the reasoner to suppose the antecedent with the objective of inferring the consequent, and the supposition of the antecedent is recorded as an inference-graph node and an inference-node. The undefeated-degree-of-support of this inference-node will automatically be 1, but the priority assigned to reasoning from it should be a function of the discounted-strength of the generating interest. Accordingly, when an inference-node is generated by an interest, its discounted-strength will be taken to be the discounted-strength of the interest rather than the undefeated-degree-of-support. Second, it turns out to be desirable to give inferences in accordance with some inference rules (either backwards or forwards) low priority. This is accomplished by attaching a discount-factor (a real number between 0 and 1) to the rule, and using that to lower the degree-of-preference. Accordingly, the discounted-strength of an inference-node of type "inference" that is not generated by an interest will, in general, be the maximum (over its node-arguments) of the product of the discount-factor of the support-link-rule of the last support-link in the argument and the strength of the argument. The discounted-strength of an interest will be its interest-priority, which will be discussed below.

The second property to which the default preference relation appeals is "complexity". This is a measure of syntactic complexity, and the idea behind the preference ordering is that reasoning with simpler formulas is given precedence over reasoning with complex formulas. Accordingly, we define:

Where x is an enqueued item, strength is the discounted-strength of x, and complexity is the complexity of the sequent expressing the content of x, the degree-of-preference of x is strength/complexity.

The default preference relation is then:

x is i-preferred to y if and only if the degree-of-preference of x is greater than the degree-of-preference of y.

With one qualification, the default complexity measure simply counts the number of symbol tokens (not counting parentheses) occurring in the sequent expressing the content of the enqueued item. This has the effect of giving precedence to reasoning with short formulas. The qualification is that non-reductio-suppositions are not counted in computing complexity. (In first-order reasoning, they will only be ignored if they contain no free variables or skolem-functions.) The only justification that is offered for this complexity measure is that it seems to work reasonably well.

The discounted-strength of an interest is its interest-priority. To understand this concept, it must first be realized that degrees of interest play two roles. They determine how justified an answer must be for it to be an acceptable answer, and they prioritize reasoning. Initially, the priority of backwards reasoning is determined directly by the degree-of-interest. If something is of interest ultimately for answering a certain query, and an answer is obtained for that query, this lowers the priority of backwards reasoning from that interest, but does not lower the degree-of-interest itself (in its role of determining how good answers must be). So the interest-priority of an interest should be some function of (1) the degree-of-interest, (2) the discount-factor of the backwards reason used in its derivation, (3) whether the interest is ultimately aimed at answering a query none of whose query-answers are believed, (4) whether the interest derives from a defeated member of the interest-graph, and (5) whether the node-sequent is already supported by an inference-node whose undefeated-degree-of-support is greater than or equal to the degree-of-interest. The interest-priority must also be a number between 0 and 1. Supplying the exact definition of interest-priority will be part of the process of programming the method of the invention, but a default definition is included. This definition is the following:

The interest-priority of a query from permanent-ultimate-epistemic-interests is its degree-of-interest.

The interest-priority of any other query is $\alpha_0$ if it has already been answered, and its degree-of-interest otherwise.

The interest-priority of an interest-graph node having an empty set of right-links is $\alpha_0$ (this represents interest in a defeater for a defeasible inference);

The interest-priority of any other interest-graph node node is computed as follows. Let L be the set of its undefeated right-links having resultant-interests with maximum-degrees-of-interest greater than the maximum undefeated-degree-of-support at which they have been discharged. If L is empty, the interest-priority of node is $\alpha_0$; otherwise it is the maximum over L of the set of products of the discount-factor of the link-rule and the interest-priority of the resultant-interest.

$\alpha_0$ serves as a base-level of interest-priority used for reasoning from defeated nodes and used for the search for defeaters for inference-graph nodes. As long as $\alpha_0>0$, the reasoner will "eventually" get around to reasoning prioritized in this way, provided new environmental input does not continually delay it by inserting new items in front of it in the inference-queue. The higher the value of $\alpha_0$, the more effort the reasoner is apt to expend on these matters.

Epistemic cognition is performed by THINK:

THINK

If the inference-queue is nonempty, let Q be the first member of the inference-queue:

Remove Q from the inference-queue.

Let node be the item enqueued by Q if it is an inference-node:

insert node into the list of processed-conclusions.

REASON-FORWARDS-FROM node

Let query be the item enqueued by Q if it is a query, and let priority be its interest-priority:

REASON-BACKWARDS-FROM-QUERY query priority.

Let interest be the item enqueued by Q if it is an interest-graph node, and let priority be its interest-priority:

REASON-BACKWARDS-FROM interest priority.

FORM-EPISTEMIC-DESIRES-FOR interest.

Desires are enqueued as inference-graph nodes, and as such are used for forwards reasoning rather than backwards reasoning. This might seem surprising, but recall that desires function as forwards directed prima facie reasons for concluding that the desired state is a suitable goal.

Reasoning Backwards

Reasoning backwards begins by reasoning backwards from queries contained in ultimate-epistemic-interests. Reasoning backwards from a query consists of constructing an interest to record interest in the query-formula and then reasoning backwards from it:

REASON-BACKWARDS-FROM-QUERY query priority

Construct an interest N encoding interest in the query-formula, with a right-link L to query with the degree-of-interest degree equal to the degree-of-interest in query. Then:

REASON-BACKWARDS-FROM N priority.
    FORM-EPISTEMIC-DESIRES-FOR N.
        If N is validated by some inference-node C having undefeated-degree-of-support at least degree, place C in the list of supporting-nodes for L, and DISCHARGE-LINK L degree degree.

Backwards reasoning builds the interest-graph. It begins with interests recording interest in defeaters and recording queries from ultimate-epistemic-interests. Then it applies backwards reasons to generate interest-links. The left terminus of an interest-link will be a single interest which answers the query or a list of interests from which the resultant interest can be inferred (together with the forwards-premises) in accordance with some backwards-reason. Then the process will be repeated, generating new interest-links and new interests.

Figure 17:
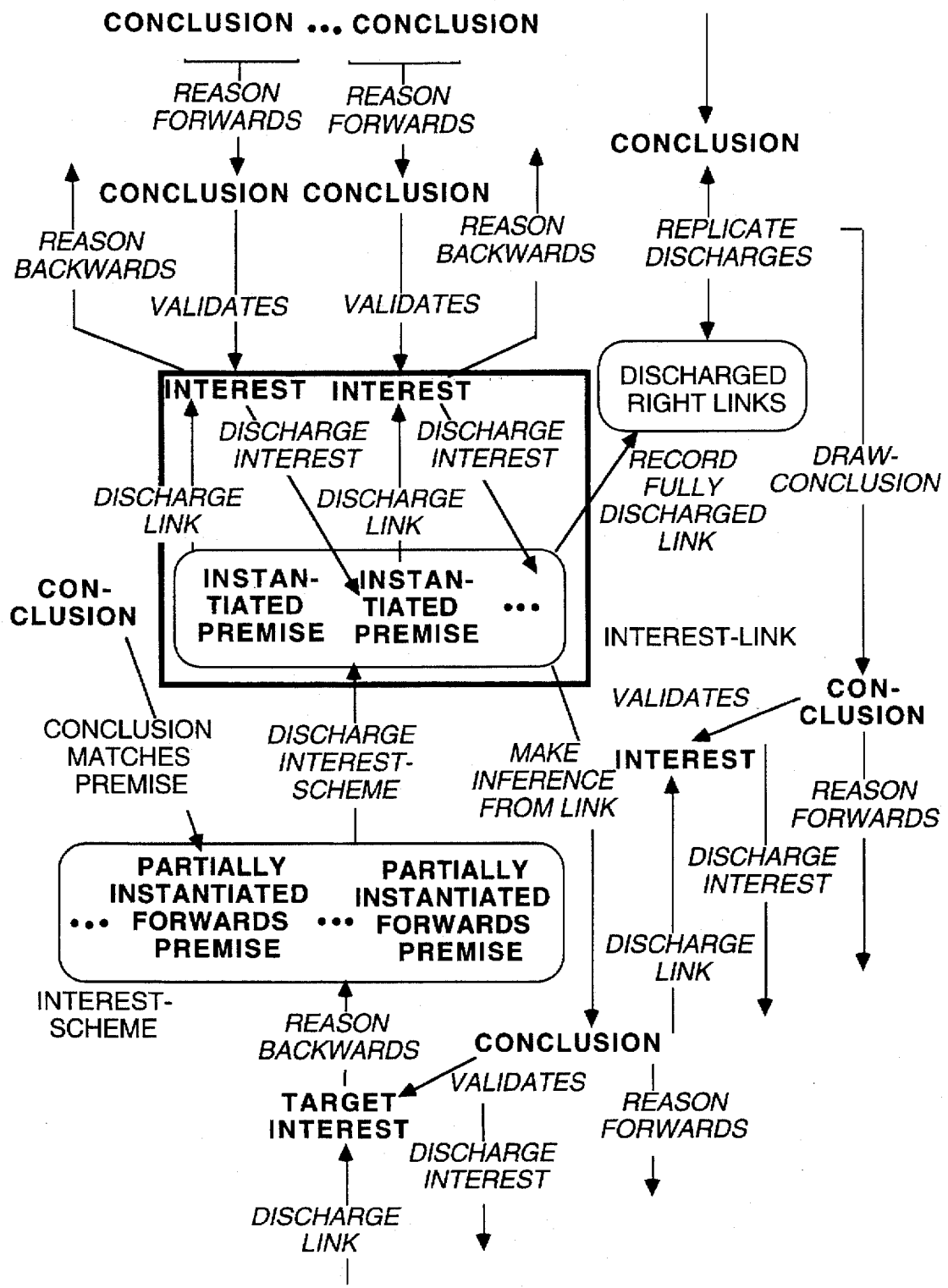
FIG. 17 is a generally diagrammatic view diagraming the structure of backwards reasoning and the discharge of interestlinks.

The structure of backwards reasoning is diagramed in FIG. 17. Beginning with a target interest in a sequent S, backwards reasoning will first find all backwards reasons that would allow the inference of S with a maximal-degree-of-support greater than or equal to the degree-of-interest. It uses these to build interest-schemes, which result from partially instantiating the premises of the reason so that the conclusion is identical with the interest-formula of the target-interest. Interest-schemes are recorded in the list interest-schemes. For each such interest-scheme, the reasoner searches for all combinations of inference-nodes that comprise instances of the forwards-basis (the partially instantiated forwards premises), and uses them to generate fully instantiated instances of the backwards reason. This is the process of "discharging an interest-scheme". The resulting instances are recorded as interest-links.

The resultant-interest from which the backwards reasoning is proceeding could itself be the left terminus of several different interest-links. In that case, the degree-of-interest for the node is the minimum of the degrees-of-interest in the resultant-interests of those links. This ensures that backwards reasons of use for inferring any of those resultant-interests will be considered. On the other hand, the interest-priority will be the maximum of the interest-priorities of the resultant-interests. That way, the reasoner assigns appropriate interest to answering important questions, and if it answers less important ones along the way, so much the better.

When a new left-link is constructed, the reasoner adopts interest in the members of the backwards-basis (the instantiated backwards premises). For the sake of efficiency, the reasoner will take these one at a time. The operation DISCHARGE-LINK is applied, with the result that the reasoner will adopt interest in the first member, deleting it from the basis-remainder, and initiating backwards reasoning from it. If an inference-node is found that validates the interest to an adequate degree of justification, it is "discharged" and the reasoner goes on to the next interest.

Taking interests one at a time prevents the reasoner from expending its resources looking for arguments for the later premises if no argument can be found for the earlier ones. Once all members of the basis-remainder are validated to an adequate degree of justification, then if the resultant node is an interest, its node-sequent will be inferred from the link-basis. This is handled by MAKE-INFERENCE-FROM-LINK. If instead the resultant node is a query, DISCHARGE-ULTIMATE-INTEREST will be applied to it.

Fully discharged links are recorded in the lists of discharged-right-links for each interest in the list of link-interests. This provides a mechanism for making further forwards inferences from them if new inference-nodes are obtained that validate the premises. The operation that does this is REPLICATE-DISCHARGES, and it will be discussed below.

Two things can happen when the reasoner adopts interest in a member of the basis-remainder. First, there might already be an interest recording interest in that sequent. In that case, the left-link is simply attached to it as a new right-link, and the degree-of-interest is recomputed. If the interest is still on the inference-queue, its interest-priority must also be recomputed. If the interest is no longer on the inference-queue, and the new link lowers its degree-of-interest, then it must be reinserted into the inference-queue and backwards reasoning from it reinitiated for those backwards reasons that were too weak to satisfy the original interest. Second, there might be no pre-existing interest recording interest in the sequent. In that case, we must consider two possibilities. (1) In most cases, the reasoner will not yet have found an argument supporting the sequent of interest. In this case, a new interest is constructed recording the interest, and it is inserted into the inference-queue. But (2), it could happen that the reasoner has already found an argument validating the sequent of interest (and recorded it in the inference-graph). If the argument is deductive, there is no point in proceeding with this interest. The reasoner should go on to the next member of the basis-remainder and adopt interest in it. But if the argument is not deductive, a new interest should be constructed just as if no argument had yet been found. The new inference-node should be placed on the inference-queue, but with low priority. That way, if the argument validating the sequent is subsequently defeated, the priority will be recomputed and backwards reasoning from it will occur in the normal way. As there is already an argument validating the sequent of interest, the reasoner will then go on to the next member of the basis-remainder and adopt interest in it, and so on.

REASON-BACKWARDS-FROM interest priority

Let sequent be the interest-sequent of interest, $\delta$ its degree-of-interest, and $\delta^*$ its last-processed-degree-of-interest.

For each backwards-reason R of strength at least $\delta$ but less than $\delta^*$, if interest is still uncancelled, find any interest-scheme <R,X,Y,sequent,interest,variables,$\delta$> from which sequent can be inferred. Then:

If the forwards-basis X is nonempty, insert the interest-scheme into interest-schemes.

For each instantiation X* of X such that all members of X* are validated by processed-conclusions with maximal-degree-of-support at least $\delta$, and max-degree is the maximum-degree-of-interest of interest, make an interest link link recording the instance X* of the interest-scheme <R,X,Y,sequent, interest,variables,$\delta$> and DISCHARGE-LINK link $\delta$ max-degree NIL (using priority to simplify the computation of interest-priorities).

For each auxiliary rule for backwards reasoning R, apply R to S.

Discharging a link is done first when the link is constructed, and subsequently when a new condition of adequate maximal-degree-of-support is drawn that validates an interest generated by the link. Discharging the link consists of looking for inference-nodes of adequate strength validating members of the basis-remainder, deleting those that are validated, and adopting interest in the first member remaining unvalidated. If this process empties the basis-remainder (renders the link "fully discharged"), then (1) if the link is an answer-link, the new inference-node is recorded as an answer to the query that is the resultant-interest of the link, and (2) otherwise, the resultant-sequent is inferred from all combinations of inference-nodes validating the premises. When a member of the basis-remainder is deleted, the link is removed from the list of right-links of the corresponding interest, and when all right-links are removed from an interest, it is ignored in further interest discharges. If the interest is readopted for a new reason, and that raises the maximum-degree-of-interest, then it will once again become a candidate for interest-discharge.

Suppose an inference-node is constructed that validates a premise, resulting in its being deleted from the basis-remainder. Later, another inference-node might be constructed that also validates that premise. If the link is not yet fully discharged, then if the link subsequently becomes fully discharged, the new inference-node will be used as well as the original one in making inferences in accordance with the link. But if the link is already fully discharged when the new inference-node is drawn, there must be some mechanism for making inferences from the new inference-node in accordance with the link. That can no longer be done by DISCHARGE-LINK, because that does nothing if the basis-remainder is empty. Instead, the present invention employs a mechanism for "replicating discharges". When a link becomes fully discharged, all combinations are found of inference-nodes of adequate strength that validate the premises and satisfy any applicability-conditions. Inferences are then made from these inference-nodes. In addition, the link is stored in the list of discharged-fight-links for each of the link-interests. REPLICATE-DISCHARGES is subsequently applied to a new inference-node by looking at the discharged-right-links for each interest in the corresponding-i-list of its c-list. If the new inference-node is of adequate strength and has an appropriate supposition, then the previous inference is replicated using the new inference-node.

DISCHARGE-LINK link $\delta$ max-degree pending-interest (using priority, if available, to simplify the computation of interest-priorities):

If the basis-remainder of link is empty:
Remove link from the list of right-links of all its link-interests and cancelled-link-interests and place it instead in the list of discharged-right-links for the link-interests and cancelled-link-interests.
If the link-rule of link is "answer", then record the single inference-node in the list of supporting-nodes for link as an answer to the query that is the resultant-interest of link, and discharge that ultimate-epistemic-interest.
Otherwise, MAKE-INFERENCE-FROM-LINK link.

If the basis-remainder of link is nonempty, and pending-interest is either NIL or equal to the pending-interest of link:
Let S be the sequent from the first member of the basis-remainder of link, and let condition be the condition from the first member of the basis-remainder of link.
Delete the first member from the basis-remainder.
If condition is empty, let deductive-node be the first deductive inference-graph node (if any) whose node-formula is the sequent-formula of S and whose node-supposition is a subset of the sequent-supposition of S. Otherwise, let deductive-node be NIL.
If there is already an interest interest in S and satisfying the condition condition:
Add link to the list of right-links of interest.
If deductive-node is not NIL, add interest to the list of cancelled-link-interests of link.; otherwise, add interest to the list of link-interests of link.
Make interest the pending-interest of link.
Recompute the degree-of-interest, the interest-priority, and the maximum-degree-of-interests for interest.
If interest is not on the inference-queue, and adding link has lowered interest's degree-of-interest, then reinsert interest into the inference-queue.
If S is not already in interest, construct an interest interest recording interest in S, with link as its sole right-link, make interest the pending-interest of link, and insert interest into the inference-queue. If deductive-node is not NIL, add interest to the list of cancelled-link-interests of link.; otherwise, add interest to the list of link-interests of link.
If deductive-node is non-NIL let conclusion be deductive-node. Otherwise, if there is a node whose node-formula is the same as the interest-formula of interest, whose node-supposition is a subset of the interest-supposition of interest, it satisfies the discharge-condition of interest, and its maximal-degree-of-support is at least $\delta$, then, let it be conclusion. If conclusion exists:
DISCHARGE-LINK link $\delta$ max-degree pending-interest (using priority, if available, to simplify the computation of interest-priorities).
If deductive-node exists, CANCEL-INTEREST-IN interest relative to the protected-node deductive-node.
Otherwise, for any generated-suppositions sup of interest which are such that conclusion is deductive in sup, CANCEL-NODE sup conclusion.

MAKE-INFERENCE-FROM-LINK link.
Find all lists B of inference-nodes of adequate strength, validating the members of the link-basis, satisfying the discharge-conditions of the corresponding link-interests:
For each such B, where discharge is the link-discharge of link and R is the link-rule, let formula be the interest-formula of the resultant-interest of link, and DRAW-CONCLUSION formula B R discharge.

Some backwards-reasons will instruct the reasoner to make a new supposition. For example, conditionalization instructs the reasoner that if it is interested in a conditional $(P \rightarrow Q)$, it is to suppose P and try to infer $Q/\{P\}$. Supposing P consists of constructing an inference-graph node for the sequent $P/\{P\}$, storing it in conclusions, and inserting it into the inference-queue. The List of node-arguments for the new node will be $\{<NIL,1>\}$.

Reasoning Forwards

Reasoning forwards consists of three operations. First, new inference-nodes are used to instantiate forwards-reasons, and inferences made on that basis. Second, new inference-nodes are used to instantiate the forwards-premises of interest-schemes, thereby producing new interest and interest-links for use in backwards reasoning. These first two kinds of inference are performed when the inference-node is retrieved from the inference-queue. Third, new inference-nodes are used to discharge interests that they validate. This operation is performed immediately upon producing the new inference-node rather than waiting until it is retrieved from the inference-queue. This allows one interest-discharge to lead immediately to another, and thereby allows the reasoner to rapidly discharge an entire chain of backwards reasoning and get back to the queries that initiated it, without having to perform a lot of unrelated reasoning that might be interspersed on the inference-queue. The forwards reasoning that is performed when an inference-node is retrieved from the inference-queue is performed by REASON-FORWARDS-FROM. The forwards reasoning that is performed immediately upon producing a new inference-node is performed by DRAW-CONCLUSION.

REASON-FORWARDS-FROM node
    APPLY-FORWARDS-REASONS node.
    DISCHARGE-INTEREST-SCHEMES node.
    For each auxiliary rule R for forwards reasoning, apply R to node.

Auxiliary rules are included for the sake of generality. These are rules that are triggered by adopting new inference-nodes but do not simply make inferences from the new inference-nodes. An example will be given in the discussion of first-order logic. We will also allow auxiliary rules for backwards reasoning.

APPLY-FORWARDS-REASONS node
    For each forwards-reason R, if there is a list nodes such that (1) node is in nodes, (2) the other members of nodes are in processed-conclusions, (3) the members of nodes satisfy the applicability-conditions of R, and (4) where B is the list of node-formulas of the members of nodes, <B,P> is an instance of R, then DRAW-CONCLUSION P nodes R.

DRAW-CONCLUSION is the operation that records the result of a forwards inference in new inference-graph nodes, and performs whatever subsidiary operations we want to immediately apply to these nodes. These operations consist of (1) constructing the inference-node supporting the node-sequent and the c-list for the node-formula, if these do not already exist, (2) if the inference-node is newly-constructed, determining and recording what queries, if any, are answered by it, (3) deleting logically-weaker subsumed nodes (see below) from the databases used by the reasoner, (4) recomputing defeat-statuses and inference-queue priorities, and (5) if the inference-node is either newly-constructed or its maximal-degree-of-support increases as a result of adding the new nodes to its node-list, it is used to discharge interests that it is now but was not previously strong enough to satisfy.

In forwards reasoning, care must be taken to block circular reasoning, wherein an inference-node is inferred from a node that was itself inferred from a node supporting that same inference-node. Let us define:
    Where S is a sequent, an inference-node N is independent of S (S-independent for short) if and only if S is not subsumed by any ancestor of N.

Let us also define:
    N is logically stronger than M if and only if N is not defeasible and the list of nearest-defeasible-ancestors of N is subset of the list of nearest-defeasible-ancestors of M.

Then:
DRAW-CONCLUSION P B R discharge (optional-argument: interest)

If no member of B is cancelled, let sup be the union of the node-suppositions of the members of B, less discharge, and let S be the sequent <sup,P>. If S has not been validated deductively, and all members of B are S-independent:
    If R is not defeasible, let NDA be the set of unions of the crossproducts of the sets of nearest-defeasible-ancestors of members of B*, and otherwise let NDA be NIL.
    If either R is defeasible or not SUBSUMED S NDA:
        If there is an inference-node of kind "inference" supporting S, let node be that inference-node.
        Otherwise, construct a new inference-node node supporting S.
        If node is a deductive-node, and interest is not NIL, add interest to the list of enabling-interests for node.
        Build a support-link link recording the inference of node from B in accordance with R, construct the set of new non-circular arguments this produces for node and its inference-descendants, and recompute the lists of node-ancestors and nearest-defeasible-ancestors for the inference-descendants.
    If the preceding step does produce new arguments for node:
    ADOPT-INTEREST-IN-DEFEATERS-FOR link.
    Record link as a support-link for node.
    If node is newly constructed, add it to the inference-graph and store it in the list of conclusions
    If R is defeasible, add {node} to the list of nearest-defeasible-ancestors of node; otherwise append NDA to the list of nearest-defeasible-ancestors of node.
    CANCEL-SUBSUMED-LINKS link.
    If node is either newly-constructed, or its maximal-degree-of-support has increased as a result of adding this support-link, let old-degree be the old maximal-degree of support for node:
        Let i-list be the corresponding i-list of the conclusion-c-list of node.
            If node is either newly-constructed, or its maximal-degree-of-support has increased as a result of adding this support-link, DISCHARGE-INTEREST-IN-DEFEATERS node i-list old-degree
        UPDATE-BELIEFS link.
        If S was not previously concluded, insert node into the inference-queue.
        If node already existed but this inference increases the maximal-degree-of-support of node, ADJUST-SUPPORT-FOR-CONSEQUENCES node old-degree
        If node is either newly-constructed, or its maximal-degree-of-support has increased as a result of adding this support-link, DISCHARGE-INTEREST-IN node i-list old-degree interest
        Set the old-undefeated-degree-of-support of node to be the undefeated-degree-of-support of node.

In the preceding, a non-circular argument for node consists of support-links none of whose bases contains a node whose node-sequent subsumes that of node.

There is no reason to have multiple deductive subarguments deriving an inference-node from a set of defeasible nodes. This amounts to having multiple deductive support-links for a single node each contributing the same sets of nearest-defeasible-ancestors. More generally, there is no need to add a deductive support-link to an existing node when, for every set of nearest-defeasible-ancestors contributed by the support-link, the node already has a set of nearest-defeasible-ancestors that is a subset of it. This is accommodated by the "not SUBSUMED" restriction in DRAW-CONCLUSION, which precludes creating new support-links violating this restriction, and the operation CANCEL-SUBSUMED-LINKS, which eliminates preexisting support-links violating this restriction:

SUBSUMED S NDA

Let P be the sequent-formula of S. Let c-list be the c-list-for P. If there is such a c-list, then for some c-list node node of c-list, (1) for every set X in NDA there is a set Y in the list of nearest-defeasible-ancestors of node such that Y $\subseteq$ X, and (2) the node-supposition of node is a subset of the sequent-supposition of S.

CANCEL-SUBSUMED-LINKS link

If link is a deductive support-link:
Let P be the node-formula of the support-link-target of link. Let c-list be the c-list-for P. If there is such a c-list, then for every c-list node node* of c-list, for every deductive support-link link*, if for every set X in the support-link-nearest-defeasible-ancestors of link* there is a set Y in the support-link-nearest-defeasible-ancestors of link such that Y$\subseteq$X, delete link* from the list of support-links for node*, adjusting the node-arguments and nearest-defeasible-ancestors for node* and its inference-descendants, and if this deletes all the support-links for node*, cancel-node node*.

In searching for defeaters for a defeasible inference, the reasoner should (1) be alert for defeaters for any argument (regardless of strength) in which the inference is used, and (2) minimize the priority of the search. This can be accomplished by taking the degree-of-interest in defeaters to be 0 and the interest-priority to be $\alpha_0$. Given a defeasible inference in a sequent $<X,P>$ from a list of sequents $<X_1,Q_1>$, . . . $<X_n,Q_n>$, the rebutting defeater is the sequent $<X,\neg P>$ and the undercutting defeater is the sequent written as $<X,((Q_1 \& \ldots \& Q_n) @ P)>$.

ADOPT-INTEREST-IN-DEFEATERS-FOR S B R new-nodes

If R is a defeasible reason, insert an interest in the rebutting defeater and the undercutting defeater for the inference from B to S into the inference-queue, taking the degree-of-interest to be 0 and the interest-priority to be $\alpha_0$.

Find any existing defeaters for the members of new-nodes, and record them in the lists of node-defeaters and node-defeatees for the respective nodes.

If S is inferred via a Q&I module, adopt interest in defeaters for that inference.

When a new support-link is added to an existing node, that can increase its maximal-degree-of-support, and those for it node-consequences, and the node-consequences of the node-consequences, and so on recursively. These changes are computed by ADJUST-SUPPORT-FOR-CONSEQUENCES. Furthermore, each time this increases the maximal-degree-of-support for a node, DISCHARGE-INTEREST-IN-DEFEATERS, and DISCHARGE-INTEREST-IN, must be run for the new maximal-degree-of-support to catch any discharges that could not be performed for the previous maximal-degree-of-support but can now be performed. If the node is a processed-conclusion, DISCHARGE-INTEREST-SCHEMES must also be run. (This difference reflects the fact that DISCHARGE-INTEREST-IN is applied to inference-nodes immediately upon creation, while DISCHARGE-INTEREST-SCHEMES is only applied to inference-nodes when they are retrieved from the inference-queue).

Discharging interest in a new inference-node consists of finding interests validated by the inference-node, and discharging their right links. However, as was noted in the discussion of DISCHARGE-LINK, earlier inference-nodes might have resulted in a link becoming fully discharged, in which case the interest-discharge can no longer be accomplished by applying DISCHARGE-LINK. Instead, the results of the previous discharge are stored in the lists of discharged-right-links for the link-interests, and then REPLICATE-DISCHARGES will be applied to the new inference-node.

Cancellation rules are very important in the method of the present invention. These prevent the reasoner from performing reasoning that is no longer of use. DISCHARGE-INTEREST-IN and DISCHARGE-LINK both apply two cancellation rules. First, if an interest is established deductively, then there is no reason to seek further arguments for it, so it is removed from the list of interests. Second, let us say that one node is deductive-in a second node if the first node is a node-ancestor of the second, and the first node and every inference-ancestor of it having the second node as an inference-ancestor is obtained by making a deductive inference. In other words, the first node is deductive-in the second if and only if the second is used in reasoning to the first, and all such reasoning is deductive. If an interest generates a supposition, and the interest is subsequently obtained by an argument that is deductive-in that supposition, then that supposition has served its purpose and there is no reason to pursue further reasoning from it. This is accomplished by cancelling the node recording the supposition. (The details of cancelling a node will be discussed below).

In the following new? is T if and only if node is newly-constructed, and if node is not newly-constructed then old-degree is its previous maximal-degree-of-support, and i-list is the corresponding-i-list of the node-c-list for node:

DISCHARGE-INTEREST-IN node i-list old-degree new? (optional-argument: interest)

If either new? is T or the maximal-degree-of-support of node is greater than old-degree:
Let $\delta$ be the maximal-degree-of-support of node.
REPLICATE-DISCHARGES node $\delta$.
For each interest N in the list of i-list-interests of i-list, if N is interest, or (1) either new? is T, or the maximal-degree of support of node is greater than old-degree, (2) the degree-of-interest of N is less than or equal to $\delta$, (3) node satisfies the discharge-condition of N, and (4) node validates the node-sequent of N, then:
for all right-links link of N, if the degree of interest in the resultant-interest of link is less than or equal to $\delta$, and either new? is T or the link-strength of link is greater than old-degree:
If the link-rule of link is "answer" (i.e., it is a link to a query), add node to the list of supporting-nodes of link and DISCHARGE-LINK link.
If node is a deductive-node, move N from the list of link-interest of link to the list of cancelled-link-interests, and DISCHARGE-LINK link.
Otherwise, DISCHARGE-LINK link.
If node was established deductively, CANCEL-INTEREST-IN N node.
Otherwise, if the node-supposition of conclusion is a subset of the interest-supposition of interest, then for any generated-suppositions sup of interest which are such that node is deductive in sup, CANCEL-NODE sup node.

This pseudo-code implements an important observation. When the reasoner makes an inference from a link, the resulting conclusion is guaranteed to discharge the resultant-interest of the link. In that case, the resultant-interest is passed to DRAW-CONCLUSION as a new argument, and that argument is in turn passed to DISCHARGE-INTEREST-IN. The latter can then assume that the conclusion is appropriately related to that particular interest to discharge it.

DISCHARGE-INTEREST-IN-DEFEATERS node i-list old-degree

Let $\delta$ be the maximal-degree-of-support of node.

For each interest N in the list of i-list-interests of i-list, if the degree-of-interest of N is less than or equal to & the maximal-degree-of-interest for N is greater than old-degree, and node validates the node-sequent of N, then:
For each interest-defeatee L of N, add node to the list of node-defeaters of L and add L to the list of node-defeatees of node.

REPLICATE-DISCHARGES node degree

For each interest N of the corresponding-i-list of the node-c-list of node, if node and N have appropriately-related suppositions then for each discharged-right-link link of N, if it is not an answer-link and degree is greater than or equal to the link-strength, then for all lists B of nodes of adequate strength, validating the remaining members of the link-basis:

Let formula be the interest-formula of the resultant-interest of link, and apply DRAW-CONCLUSION to formula, the basis consisting of adding node into B, the link-rule, and the link-discharge.

CANCEL-INTEREST-IN N protected-node

Remove N from its i-list, and if this empties the list of i-list-interests, remove the i-list from the list of interests.

Set the value of the slot cancelled-interest for N to T.

If node records a generated-suppositions of N, CANCEL-NODE node protected-node.

If N is on the inference-queue, delete it from the inference-queue.

For each interest-scheme S whose instance-consequent is the node-sequent of N, delete S from interest-schemes.

For all left-links L for N, delete L from the interest-graph, and for each link-interest M of L, move L from the list of right-links of M to the list of discharged-right-links of M.

For each of those link-interests M, if no right-links remain, CANCEL-INTEREST-IN M protected-node.

CANCEL-NODE node protected-node

If node$\neq$protected-node, set the value of the slot cancelled-node for node to T.

If N is a generated-interest of node that are not also generated in some other way ("unanchored interests"), CANCEL-INTEREST-IN N protected-node.

If N is a generated-interest of node, remove node from the list of generating-nodes of N.

If N is a generating-interest of node, remove node from the list of generated-suppositions of N.

If node$\neq$protected-node, remove node from the list of c-list-nodes of its c-list, and if this empties the list of c-list-nodes, remove the c-list from conclusions and set the corresponding-c-list for the corresponding-i-list to NIL.

If node$\neq$protected-node, remove node from the list of c-list-nodes of its processed-node-c-list, and if this empties the list of c-list-nodes, remove the c-list from processed-conclusions If node* is a node-consequence of node and node*$\neq$protected-node, CANCEL-NODE node* protected-node.

If node is still on the inference-queue, remove it.

DISCHARGE-INTEREST-SCHEMES node old-degree

Let S be the node-sequent of node and let $\delta$ be its maximal-degree-of-support.

For each interest-scheme $<R,X,Y,sequent,interest, variables,\delta^*>$ stored in the list interest-schemes, if $\delta \geq$ old-degree and S is an instance of one of the forwards-premises in X, and that instantiation can be extended to an instantiation $X^*$ of the forwards-basis such that all members of $X^*$ are validated with maximal-degree-of-support greater than old-degree, let $\delta^*$ be the minimum of $\delta$ and these degrees-of-support and MAKE-AN-INTEREST-LINK-RECORDING the instance $X^*$ of $<R,X,Y,sequent,interest,variables,\delta^*>$.

Recall that UPDATE-BELIEFS is as follows:

UPDATE-BELIEFS link

UPDATE-DEFEAT-STATUSES link, letting altered-nodes be the inference-nodes that are inference/defeat-descendants of link.

COMPUTE-UNDEFEATED-DEGREES-OF-SUPPORT, letting new-beliefs be the list of nodes whose undefeated-degrees-of-support (i.e., defeat-statuses) increase as a result of this computation, and new-retractions be the list of nodes whose undefeated-degrees-of-support decrease as a result of this computation.

COMPUTE-INTEREST-GRAPH-DEFEAT-STATUSES using new-beliefs and new-retractions, letting altered-interests be the interest-graph nodes whose defeat-statuses change.

For each member S of new-beliefs, APPLY-OPTATIVE-DISPOSITIONS-TO S and APPLY-Q&I-MODULES-TO S.

DISCHARGE-ULTIMATE-EPISTEMIC-INTERESTS new-beliefs new-retractions, letting altered-queries be the list of queries whose query-answered-flags change value as a result.

RECOMPUTE-PRIORITIES using new-beliefs, new-retractions, altered-interests and altered-queries, and reorder the inference-queue.

Optative dispositions are implemented as functions, and applying them just consists of applying the functions to S.

Applying Q&I modules is more complex. They function in much the same way as prima facie reasons, but there are some important differences. First, they are applied only to beliefs (nodes having nonzero undefeated-degrees-of-support), not to defeated nodes. Second, the basis for a node drawn with a Q&I module is not recorded along with the node. That is often part of the point of Q&I modules. So when a node is drawn by applying a Q&I module to a new belief, it will be recorded in an inference-graph node having an empty list of support-links, and the node-justification will be recorded as "Q&I". The reasoner should adopt interest in defeaters just as in the case of prima facie reasons, but there is again a complication. As the node-basis is empty, the undercutting defeater cannot be constructed as a formula of the form "basis @ node". Instead we must simply stipulate that undercutting defeaters are of the form P is believed on the basis of a Q&I module under circumstances of type C, and the probability of P being true given that it is believed on the basis of a Q&I module under circumstances of type C is insufficiently high for the belief to be justified.

(This is left unimplemented in the LIST implementation because it is pointless without further user-supplied reason-schemas enabling reasoning about probabilities.) With this understanding, we have:

APPLY-Q&I-MODULES-TO node

Apply each Q&I module to node to construct inferable sequents S, and then DRAW-CONCLUSION S Ø "Q&I".

DISCHARGE-ULTIMATE-EPISTEMIC-INTERESTS new-beliefs new-retractions

For each node C in new-beliefs and each query Q in ultimate-epistemic-interests, if C is in the list of query-answers for Q and the undefeated-degree-of-support of C is now greater than or equal to the degree-of-interest of query but was not previously:
Perform the positive-query-instruction of Q on C.
Set the query-answered-flag for Q to T.

For each node C in new-retractions and query Q in ultimate-epistemic-interests, if C is in the list of query-answers for Q and the undefeated-degree-of-support of C was greater than or equal to the degree-of-interest of query but is no longer:
Perform the negative-query-instruction of Q on C.
If no members of the list of query-answers for Q are believed, set the query-answered-flag for Q to NIL.

RECOMPUTE-PRIORITIES new-beliefs new-retractions altered-interests altered-queries Let affected-nodes and affected-interests be all the inference-nodes and interests whose discounted-node-strengths and interest-priorities are affected by changing the undefeated-degrees-of-support of the new-beliefs and new-retractions, the interest-priorities of altered-interests, and the answered-status of altered-queries. If any members of affected-nodes and affected-interests are still on the inference-queue, recompute their degrees of preference and reorder the inference-queue.

EXAMPLES

In the preceding paragraphs, the general architecture of the invention has been described, and default definitions have been provided for such concepts as i-preference. Programming the invention consists of supplying arrays of reason schemas, permanent ultimate epistemic interests, setting the value of $\alpha_0$, and (optionally) replacing some of the default definitions. In applying the method of invention to reasoning problems, one will typically want the system to employ both substantive reasons (which may vary from problem to problem) and logical inference rules (which will tend to remain constant from problem to problem.) The following is a simple example of the application of the present invention to a problem in which logical inference rules are not used:

```
This is a case of collective defeat.
Given premises:
    P justification = 1
    A justification = 1
Ultimate epistemic interests:
    R interest = 1
    FORWARDS PRIMA FACIE REASONS
        pf-reason 1: {P} ||=> Q strength = 1
        pf-reason 2: {Q} ||=> R strength = 1
        pf-reason 3: {A} ||=> B strength = 1
    BACKWARDS PRIMA FACIE REASONS
        pf-reason 4: { } {C} ||=> ~R strength = 1
        pf-reason 5: { } {B} ||=> C strength = 1
# 1 P
given
maximal-degree-of-support: 1
undefeated-degree-of-support: 1
#2 A
given
maximal-degree-of-support: 1
undefeated-degree-of-support: 1
```

Retrieving #<Query #1: R> from the inference-queue.
    # 1
    interest: R
    This is of ultimate interest Retrieving #<Node 2> from the inference-queue.
    # 2
    interest: (A @ B)
    Of interest as defeater for support-link 1
    # 3
    interest: ~B
    Of interest as defeater for support-link 1
3 B
inferred by support-link #1 from {2} by pf-reason 3
maximal-degree-of-support: 1
undefeated-degree-of-support: 1
This inference is defeasible.

Retrieving #<Node 3> from the inference-queue.

Retrieving #<Node 1> from the inference-queue.
    # 4
    interest: (P @ Q)
    Of interest as defeater for support-link 2

```
                    # 5
                    interest: ~Q
                    Of interest as defeater for support-link 2
# 4 Q
inferred by support-link #2 from {1} by pf-reason 1
maximal-degree-of-support: 1
undefeated-degree-of-support: 1
This inference is defeasible.
------------------------------------------------------------
Retrieving #<Node 4> from the inference-queue.
                    # 6
                    interest: (Q @ R)
                    Of interest as defeater for support-link 3
                    # 7
                    interest: ~R
                    Of interest as defeater for support-link 3
# 5 R
inferred by support-link #3 from {4} by pf-reason 2
maximal-degree-of-support: 1
undefeated-degree-of-support: 1
This inference is defeasible.
============================================================
          Justified belief in R
          answers #<Query #1: R> affirmatively.
============================================================

------------------------------------------------------------
Retrieving #<Node 5> from the inference-queue.
------------------------------------------------------------
Retrieving #<Interest 7: ~R supposing { }> from the inference-queue.
                    # 8
                    interest: C
                    For interest 7 by pf-reason 4
------------------------------------------------------------
Retrieving #<Interest 8: C supposing { }> from the inference-queue.
                    # 9
                    interest: B
                    For interest 8 by pf-reason 5
                    Conclusion #3 discharges interest #9
                    # 10
                    interst: (B @ C)
                    Of interest as defeater for support-link 4
                    # 11
                    interest: ~C
                    Of interest as defeater for support-link 4
# 6 C
Inferred by support-link #4 from {3} by pf-reason 5
maximal-degree-of-support: 1
undefeated-degree-of-support: 1
This inference is defeasible.
This node discharges interest 8
                    # 12
                    interest: C @ ~R)
                    Of interest as defeater for support-link 5
                    Readopting interest in:
                    # 1
                    interest: R
                    Of interest as defeater for support-link 5
Node # 5 defeats link # 5
Node # 7 defeats link # 3
------------------------------------------------------------
Recomputed assignment-tree:
assignment-tree 0:
     ((#<Node 6> . 1) (#<Node 4> . 1) (#<Node 3> . 1) (#<Node 2> . 1) (#<Node 1> . 1))
     triangle 1:
     (#<support-link #5 for node 7>#<support-link #3 for node 5>)
        assignment-tree 1:
        ((#<Node 5> . 0) (#<Node 7> . 1))
        assignment-tree-2:
        ((#<Node 5> . 1) (#<Node 7> . 0))
             vvvvvvvvvvvvvvvvvvvvvvvvvvvvvv
             #<Node 5> has become defeated.
             vvvvvvvvvvvvvvvvvvvvvvvvvvvvvv
============================================================
          Lowering the undefeated-degrees-of-support of R
          retracts the previous answer to #<Query #1: R>
============================================================

# R ~R         DEFEATED
Inferred by support-link #5 from {6} by pf-reason 4 defeaters: {5}
maximal-degree-of-support: 1
undefeated-degree-f-support: 0
```

-continued

```
This inference is defeasible.
defeatees: {3}
This node discharges interest 7
------------------------------------------------------------
Retrieving #<Node 6> from the inference-queue.
------------------------------------------------------------
Retrieving #<Interest 9: B supposing { }> from the inference-queue.
------------------------------------------------------------
Retriveing #<Node 7> from the inference-queue.
------------------------------------------------------------
Retrieving #<Interest 11: ~C supposing { }> from the inference-queue.
------------------------------------------------------------
Retrieving #<Interest 5: ~Q supposing { }> from the inference-queue.
------------------------------------------------------------
Retrieving #<Interest 3: ~B supposing { }> from the inference-queue.
------------------------------------------------------------
Retrieving #<Interest 10: (B @ C) supposing { }> from the inference-queue.
------------------------------------------------------------
Retrieving #<Interest 6: (Q @ R) supposing { }> from the inference-queue.
------------------------------------------------------------
Retrieving #<Interest 4: (P @ Q) supposing { }> from the inference-queue.
------------------------------------------------------------
Retrieving #<Interest 2: (A @ B) supposing { }> from the inference-queue.
------------------------------------------------------------
Retrieving #<Interest 12: (C @ ~R) supposing { }> from the inference-queue.
============ ULTIMATE EPISTEMIC INTERESTS ============
interest in R
is unsatisfied.
------------------------------------------------------------
Elapsed time = 3.93 sec
============================================================
ARGUMENT #1
This is a defeated argument for:
    R
which is of ultimate interest.
1. P    given
4. Q    pf-reason 1 from {1}
5. R    pf-reason 2 from {4}
This argument is defeated by argument #2
This argument defeats argument #2
============================================================
ARGUMENT #2
This is a defeated argument for:
    ~R
2. A    given
3. B    pf-reason 3 from {2}
6. C    pf-reason 5 from {3}
7. ~R   pf-reason 4 from {6}
This argument is defeated by argument #1
This argument defeats argument #1
============================================================
```

The method of the invention can be made to prove theorems in the propositional calculus by supplying appropriate reason schemas. It is convenient to formulate inference rules (conclusive reason schemas for logic) using '¬', where we define "¬p" to be q if p is "~q", and to be "~p" otherwise. Then the following set of inference rules (conclusive reasons) is complete for the propositional calculus:

Forwards reasons:
  simplification:
    infer p and q from (p & q)
  negation-elimination:
    infer p from ~~p
  disjunction-negation:
    infer ¬p and ¬q from ~(p∨q)
  conditional-negation:
    infer p and ¬q from ~(p→q)
  DeMorgan:
    infer (¬p∨q) from ~(p & q)
  biconditional-simplification:
    infer (p→q) and (q→p) from (p⇔q)
  biconditional-negation-simplication:
    infer (p⇔¬q) from ~(p⇔q)
  modus-ponens:
    infer q from p and (p→q)
  modus-tollens:
    infer ¬p from (p→q) and ¬q
  disjunctive syllogism:
    infer q from (p∨q) and ¬p
    infer p from (p∨q) and ¬q
  exportation:
    infer (p→(q→r)) from ((p & q)→r)
  disjunction-simplification:
    infer (p*→q) from (p∨q), where p* is the result of negating p and driving the negation in across all truth-functional connectives.

Backwards reasons:
  adjunction:
    adopt interest in p and q to infer (p & q)
  negation introduction:
    adopt interest in p to infer ~~p
  disjunction negation introduction:

adopt interest in ¬p and ¬q to infer ¬(p∨q)

conditional negation introduction:

adopt interest in p and ¬q to infer ¬(p→q)

biconditional introduction:

adopt interest in (p→q) and in (q→p) to infer (p↔q)

biconditional negation introduction:

adopt interest in (p↔¬q) to infer ¬(p↔q)

disjunction introduction:

adopt interest in (¬¬→q) to infer (p∨q)

backwards DeMorgan:

adopt interest in (¬p∨¬q) to infer ¬(p & q)

conditionalization:

adopt interest in q/X∪{p} to infer (p→q)/X reductio:

suppose (i.e., draw the conclusion) ¬p/{¬p}, and then for any q, if q/X∪{¬p} is concluded, adopt interest in ¬q/X∪{¬p} with a discount-factor of 0.9, to infer p/X, provided p is a literal (an atomic formula or the negation of an atomic formula), disjunction, or conditional, and ¬p is not deductively validated in X, and q is either a literal or a conditional.

Notice that reductio is a generalized backwards reason. Syntactical restrictions are imposed upon both p and q in reductio to prevent their duplicating reasoning performed in accordance with the other rules of inference. In addition, reductio has a discount-factor of 0.9 built into it. This number was chosen by experiment, and has the effect of making reductio a "last resort" strategy. Reasoning by reductio is only attempted when other reasoning strategies have failed.

The following is a typical example of an application of one form of the invention to deductive reasoning in the propositional calculus:

```
Given premises:
    (q → r) justification = 1
    (r → (p & q)) justification = 1
    (p → (q v r)) justification = 1
Ultimate epistemic interests:
    (p ←→ q) interest = 1
# 1 (q → r)
given
maximal-degree-of-support: 1
undefeated-degree-of-support: 1
# 2 (r → (p & q))
given
maximal-degree-of-support: 1
undefeated-degree-of-support: 1
# 3 (p → (q v r))
given
maximal-degree-of-support: 1
undefeated-degree-of-support: 1
-----------------------------------------------------------
Retrieving #<Query #1: (p ←→ q)> from the inference-queue.
                # 1
                interest: (p ←→ q)
                This is of ultimate interest
                # 2
                interest: (q → p)
                For interest 1 by bicondit-intro
-----------------------------------------------------------
Retrieving #<Interest 2: (q → p) supposing { }> from the inference-queue.
# 4 q suppositon: {1}
supposition
maximal-degree-of-support: 1
undefeated-degree-of-support: 1
                # 3
                interest: p supposition: {q}
                For interest 2 by conditionalization
-----------------------------------------------------------
Retrieving #<Interest 3: p supposing {q }> from the inference-queue.
# 5 ~p supposition: {~p}
reudctio-supposition
maximal-degree-of-support: 1
undefeated-degree-of-support: 1
                # 4
                reductio interest: p
                using node 5
-----------------------------------------------------------
Retrieving #<Node 4> from the inference-queue.
                # 5
                reductio interest: ~q supposition: {q}
                using node 4
-----------------------------------------------------------
Retrieving #2'Node 1> from the inference-queue.
# 6 r suppositon: {q}
inferred by support-link #1 from {4, 1} by modus-ponens1
maximal-degree-of-support: 1
undefeated-degree-of-support: 1
This nodes encodes a deductive argument.
                # 6
``` reductio interest: ~(q → r)
                    using node 1
---
Retrieving #<Node 6> from the inference-queue.
                    # 7
                    reductio interest: ~r supposition: {q}
                    using node 6
---
Retrieving #<Node 3> from the inference-queue.
                    # 8
                    rductio interest: ~(p → (q v r))
                    using node 3
---
Retrieving #<Node 2> from the inference-queue.
7 (p & q) supposition: {q}
inferred by support-link #2 from {6,2} bu modus-ponens1
maximal-degree-of-support: 1
undefeated-degree-of-support: 1
This node encodes a deductive argument.
                    # 9
                    reductio intereest: ~(r → (p & q))
                    using node 2
---
Retrieving #<Node 7 > from the inference-queue.
8 p supposition: {q}
inferred by support-link #3 from {7} by simp
maximal-degree-of-support: 1
undefeated-degree-of-support: 1
This node encodes a deductive argument.
9(q → p)
inferred by support-link #4 from {8 } by conditionalization
maximal-degree-of-support: 1
undefeated-degree-of-support: 1
This node encodes a deductive argument.
This node deischarges interest 2
                    # 10
                    interest: (p → q)
                    For interest 1 by bicondit-intro using conclusion 9
---
        Cancelling #<Interest 2: (q → p) supposing { }>
        Cancelling #<Node 5>
        Cancelling #<Node 9>
        Cancelling #<Node 8>
        Cancelling #<Node 7>
        Cancelling #<Node 6>
        Cancelling #<Node 4>
        Cancelling #<Interest 4: pp supposing { }>
        Cancelling #<Interest 5: ~q supposing {q}>
        Cancelling #<Interest 6: ~(q → r) supposing { }>
        Cancelling #<Interest 7: ~r supposing {q}>
        Cancelling #<Interest 8: ~(p → (q v r)) supposing { }>
        Cancelling #<Interest 9: ~(r → (p & q)) supposing { }>
        Cancelling #<Interest 3: p supposing {q}>
...........................................................................................
---
Retrieving #<Interest 10: (p → q) supposing { }> from the inference-queue.
10 p supposition Δp}
supposition
maximal-degree-of-support: 1
undefeated-degree-of-support: 1
                    # 11
                    interest: q supposition: {p}
                    For interest 10 by conditionalization
---
Retrieving #<Interest 11: q supposing {p}> from the inference-queue.
11 ~q supposition: {~q}
reductio-supposition
maximal-degree-of-support: 1
undefeated-degree-of-support: 1
                    # 12
                    reductio interest: ~(r → (p & q))
                    using node 2
                    # 13
                    reductio interest: ~(p → (q v r))
                    using node 3
                    # 14
                    reductio interest: ~(q → r)
                    using node 1
                    # 15
                    reductio interest: q -continued

```
                        usig node 11
----------------------------------------------------------------
Retrieving #<Node 10> from the inference-queue.
# 12 (q v r) supposition: {p}
Inferred by support-link #5 from {3, 10} by modus-ponens2
maximal-degree-of-support: 1
undefeated-degree-of-support: 1
This node encodes a deductive argument.
                        # 16
                        reductio interest: ~p supposition: {p}
                        using node 10
                        ----------------------------------------
                                Retrieving #<Node 12> from the inference-queue.
                                # 13 (~q → r) supposition: {p}
                                Inferred by support-link #6 from {12} by disj-simp
                                maximal-degree-of-support: 1
                                undefeated-degree-of-support: 1
                                This node encodes a deductive argument.
                                ----------------------------------
                                Retrieving #<Node 9> from the inference-queue.
                                # 17
                                reductio interest: ~(q → p)
                                using node 9
----------------------------------------------------------------
Retrieving #<Node 13> from the inference-queue.
                        # 18
                        reductio interest ~(~q → r) supposition: {p}
                        using node 13
----------------------------------------------------------------
Retrieving #<Interest 15: q supposing { }> from the inference-queue.
----------------------------------------------------------------
Retrieving #<Node 11> from the inference-queue.
# 14 r supposition: {p, ~q}
Inferred by support-link #7 from {13, 11} by modus-ponens2
maximal-degree-of-support: 1
undefeated-degree-of-support: 1
This node encodes a deductive argument.
----------------------------------------------------------------
Retrieving #<Node 14> from the inference-queue.
# 15 (p & q) supposition: {p, q}
Inferred by support-link #8 from {2, 14} by modus-ponens2
maximal-degree-of-support: 1
undefeated-degree-of-support: 1
This node encodes a deductive argument.
                        # 19
                        reductio interest: ~r supposition: {p}
                        using node 14
----------------------------------------------------------------
Retrieving #<Node 15> from the inference-queue.
# 16 q supposition: Δp, ~q}
Inferred by support-link #9 from {15} by simp
maximal-degree-of-suport: 1
undefeated-degree-of-support: 1
This node encodes a deductive argument.
Node #16 discharges reductio-interest #15, generated by node #11
# 17 q supposition: {p}
Inferred by support-link #10 from {16, 11} by reductio
maximal-degree-of-support: 1
undefeated-degree-of-support: 1
This node encodes a deductive argument.
Node #16 discharges reductio-interest #15, generated by node #11
----------------------------------------------------------------
Retriving #<Node 17> from the inference-queue.
# 18 r supposition: {p}
Inferred by support-link #11 from {1, 17} by modus-ponens2
maximal-degree-of-support: 1
undefeated-degree-of-support: 1
This node encodes a deductive argument.
# 19 (p → q)
Inferred by support-link #12 from {1 } by conditionalization
maximal-degree-of-support: 1
undefeated-degree-of-support: 1
This node encodes a deductive argument.
This node discharges interest 10
# 20 (p ←→ q)
Inferred by support-link #13 from {19, 9} by bicondit-intro
maximal-degree-of-support: 1
undefeated-degree-of-support: 1
This node encodes a deductive argument.
This node discharges interest 1
```

```
Justified belief in (p ←→ q)
answers #<Query #1: (p ←→ q)> affirmatively.

═══════════ ALL QUERIES HAVE BEEN ANSWERED DEDUCTIVELY. ═══════════
═══════════════════════ ULTIMATE EPISTEMIC INTERESTS ═══════════════════════
  Interest in (p ←→ q)
  is answered affirmatively by node 20

Elapsed time = 6.62 sec

ARGUMENT #1
This is a deductive argument for:
   (p ←→ q)
which is of ultimate interest.
2. (r → (p & q))    given
3. (p → (q v r))    given
1. (q → r)    given
  |---------------------------------------------
  | Suppose: {q}
  |---------------------------------------------
  | 4. q     supposition
  | 6. r     modus-ponens1 from {4, 1}
  | 7. (p & q)    modus-ponen1 from {6, 2}
  | 8. p     simp from {7}
9. (q → p)    conditionalization from {8}
  |---------------------------------------------
  | Suppose: {p}
  |---------------------------------------------
  | 10. p    supposition
  | 12. (q v r)    modus-ponens2 from {3, 10}
  | 13. (~q → r)    disj-simp from {12}
  |---------------------------------------------
  |Suppose: {~q}
  |---------------------------------------------
  | 11. ~q    reductio-supposition
     |---------------------------------------------
     | Suppose: {p, ~q}
     |---------------------------------------------
     | 14. r    modus-ponens2 from {13, 11}
     | 15. (p & q)    modus-ponens2 from {2, 14}
     | 16. q    simp from {15}
  |---------------------------------------------
  |Suppose: {p}
  |---------------------------------------------
  | 17. q    reductio from {16, 11}
19. (p → q)    conditionalization from {17}
20. (p ←→ q)    biconditi-intro from {19, 9}
```

Modifications for Parallelizing Reductio Reasoning

Given the ability to perform both deductive and defeasible reasoning, the next step is to combine both in a single problem. The natural suggestion is that we just apply the inference rules described above to problems that contain defeasible inferences as well as deductive inferences. But when we do that, surprising difficulties arise. To begin with, the rule of reductio-ad-absurdum should be restricted to avoid some useless reasoning. If we make a supposition and reason from that defeasibly to both sides of a contradiction, that does not justify concluding the negation of the supposition. Instead, it is a case of collective defeat for the nodes supporting the contradiction. To avoid this, the present invention uses a qualified form of reductio-ad-absurdum:

Given interest in P, suppose ~P.
For any Q such that
(1) Q/{~P} is validated to a degree of support greater than or equal to the degree of interest in P, and
(2) the node supporting Q/{~P} is deductive in the node supporting ~P/{~P}, try to construct an argument validating ~Q/{~P} to a degree of support greater than or equal to the degree of interest in P, and such that the node supporting ~Q/{~P} is deductive in the node supporting ~P/{~P}.

If ~P/{~P} is actually used in getting at least one of Q/{~P} and ~Q/{~P}, infer P from them.

This rule can be generalized in the obvious way to accommodate interest in P relative to nonempty suppositions.

An earlier version of this invention introduced two devices to implement this rule. First, deductive-only conclusions are introduced as conclusions to which only non-defeasible inference rules can be applied. When a new conclusion is drawn from a deductive-only conclusion using any rule other than reductio, the new conclusion is made deductive-only. When a supposition {~P} is made for the purpose of employing reductio, the resulting conclusion ~P/{~P} is made deductive-only. This guarantees that the reasoning supporting the contradiction be deductive in the node recording the supposition. The second device is mandatory-ancestors. When an interest-link is constructed to encode interest in ~Q/{~P}, the inference-graph node supporting ~P/{~P} is recorded as a mandatory-link-ancestor. Then a constraint is built into DISCHARGE-LINK requiring that the mandatory-link-ancestor be an inference ancestor of at least one member of the basis.

Figure 18:
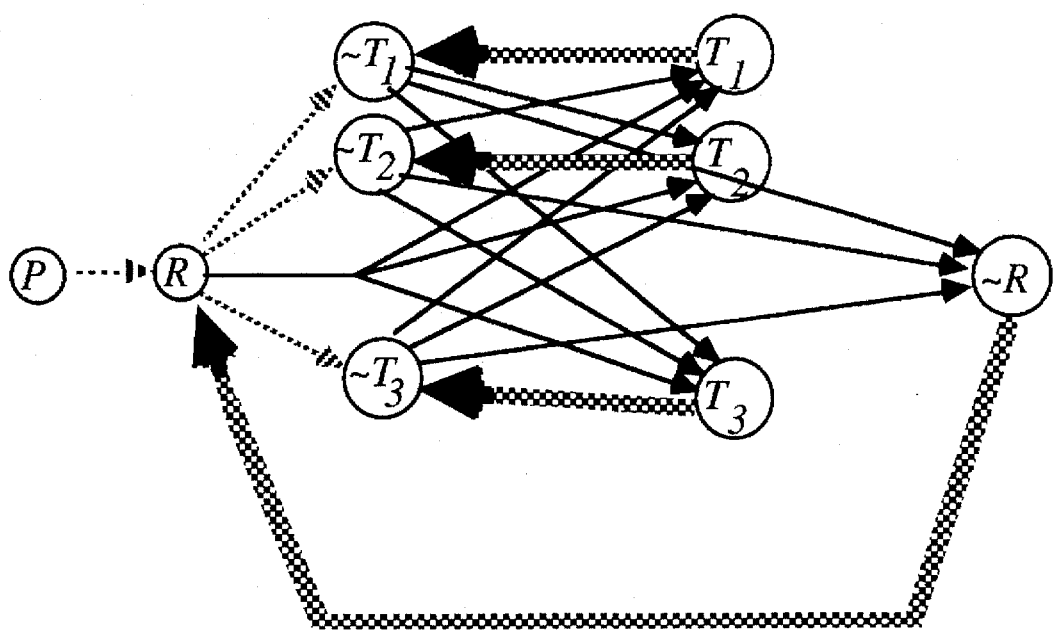
FIG. 18 is a generally diagrammatic view diagraming the inference-graph of the lottery paradox.

However, the overall performance was not satisfactory. For instance, consider the following simple problem (whose inference-graph is drawn in FIG. 18), investigated without allowing the invention the use of the deductive rules:

```
The lottery paradox paradox
Given preises:
    P   justification = 1
Ultimate epistemic interests:
    ~T1  interest = 1
    ~T2  interest = 1
    ~T3  interest = 1
    FORWARDS PRIMA FACIE REASONS
        pf-reason 1: (R) ||=> ~T1 strength = 1
        pf-reason 2: (R) ||=> ~T2 strength = 1
        pf-reason 3: (R) ||=> ~T3 strength = 1
        pf-reason 4: (R) ||=> R strength = 1
    FORWARDS CONCLUSIVE REASONS
        con-reason 1: {R, ~T1, ~T2} ||=> T3 strength = 1
        con-reason 2: {R, ~T2, ~T3} ||=> T1 strength = 1
        con-reason 3: {R, ~T1, ~T3} ||=> T2 strength = 1
        con-reason 4: {~T1, ~T2, ~T3} ||=> ~R strength = 1
======== ULTIMATE EPISTEMIC INTERESTS ========
Interest in ~T3
is unsatisfied.
----------------------------------------
Interst in ~T2
is unsatisfied.
----------------------------------------
Interest is ~T1
is unsatisfied.
----------------------------------------
Cumulative size of arguments = 9
Size of inference-graph = 9
100% of the inference-graph was used in the argument.
11 interests were adopted.
```

In formulating this problem so that it can be done without using logic, we have in effect just stipulated the four logical inferences that must be fmade in con-reasons 1–4. The problem can be reformulated using logic as follows:

```
The lottery paradox paradox using logic
Given premises:
    P   justification = 1
Ultimate epistemic interests:
    ~T1  interest = 1
    ~T2  interest = 1
    ~T3  interest = 1
    FORWARDS PRIMA FACIE REASONS
        pf-reason 1: {R} ||=> ~T1 strength = 1
        pf-reason 2: {R} ||=> ~T2 strength = 1
        pf-reason 3: {R} ||=> ~T3 strength = 1
        pf-reason 4: {P} ||=> R strength = 1
    FORWARDS CONCLUSIVE REASONS
        con-reason 1: {R} ||=> (T1 v (T2 v T3)) strength = 1
```

The surprising result is that even after refining the rules of inference as much as seems possible, an immense amount of superfluous reasoning occurs. The statistics obtained are as follows:

Cumulative size of arguments=11

Size of inference-graph=150

7% of the inference-graph was used in the argument.

554 interests were adopted.

Inspection reveals that this profusion of backwards reasoning is confined almost exclusively to 11 i-lists. (The i-lists can be inspected by running "(display-i-lists)".) The pattern of the reductio-explosion is fairly simple. The reasoner begins by adopting interest in ~T3, ~T2, ~T1, T3, (R @ ~T3), T2, (R @ ~T2), T1, (R @ ~T1), ~R, (P @ R), and tries to get them by reductio. This generates reductio-interest in R, ~P, ~T3, ~T2, ~T1, and ~(T1 v (T2 v T3)) (relative to various reductio-suppositions). The latter generates non-reductio interest in ~T1, ~(T2 v T3, ) ~T3, and ~T2 by i-neg-disj. The reasoner then pursues ~T3, ~T2 and ~T1 (relative to enlarged reductio-suppositions) by reductio, and a cycle is born. This reasoning cycles through progressively larger reductio-suppositions until no larger reductio-suppositions can be constructed.

This cycling consists of the reasoner repeating the same backwards reasoning over and over again with respect to different reductio-suppositions. This suggests that the reasoning might all be done in parallel. Or more accurately, it could be done just once using a "variable-reductio-supposition", and then the resulting interests can be discharged multiple times by instantiating the variable-reductio-supposition differently for different discharging conclusions. This can be implemented by introducing a slot in interests for "reductio-interest". A reductio-interest will be any interest introduced by reductio or derived by reasoning backwards from another reductio-interest. We can modify the rule of reductio so that the reductio-supposition is no longer included in the interest-supposition of a reductio-interest. Thus a single reductio-interest can encode interest in the same sequent relative to many different reductio-suppositions.

However, this is not yet a complete solution to the problem. This will minimize the adoption of reductio-interests, but the same reductio-interests will be adopted repeatedly with different interest-links in attempts to get different non-reductio-interests. If the reasoner concludes P and then adopts interest in ~P in order to get some other interest Q (recording that in one interest-link), it will also adopt interest in ~P to get any other appropriate interest R (recording that in another interest-link). Thus we have tamed the profusion of interests, but we still get a profusion of interest-links. What this illustrates is that the use of interest-links is unnecessary in reductio-reasoning, because that reasoning generalizes across a wide range of interests. This suggests treating such reasoning differently than we treat reasoning in accordance with interest rules. We can think of such reasoning as consisting of three coordinated operations. First, we have an operation driven by drawing new conclusions. Whenever we conclude a sequent of an appropriate syntactic type, we construct a direct-reductio-interest in its negation. This will be done by ADOPT-REDUCTIO-INTEREST. Second, given an interest of an appropriate syntactic type, we make a reductio-supposition of its negation. This is done by MAKE-REDUCTIO-SUPPOSITION. Third, when a new inference-node has a reductio-supposition among its inference-ancestors, its node-formula is that of a reductio-interest, and its non-reductio-supposition is a subset of the supposition of the reductio-interest, then we can infer the negation of the reductio-supposition. This will be done by DISCHARGE-REDUCTIOS and DISCHARGE-RETROSPECTIVE-REDUCTIOS.

To implement schematic reductio-reasoning, a reductio-supposition will be an inference-node whose node-rule is "reductio-supposition". Such nodes record the making of suppositions for reductio-reasoning. It will be convenient to keep a record of the reductio-suppositions that are ancestors of a node in the new slot "reductio-ancestors". A reductio-supposition is its own only reductio-ancestor. The reductio-ancestors of any other node produced by a rule other than DISCHARGE-REDUCTIOS will be the reductio-ancestors of the members of the node-basis. DISCHARGE-REDUCTIOS and DISCHARGE-RETROSPECTIVE-REDUCTIOS will remove one node from the list of reductio-ancestors.

To parallelize reductio-reasoning, we must distinguish between the part of a supposition that is introduced by reductio-reasoning and the part that comes from other sources (e.g., conditionalization). The non-reductio-supposition of an inference node is the difference between the node-supposition and the set of negations of node-formulas of its reductio-ancestors. Rather than recomputing this repeatedly, a slot is added to inference-nodes for this. All told, four slots are added to inference-nodes:

reductio-ancestors—this is a list of pairs <P,M> where M is an inference-node and P is the node-formula of M or an instantiation of the node-formula.

non-reductio-supposition—this is a list of pairs <P,M> where M is an inference-node and P is the node-formula of M or an instantiation of the node-formula. In the absence of reductio-reasoning, the node-supposition is the set of these P's. In the presence of reductio-reasoning, the node-supposition is the set of P's from the non-reductio-supposition and the list of reductio-ancestors, combined. These two slots provide a mechanism for tracing the source of the node-supposition;

deductive-only—if this is T, only non-defeasible reasons can be used in making inferences from this node.

reductios-discharged—T if the conclusion has already been used to discharge reductio-interests, and NIL otherwise;

Interests will have slots for "reductio-interest" and "direct-reductio-interest". The latter will no longer have values of T or NIL, but will instead be either NIL or contain the list of generating conclusions whose negations are the objects of interest. There can be more than one such conclusion, because the supposition of a reductio-interest generated by a conclusion will be only the non-reductio-supposition of the conclusion:

reductio-interest—T if the interest derives exclusively from attempts to use reductio ad absurdum; NIL otherwise.

direct-reductio-interest—a list of inference-nodes.

It was indicated previously that there are syntactic restrictions on the making of reductio-suppositions and the adoption of reductio-interests. This is to avoid duplication of effort. For example, the reasoner should never try to establish a conditional by reductio. Suppose the reasoner is interested in (P→Q). The reasoner will suppose P and adopt interest in Q/{P}. If the reasoner also tried to get (P→Q) by reductio, it would suppose ~(P→Q) and try to infer a contradiction. That is equivalent to supposing P and supposing ~Q and trying to get a contradiction, and that in turn is equivalent to supposing P for conditionalization and then trying to get Q by reductio. Thus to avoid duplication of effort, the method of the invention postpones the use of reductio until it has already supposed the antecedent of the conditional. For similar reasons, the method of the invention does not make reductio-suppositions that are negations of biconditionals, conjunctions, disjunctions, or negations of truth-functional compounds. Similarly, the method of the invention does not adopt reductio-interest in conjunctions, biconditionals, or negations of biconditionals, conjunctions, disjunctions, or negations of truth-functional compounds.

The reasoner can check whether a formula is of the right form to generate a reductio-interest when its c-list is first constructed. Then it doesn't have to do it again. This information will be recorded in the slot "reductio-interests" in the c-list. Similarly, the reasoner will check whether a formula is of the right form to generate a reductio-supposition when its i-list is first constructed, and record this information in the slot "reductio-trigger" in the i-list. When the interests of an i-list lead to the making of a reductio-supposition, it is recorded in the new slot "i-list-reductio-supposition", and then when new interests are added to the i-list, they are also made generating-interests of the reductio-supposition.

When an interest is retrieved from the inference-queue, the reasoner checks to see the value of "reductio-trigger" for its i-list. If it is T, a reductio-supposition is made for the negation of the interest-formula, and "reductio-trigger" is reset to NIL. This must also be done when reasoning backwards from a query, because the resulting interest is not queued. A complication arises from the fact that a supposition can be made twice, both for reductio- and non-reductio-purposes (e.g., conditionalization). To accommodate that, we could create duplicate supposition-nodes, but that would create duplicate reasoning. Instead, the method of the invention cancels the deductive-only status of reductio-suppositions when they are readopted as non-reductio-suppositions. In that case, the reductio-ancestors of the basis of an inference are only inherited by the conclusion as reductio-ancestors if the inference is deductive. Otherwise they are inherited as non-reductio-suppositions. When a non-reductio-supposition is readopted as a reductio-supposition, for all of its inclusive-node-descendants that are deductive in it, it is moved from the non-reductio-supposition to the list of reductio-ancestors. For all of those altered nodes that are not still on the inference-queue, the reasoner discharges-interest-in them and reasons-forwards-from them. When a reductio-supposition is readopted as a non-reductio-supposition, it and all of its inclusive-node-descendants should cease to be deductive-only except insofar as they are inferred from other deductive-only nodes. The reasoner will also apply all members of defeasible forwards-reasons to it and its node-consequences.

MAKE-REDUCTIO-SUPPOSITION interest.

If the value of the reductio-trigger for the interest-i-list of interest is T, then:

Reset the reductio-trigger to NIL.

Where the interest-formula of interest is q, if there is an existing supposition sup supposing q, then if it is a non-reductio-supposition, convert it to a reductio-supposition. If there is no such supposition:

If interest is a non-reductio-interest, then for every non-reductio-supposition-node generating part of the interest-supposition, add that node to the list of inherited-non-reductio-suppositions.

Construct an inference-node node whose node-sequent is ¬q/{¬q} and whose list of node-arguments is {<NIL,1>}, and insert it into the inference-queue. Let node be its own only reductio-ancestor.

Make node the i-list-reductio-supposition of the i-list of interest.

START-REDUCTIO-INTERESTS N.

Direct-reductio-interests are adopted under three different conditions. When reductio-suppositions are made, the nodes encoding them are stored in the list reductio-supposition-nodes. When the first reductio-supposition is made, all processed conclusions are surveyed, and direct-reductio-interests are adopted in the negations of all those that are syntactically appropriate. In addition, whenever a new reductio-supposition is made, a direct reductio-interest is adopted in its negation provided that it is syntactically appropriate. Finally, if the list reductio-supposition-nodes is nonempty, then when a syntactically appropriate conclusion is retrieved from the inference-queue, a direct-reductio-interest is adopted in its negation. Every reductio-supposition is a generating-node for a direct-reductiointerest. Accordingly, the priority of the new interest should be the product of *reductio-interest* (the discount-factor used in adopting reductio-interests) and the maximum discounted-node-strength for any reductio-supposition.

The above is accomplished by having MAKE-REDUCTIO-SUPPOSITION call START-REDUCTIO-INTERESTS, and having REASON-FORWARDS-FROM call ADOPT-REDUCTIO-INTEREST:

START-REDUCTIO-INTERESTS node.

Add node to the list of reductio-supposition-nodes.

If reductio-supposition-nodes was previously empty, then for every c-list cl in processed-conclusions, if (reductio-interests cl) is T, then for every c-list-node N, GENERATE-REDUCTIO-INTERESTS for N.

If the value of reductio-interests for the node-c-list of node is T (i.e., node is syntactically appropriate), GENERATE-REDUCTIO-INTERESTS for node.

ADOPT-REDUCTIO-INTEREST node.

If the list of reductio-supposition-nodes is nonempty, node is not a reductio-supposition, node is syntactically appropriate, and either node was not inferred by discharging an interest-link or the resultant-interest of that link (which node satisfies) is not a cancelled-interest, then GENERATE-REDUCTIO-INTERESTS for node.

GENERATE-REDUCTIO-INTERESTS node.

Let P be the negation of the node-formula of node, let sup be the non-reductio-supposition of node, and let sequent be the sequent constructed from this supposition and formula.

If there is no previously existing interest in sequent, construct one, setting the value of its slot direct-reductio-interest to be the unit set of node.

If there is already such an interest interest:
add node to the list direct-reductio-interest for interest.
if interest was not previously a reductio-interest, reconstrue it as one;
recompute the degree-of-interest and the interest-priority for interest.

Direct-reductio-interests are used for making reductio-inferences. This is done by DISCHARGE-REDUCTIOS, and will be discussed shortly. Other reductio-interests are adopted by reasoning backwards from direct-reductio-interests, and as such are discharged in the normal way by DISCHARGE-INTEREST-IN and DISCHARGE-LINK. There is a complication, however, resulting from the schematic character of the interest-supposition in reductio-interests. Previously, the rule for interest-discharge required that the node-supposition of the inference-node be a subset of the interest-supposition of the interest it discharges. Using schematic reductio-interests, that condition is too strong. This is for two reasons. First, the reductio-suppositions are not listed in the interest-supposition, so the most we could require is that the non-reductio-supposition of the inference-node be a subset of the interest-supposition. However, even that is too strong. Consider the following reasoning:

| conclusions | interests |
|---|---|
| R | |
| | (P → Q) |
| suppose P (for conditionalization) | |
| | Q/{P} |
| suppose ~Q (reductio-supposition) | |
| | ~R (reductio-interest) |

| conclusions | interests |
|---|---|
| | . (interest-link) |
| | . |
| S | |

Suppose further reasoning produces the following conclusion:

$S/\{P,\sim Q\}$

Then the reasoner should discharge the interest-link to infer:

$\sim R/\{P,\sim Q\}$

Q/{P} (by reductio)

(P→Q) (by conditionalization)

The thing to observe here is that although we want the conclusion S/{P,~Q} to discharge the interest S, the non-reductio-supposition of the conclusion is {P}, which is not a subset of the interest-supposition (the latter being empty). The source of the difficulty is that direct-reductio-interests are no longer tied by interest-links to the interests generating them. Instead, we regard each direct-reductio-interest as being generated by all interests that are syntactically appropriate for the generation of reductio-suppositions. Accordingly, the direct-reductio-interest (in this case, ~R) cannot inherit the supposition of the generating interest in Q/{P}.

Let us define the inherited-non-reductio-supposition of an interest to be the list of all non-reductio-suppositions not in the interest-supposition that can be reached by working backwards from the interest through right-links, generating-nodes, and generating-interests. What should be required for interest-discharge of a reductio-interest is that the non-reductio-supposition of the discharging node be a subset of the union of the interest-supposition and its inherited-non-reductio-supposition.

This can be simplified by noting that all reductio-interests have the same inherited-non-reductio-supposition. This is because the list of generating-nodes of a direct-reductio-interest is taken to be the list of all reductio-suppositions. Thus a single list of inherited-non-reductio-suppositions can be computed as the reasoning progresses, augmenting it as needed when new reductio-suppositions are made. Then what is required for interest-discharge is that the supposition of the inference-node be "appropriately-related" to the supposition of the interest, taking the resultant-interest of the interest-link to be the target, in the following sense:

APPROPRIATELY-RELATED-SUPPOSITIONS node interest optional argument: target

If target is not supplied, let it be interest.

If target is not a query and it is a reductio-interest, then the node-supposition is a subset of the interest-supposition of interest.

Otherwise, every member of the non-reductio-supposition of node is contained in either the interest-supposition of interest or in the list inherited-non-reductio-suppositions.

This revision affects the application of DISCHARGE-INTEREST-IN, DISCHARGE-LINK, MAKE-INFERENCE-FROM-LINK, and REPLICATE-DISCHARGES.

When node is a new inference-node produced by either DRAW-CONCLUSION or DRAW-REDUCTIO- CONCLUSION, we check to see whether we can draw a reductio-conclusion from it. For this purpose we check to see whether node contradicts an earlier conclusion. If so, we can infer the negation of a reductio-ancestor of the contradiction. In the latter connection, there is one qualification. We can distinguish between "base-reductio-suppositions" and other reductio-supposition. A base-reductio-supposition is one that is generated from interests that are not themselves reductio-interests. Reductio-suppositions that are not base-reductio-suppositions can be generated from each other in any order, and so they can be discharged in any order. But base-reductio-suppositions must always be discharged last, after all other reductio-suppositions have been discharged. In the following, i-list is the corresponding-i-list of the node-c-list of node:

DISCHARGE-REDUCTIOS node i-list

DISCHARGE-FORTUITOUS-REDUCTIOS node

If node has reductio-ancestors, then for any direct-reductio-interest interest whose interest-formula is the same as node's node-formula (i.e., interest is chosen from i-list) and whose interest-supposition is appropriately-related to that of node:

Let Y be the node-supposition of node.

For each node* in the direct-reductio-interest slot of interest (i.e., interest is a reductio-interest in the negation of the node-sequent of node*):

Let Y* be the node-supposition of node*.

For each reductio-ancestor R of node, if either R is not a base-reductio-supposition or it is the only reductio-ancestor of node, and the node-formula of R is P, then DRAW-REDUCTIO-CONCLUSION P node node* R Y Y* interest.

DRAW-REDUCTIO-CONCLUSION P node node* R Y Y* interest

If neither node nor node* is a cancelled-node, and ¬P is not in Y or Y*, then let sup be Y∪Y*−{P}, let S be the sequent <sup,¬P>, and let NDA be the union of the crossproduct of the nearest-defeasible-ancestors of node and the nearest-defeasible-ancestors of node*. If not SUBSUMED S NDA:

If there is an inference-node of kind "inference" supporting S, let conclusion be that inference-node. Append NDA to the list of nearest-defeasible-ancestors for conclusion.

Otherwise, construct a new inference-node conclusion supporting S, setting its deductive-only slot to be NIL.

Build a support-link link recording the inference of conclusion from {node,node*} in accordance with reductio, construct the set of new non-circular arguments this produces for conclusion and its inference-descendants, and recompute the lists of nearest-defeasible-ancestors for the inference-descendants.

If the preceding step does produce new arguments for conclusion:

Record link as a support-link for conclusion.

If conclusion is newly constructed, add it to the inference-graph and store it in the list of conclusion, and make NDA to the list of nearest-defeasible-ancestors for conclusion When R is non-NIL and conclusion is a deductive-node, add the generating-interests of R to the list of enabling-interests of conclusion.

If conclusion is a deductive-node, and interest is not NIL, add interest to the list of enabling-interests for conclusion.

CANCEL-SUBSUMED-LINKS link.

If conclusion is either newly-constructed, or its maximal-degree-of-support has increased as a result of adding this support-link, let old-degree be the old maximal-degree of support for conclusion. Let i-list be the corresponding i-list of the conclusion-c-list of conclusion.

If conclusion is either newly-constructed, or its maximal-degree-of-support has increased as a result of adding this support-link, DISCHARGE-INTEREST-IN-DEFEATERS conclusion i-list old-degree UPDATE-BELIEFS link.

If S was not previously concluded, insert conclusion into the inference-queue.

If conclusion already existed but this inference increases the maximal-degree-of-support of node, ADJUST-SUPPORT-FOR-CONSEQUENCES conclusion old-degree If conclusion is either newly-constructed, or its maximal-degree-of-support has increased as a result of adding this support-link, DISCHARGE-INTEREST-IN conclusion i-list old-degree interest If conclusion is either newly-constructed, or its maximal-degree-of-support has increased as a result of adding this support-link, DISCHARGE-REDUCTIOS conclusion i-list old-degree interest.

Set the old-undefeated-degree-of-support of node to be the undefeated-degree-of-support of node.

When we adopt a new reductio-interest interest, it may be possible to discharge that interest immediately. This is done by DISCHARGE-RETROSPECTIVE-REDUCTIOS.

DISCHARGE-RETROSPECTIVE-REDUCTIOS node. interest

For each node N supporting the interest-formula of interest, if the maximal-degree-of-support of N is greater than or equal to the degree-of-interest of interest, and N and interest have appropriately-related-suppositions, let Y be the node-supposition of N, and let Y* be the node-supposition of node.

For each reductio-ancestor R of N, if either R is not a base-reductio-supposition or it is the only reductio-ancestor of N, and the node-formula of R is P, then DRAW-REDUCTIO-CONCLUSION P N node R Y Y* interest.

Generating-reductio-interests can convert prior interests that were not reductio-interests into reductio-interests. When that happens, we must check whether they can be immediately discharged. This is done by DISCHARGE-NEW-REDUCTIO-INTEREST, which is analogous to DISCHARGE-RETROSPECTIVE-REDUCTIOS.

In addition, the changes indicated in bold-face are made to pre-existing rules:

REASON-BACKWARDS-FROM interest priority

Let sequent be the interest-sequent of interest, $\delta$ its degree-of-interest, and $\delta^*$ its last-processed-degree-of-interest.

For each backwards-reason R of strength at least $\delta$ but less than $\delta^*$, if interest is still uncancelled, find any interest-scheme <R,X,Y,sequent,interest,variables,$\delta$> from which sequent can be inferred. Then:

If the forwards-basis X is nonempty, insert the interest-scheme into interest-schemes.

For each instantiation X* of X such that all members of X* are validated by processed-conclusions with maximal-degree-of-support at least $\delta$, and max-degree is the maximum-degree-of-interest of interest, make an interest link link recording the instance X* of the interest-scheme <R,X,Y,sequent, interest,variables,δ> and DISCHARGE-LINK link δ max-degree NIL (using priority to simplify the computation of interest-priorities).

If the use of reductio-ad-absurdum is enabled, apply DISCHARGE-RETROSPECTIVE-REDUCTIOS and make a reductio-supposition for the purpose of getting interest. (This will be explained in chapter four.)

For each auxiliary rule for backwards reasoning R, apply R to S.

REASON-FORWARDS-FROM node
  APPLY-FORWARDS-REASONS node.
  DISCHARGE-INTEREST-SCHEMES node.
  If reductio-ad-absurdum reasoning is enabled, apply ADOPT-REDUCTIO-INTERESTS and DISCHARGE-DELAYED-REDUCTIOS to node. (This is explained in chapter four.)
  For each auxiliary rule R for forwards reasoning, apply R to node.

APPLY-FORWARDS-REASONS node
  For each forwards-reason R, if either R is not defeasible or node) is not deductive-only, and there is a list nodes such that (1) node is in nodes, (2) the other members of nodes are in processed-conclusions, (3) the members of nodes satisfy the applicability-conditions of R, and (4) where B is the list of node-formulas of the members of nodes, <B,P> is an instance of R, then DRAW-CONCLUSION P nodes R.

DRAW-CONCLUSION P B R discharge (optional-argument: interest)
  If no member of B is cancelled, let sup be the union of the node-suppositions of the members of B, less discharge, and let S be the sequent <sup,P>. If S has not been validated deductively, and all members of B are S-independent:
    If R is not defeasible, let NDA be the set of unions of the crossproducts of the sets of nearest-defeasible-ancestors of members of B*, and otherwise let NDA be NIL.
    If either R is defeasible or not SUBSUMED S NDA:
      Let deductive-only be T if R is not reductio and some member of B is a deductive-only conclusion; otherwise let deductive-only be NIL
      If there is an inference-node of kind "inference" supporting S, let node be that inference-node. If node is a deductive-only conclusion, but deductive-only is NIL, redefine the deductive-only slot in node to make it NIL.
      Otherwise, construct a new inference-node node supporting S. Make node deductive-only if and only if deductive-only is T.
      If node is a deductive-node, and interest is not NIL, add interest to the list of enabling-interests for node.
      Build a support-link link recording the inference of node from B in accordance with R, construct the set of new non-circular arguments this produces for node and its inference-descendants, and recompute the lists of node-ancestors and nearest-defensible-ancestors for the inference-descendants.
      If the preceding step does produce new arguments for node:
        ADOPT-INTEREST-IN-DEFEATERS-FOR link.
        Record link as a support-link for node.
        If node is newly constructed, add it to the inference-graph and store it in the list of conclusions
        If R is defensible, add {node} to the list of nearest-defensible-ancestors of node; otherwise append NDA to the list of nearest-defensible-ancestors of node.
      CANCEL-SUBSUMED-LINKS link.
      If node is either newly-constructed, or its maximal-degree-of-support has increased as a result of adding this support-link, let old-degree be the old maximal-degree of support for node:
        Let i-list be the corresponding i-list of the conclusion-c-list of node.
          If node is either newly-constructed, or its maximal-degree-of-support has increased as a result of adding this support-link, DISCHARGE-INTEREST-IN-DEFEATERS node i-list old-degree
          UPDATE-BELIEFS link.
          If S was not previously concluded, insert node into the inference-queue.
          If node already existed but this inference increases the maximal-degree-of-support of node, ADJUST-SUPPORT-FOR-CONSEQUENCES node old-degree
          If node is either newly-constructed, or its maximal-degree-of-support has increased as a result of adding this support-link, DISCHARGE-INTEREST-IN node i-list old-degree interest
          If node is either newly-constructed, or its maximal-degree-of-support has increased as a result of adding this support-link, and reductio-ad-absurdum is enabled, DISCHARGE-REDUCTIOS node i-list old-degree interest.
        Set the old-undefeated-degree-of-support of node to be the undefeated-degree-of-support of node.

ADJUST-SUPPORT-FOR-CONSEQUENCES node old-degree.
  For all nodes N that are support-link-targets of consequent-links of node, if the maximal-degree-of-support of N is old-degree, let N-old be the maximal-degree-of-support for N, recompute the maximal-degree-of-support for N, and if it increases, let i-list be the corresponding-i-list of the node-c-list of N. If there is such an i-list:
    DISCHARGE-INTEREST-IN-DEFEATERS N i-lists old-degree
    DISCHARGE-INTEREST-IN N i-lists old-degree
    if N is a processed-conclusion, DISCHARGE-INTEREST-SCHEMES N old-degree
    if reductio-ad-absurdum is enabled, DISCHARGE-REDUCTIOS node i-list old-degree.
    ADJUST-SUPPORT-FOR-CONSEQUENCES N N-old.

MAKE-INFERENCE-FROM-LINK link.
  Find all lists B of inference-nodes of adequate strength, validating the members of the link-basis, satisfying the discharge-conditions of the corresponding link-interests, and not being deductive-only inference-nodes unless the link-rule is non-defeasible:
    For each such B, where discharge is the link-discharge of link and R is the link-rule, let formula be the interest-formula of the resultant-interest of link, and DRAW-CONCLUSION formula B R discharge.

REPLICATE-DISCHARGES node degree
  For each interest N of the corresponding-i-list of the node-c-list of node, if node and N have appropriately-related suppositions then for each discharged-right-link link of N, if it is not an answer-link and degree is greater than or equal to the link-strength, then for all lists B of nodes of adequate strength, validating the remaining members of the link-basis and not being deductive-only nodes unless the link-rule is non-defeasible:

Let formula be the interest-formula of the resultant-interest of link, and apply DRAW-CONCLUSION to formula, the basis consisting of adding node into B, the link-rule, and the link-discharge.

The method of the invention incorporates a further refinement of these rules. There is a choice to be made regarding when DISCHARGE-REDUCTIO is to be applied. It could be applied either when a new conclusion is first drawn (by building this into DRAW-CONCLUSION and DRAW-REDUCTIO-CONCLUSION), or it could be applied when the conclusion is retrieved from the inference-queue. For reasoning without quantifiers, the former strategy will be employed. Experiment indicates that in first-order logic, a mixture of these two strategies is actually the best.

These rules have the consequence that reductio-suppositions do not figure into the formulation of reductio-interests, thus avoiding the spiraling of interests described above, but when reductio-interests are discharged, the appropriate suppositions are computed so that they include any reductio-suppositions upon which the inference depends.

As described, the rules for discharging reductio-interests only license inferences to the negations of reductio-ancestors of the contradictory conclusions giving rise to the inference. Although this is very natural, the resulting system is not complete for the propositional calculus. The difficulty is that it only draws reductio-conclusions from inconsistent suppositions. If the inconsistency arises from inconsistent premises, no reductio-conclusion can be drawn. The following is a simple example:

```
Given premises:
     P    justification = 1
     ~P   justification = 1
Ultimate epistemic interests:
     Q    interest = 1
# 1
conclusion 1: P
by given
degree-of-support: 1
This node encodes a deductive argument.
Non-decutic-supposition: nil
# 2
conclusion 2: ~P
by given
degree-of-support: 1
This node encodes a deductive argument.
Non-reductio-supposition: nil
-----------------------------------------
Retrieving #<Query #1: Q> from the inference-queue.
          # 1
               interest: Q
               This is of ultimate interest
# 3
conclusion 3: ~Q    supposition: {~Q}
by reductio-supposition
degree-of-support: 1
This node encodes a deductive argument.
Non-reductio-supposition: nil
-----------------------------------------
Retrieving #<Conclusion #1: P > from the inference-queue.
          # 2
               reductio interest: ~P
               using conclusion 1
-----------------------------------------
Retrieving #<Conclusion #2: ~P> from the inference-queue.
-----------------------------------------
Cancelling #<interest 2: ~P supposing { }>
-----------------------------------------
          # 3
               reductio interest: P
               using conclusion 2
-----------------------------------------
Retrieving #<Interest 3: P supposing { }> from the inference-queue.
-----------------------------------------
Retrieving #<Conclusion #3: ~Q supposing {~Q}> from the inference-queue.
          Readopting interest in:
          # 1
               reductio interest: Q
               This is of ultimate interest
================ ULTIMATE EPISTEMIC INTERESTS ================
Interest in Q
is unsatisfied. NO ARGUMENT WAS FOUND.
```

For the purposes of modeling human reasoning, this may not be an untoward result. However, for some purposes we do want completeness for the propositional calculus. To achieve that, a call to DISCHARGE-FORTUITOUS-REDUCTIOS has been added to the reductio-discharge rules:

DISCHARGE-FORTUITOUS-REDUCTIOS node.

For each node* in the list of c-list-nodes for the c-list-contradictor of the c-list of node:

If node and node* both have empty node-suppositions, then for each ultimate-epistemic-interest, infer the query-formula from node and node*.

If node discharges some interest generated by a supposition in the list of non-reductio-suppositions of node*, and the node-supposition of node is a subset of the node-supposition of node*, then for each supposition sup in the list of non-reductio-suppositions of node*, if node* is deductive-in sup, then for every generated-interest in of sup, if node and in have appropriately-related-suppositions, then where P is the interest-formula of in, DRAW-CONCLUSION P {node, node*} "fortuitous-reductio" NIL.

If node* discharges some interest generated by a supposition in the list of non-reductio-suppositions of node, and the node-supposition of node* is a subset of the node-supposition of node, then for each supposition sup in the list of non-reductio-suppositions of node, if node is deductive-in sup, then for every generated-interest in of sup, if node* and in have appropriately-related-suppositions, then where P is the interest-formula of in, DRAW-CONCLUSION P {node, node} "fortuitous-reductio" NIL.

This governs "fortuitous reductio", which licenses the drawing of reductio-conclusions from any inconsistent pairs of deductive conclusions. With this addition, the above problem is done as follows:

```
Given premises:
    P    justification = 1
    ~P   justification = 1
Ultimate epistemic interests:
    Q    interest = 1
# 1
conclusion 1:P
by given
degree-of-support: 1
This node encodes a deductive argument.
Non-reductio-supposition: nil
conclusion 2: ~P
by given
degree-of-support: 1
This node encodes a deductive argument.
Non-reductio-supposition: nil
-----------------------------------------
Retrieving #<Query #1: Q> from the inference-queue.
                # 1
                interest: Q
                This is of ultimate interest
# 3
conclusion 3: ~Q    supposition: (~Q)
by reductio-supposition
degree-of-support: 1
This node encodes a deductive argument.
Non-reductio-supposition: nil
-----------------------------------------
Retrieving #<Conclusion #1: P> from the inference-queue.
                # 2
                reductio interest:~P
                using conclusion 1
-----------------------------------------
Retrieving #<Conclusion #2: ~P> from the inference-queue.
-----------------------------------------
Cancelling #<Interest 2: ~P supposing { }>
-----------------------------------------
                # 3
                reductio interst: P
                using conclusion 2
-----------------------------------------
Retrieving #<Interest 3: P supposing { }> from the inference-queue.
Node #1 discharge reductio-interest #1, geneated b node #2
# 4
conclusion 4: q
From {1, 2} by reductio
degree-of-support: 1
This node encodes a deductive argument.
Non-reductio-supposition: nil
        Justified belief in Q
        answers #<Query #1: Q> affirmatively.

ALL QUERIES HAVE BEEN ANSWERED DEDUCTIVELY.
===================ULTIMATE EPISTEMIC INTERESTS===========
Interest in Q
is answered affirmatively by conclusion 4
```

The cancellation rules must be changed to accommodate reductio-interests. A reductio-interest can be cancelled normally by finding a deductive argument for a conclusion that subsumes it. However, it must be borne in mind that direct-reductio-interests do not work via interest-links. This creates a minor problem, because a direct-reductio-interest might also be of interest for some other reason (e.g., conditionalization), and hence have right-links. Cancelling the resultant-interest of those right-links should not cancel the interest. A mechanism must be adopted to handle this. A further change required is that if an interest is cancelled without being discharged, and it led to the making of a reductio-supposition, the node recording that reductio-supposition should be cancelled and its inference-descendants should be cancelled. To implement this, we have a slot in interests recording "generated-reductio-suppositions". Furthermore, cancelling a node should cancel interest in any reductio-interests generated by it. To implement all of this, we have a slot in inference-nodes recording "generated-interests" and "generating-interests", and a slot in interests recording "generating-nodes" and "generated-suppositions". Interests generate nodes recording suppositions made for reductio reasoning and conditionalization, and those suppositions in turn generate new interests. Inference nodes also generate new nodes by inference, and interests generate each other by backwards reasoning (recorded in interest-links, discharged or otherwise). As a first approximation, when we cancel an interest, we should cancel all interests and nodes generated from it provided they are not generated in any other way. An immediate qualification is required, in that among the nodes generated by an interest being cancelled as a result of being discharged will be the node discharging it. We do not want to cancel that node—just the nodes leading up to it.

Figure 19:
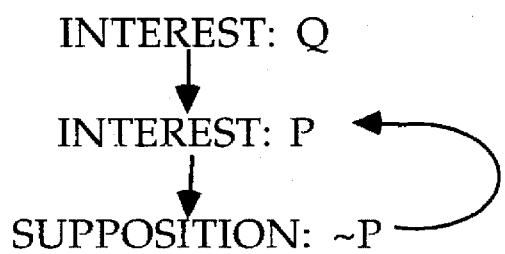
FIG. 19 is a generally diagrammatic view illustrating circular generation paths.

A major complication arises from the way the reductio rules treat inferences as having "schematic" suppositions. This can lead to generation cycles. For instance, interest in Q might lead to interest in P by backwards reasoning. Interest in P might lead to the reductio-supposition ~P, and reductio-interest in P relative to the supposition {~P}. However, the supposition {~P} will not be recorded as part of the interest-supposition of the reductio-interest, so the reasoner simply readopts interest in P. This is not circular reasoning, because the single interest is a schematic interest that really encodes two different interests. However, if we look at the generation paths for this interest, they are circular, as diagramed in FIG. 19. This creates a problem for the cancellation rules, because cancelling interest in Q should cancel the interest P and the supposition ~P; however this will not be accomplished by the simple cancellation rules just described, because that interest is generated in another way, viz., from the reductio-supposition ~P. Proper cancellation rules must be able to compute such "unanchored" circularities and cancel them.

The most straightforward algorithm for detecting such circularities would search backwards from a node or interest along generation-paths, rejecting each path as it becomes circular, until either a noncircular path is found or all paths are rejected. But that algorithm turns out to be horribly inefficient when applied to large problems. The algorithm used by the method of the invention works as follows. First, when a node or interest is cancelled, the set of all "dependencies" is computed. These are interests and nodes occurring on some generation-path from the cancelled node or interest, where these nodes and interests are defined recursively to include the node-consequences of a node, the link-interests of left-links (cancelled or not), suppositions generated by interests, and interests generated by reductio-suppositions (these are the direct-reductio-interests). Second, we compute the subset of dependencies that are "directly-anchored" by also being generated by interests or reductio-suppositions different from the initial one and not contained in the set of dependencies. We recursively delete the directly-anchored nodes and interests and everything generated from them from the set of dependencies. The remaining nodes and interests are unanchored and can be cancelled.

To implement the new cancellation rules, two slots are added to inference-nodes: enabling-interests and generated-direct-reductio-interests:

The enabling-interests of a node are the resultant-interests of interest-links such that the node is inferred by discharging the interest-link (either by MAKE-INFERENCE-FROM-LINK or REPLICATE-DISCHARGES).

The generated-direct-reductio-interests of a node are the interests containing the node in their list direct-reductio-interest.

In addition, two slots are added to interests: discharging-nodes and cancelling-node.

If a node answers a query, it is inserted into the list of discharging-nodes for the interest recording the query. When an inference is made from an interest-link, either by MAKE-INFERENCE-FROM-LINK or REPLICATE-DISCHARGES, the nodes from which the inference is made are inserted into the lists of discharging-nodes of the corresponding members of the link-interests. When a reductio-conclusion is drawn by finding a node that discharges a direct-reductio-interest interest, the node is inserted into the list of discharging-nodes for the interest. In other words, the discharging-nodes of an interest are the nodes that discharge the interest in such a way that an interest from which the discharged interest was derived (by backwards reasoning or by generating a reductio-supposition and then adopting the discharged interest as a reductio-interest) can then be be discharged.

When an interest is cancelled as a result of inferring an appropriate node, that node is the cancelling-node of the interest.

(CANCEL-INTEREST-IN interest) begins by computing the lists of dependent-nodes and dependent-interests. These lists are constructed recursively according to the following rules:

interest is inserted into the list of dependent-interests suppositions generated by dependent-interests are dependent-nodes if L is a left-link of a dependent-interest and in is a link-interest or cancelled-link-interest of L:
in is a dependent-interest
any discharging-nodes of in are dependent-nodes node-consequences of a dependent-node are dependent-nodes direct-reductio-interests in the negation of a dependent-node (i.e., the node is in the list direct-reductio-interest for the interest) are dependent-interests if a reductio-supposition is in the list of dependent-nodes, and all direct-reductio-interests are put in the list of dependent-interests.

Then nodes and interests that can be generated from nodes and interests not in the lists of dependent-nodes and interests are removed from the lists of dependent-nodes and interests. Such nodes and interests are said to be "anchored".

In computing the anchored nodes and interests, we first compute the "directly-anchored" nodes and interests. Let independent-reductio-suppositions be the set of reductio-supposition-nodes that are not in the list of dependent-nodes.

The directly-anchored-nodes are those dependent-nodes that either (1) have an uncancelled generating-interest that is not a dependent-interest, (2) have a support-link whose basis consists of nodes that are uncancelled and not dependent, (3) were obtained by discharging a direct-reductio-interest in the negation of a node that is neither cancelled nor dependent and independent-reductio-suppositions is nonempty, or (4) have a discharged-interest with a right-link whose resultant-interest is neither cancelled nor in the list of dependent-interests. Condition (4) means that if we are "finished with" a node that is obtained by making an inference from a link (perhaps because the discharged-interest is just one of several interests that must be discharged to make an inference from a right-link of the interest), then the node will not be cancelled. The directly-anchored interests are those dependent-interests other than interest that either (1) have generating-nodes that are not dependent-nodes, (2) are direct-reductio-interests and (a) independent-reductio-suppositions is nonempty and (b) some node in their direct-reductio-interest slot is not a dependent-node, or (3) have a right-link whose resultant-interest is not a dependent-interest.

We remove the directly-anchored nodes and interests from the lists of dependent-nodes and interests. Then we recursively anchor nodes and interests that can be derived from them, removing them from the lists of dependent-nodes and interests as we go. The rules for this are as follows, where interest is the interest with which interest-cancellation began:

If in is an anchored interest:
  for every left-link L of in:
    anchor the link-interests of L that are different from interest
    for every cancelled-link-interest in* of L that is different from interest:
      anchor in*
      if cn is the cancelling-node of in*, anchor cn
    anchor every generated-supposition of in*
if node is an anchored node:
  anchor any node-consequences of node having a support-link whose basis consists of uncancelled non-dependent-nodes
  if node is a reductio-supposition:
    return node to the list of independent-reductio-suppositions
    for every direct-reductio-interest in:
      if in is different from interest and contains some uncancelled non-dependent-nodes in its direct-reductio-interest slot, anchor in
      anchor any cancelling-node of in
    for every generated-direct-reductio-interest in of node,
      if independent-reductio-suppositions is nonempty:
        if in is different from interest, anchor in.
        anchor any cancelling-node of in After all the anchored nodes and interests are removed from the lists of dependent-nodes and interests, those that remain can be cancelled.

CANCEL-NODE works similarly.

The prioritization rules must also be changed, for two reasons. First, the interest-priority of a reductio-interest should be determined by the interest-priorities of the interests from which it is derived by backwards reasoning, but that can no longer be computed by looking at its right-links because direct-reductio-interests no longer have right-links. Second, the complexity of reductio-suppositions is considerably reduced because the node-suppositions record only the formula that is newly-supposed, and this will have the affect of inflating the priority of reasoning from such suppositions. These problems can be handled simultaneously by letting the discounted-node-strength of a supposition be determined by the interest-priority of its generating interests, and letting the interest-priority of a direct-reductio-interest be determined by the discounted-node-strengths of the suppositions generating it. More precisely, the following rules will be adopted:

Inference-nodes

If a node is defeated, its discounted-node-strength is $\alpha_0$.

If an undefeated node has an empty list of generating-interests, its discounted-node-strength is the maximum (over its node-arguments) of the product of the discount-factor of the support-link-rule of the last support-link in the argument and the strength of the argument. (This case includes all non-suppositional nodes.)

If a node is a supposition, its discounted-node-strength is the maximum of:
  (1) the product of *reductio-discount* and the maximum of the interest-priorities of the generating-interests for which it is a reductio-supposition; and
  (2) the interest-priorities of the generating-interests for which it is not a reductio-supposition.

Queries

The interest-priority of a query from permanent-ultimate-epistemic-interests is its degree-of-interest.

The interest-priority of any other query is its degree-of-interest if it has not been answered yet, and it is the product of *answered-discount* and its degree of interest if it has already been answered.

Interests

If an interest has neither generating-nodes nor undefeated right-links nor undefeated discharged-right-links, its interest-priority is $\alpha_0$. (This includes interest in defeaters.)

Otherwise, the interest-priority is the maximum of:
  (1) the discounted-node-strengths of its generating-nodes that are not reductio-suppositions;
  (2) the product of *reductio-interest* and the maximum of the discounted-node-strengths of its generating-nodes that are reductio-suppositions;
  (3) for each of its right-links or discharged-right-links, the product of the discount-factor of the link-rule and the interest-priority of the resultant-interest.

With these changes, the method of the invention can handle reductio reasoning properly in both deductive and defeasible contexts. For instance, the lottery paradox paradox is done satisfactorily as follows:

---

The lottery paradox paradox using logic
Given premises:
  P   justification = 1
Ultimate epistemic interests:
  ~T1   interest = 1

-continued

```
~T2    interest = 1
~T3    interest = 1
FORWARDS PRIMA FACIE REASONS
   pf-reason 1: {R} ||=> ~T1 strength = 1
   pf-reason 2: {R} ||=> ~T2 strength = 1
   pf-reason 3: {R} ||=> ~T3 strength = 1
   pf-reason 4: {P} ||=> R strength = 1
FORWARDS CONCLUSIVE REASONS
   con-reason 1: {R} ||=> (T1 v (T2 v T3)) strength = 1
================ULTIMATE EPISTEMIC INTERESTS ================
interst in ~T3
in unsatisfied.
Interest in ~T3
is unsatisfied.
------------------------------------------
Interst in ~T2
is unsatisfied.
------------------------------------------
Interest is ~T1
is unsatisfied.
------------------------------------------
Cumulative size of arguments = 13
Size of inference-graph = 22 of which 0 were unused suppositions.
59% of the inference-graph was used in the argument.
15 interests were adopted.
```

First-Order Reasoning

For many purposes, we want an automated reasoner to be able to perform first-order reasoning (reasoning in the predicate calculus). This could be done without modifying the architecture, just by supplying appropriate inference-rules. This can be done by adding the following rules to those for the propositional calculus (where Sb(c,x)P is the result of substituting 'c' for all free occurrences of 'x' in P):

Forwards reasons:

quantifier negation eliminations:

infer $(\exists x)\neg P$ from $\neg(\forall x)P$ infer $(\forall x)\neg P$ from $\neg(\exists x)P$ universal instantiation:

infer Sb(c,x)P/X from $(\forall x)$P/X where c is a term already occurring in some conclusion Q/Y such that Y⊆X and Sb(c,x)P results from substituting c for all free occurrences of x in P. If there are no such terms, infer Sb(@,c)P/X from $(\forall x)$P/X.

existential instantiation:

infer Sb(@x,x)P/X from $(\exists x)$P/X where @x is a constant that has not previously occurred in any conclusions.

Auxiliary rule/or forwards reasoning:

If Q/Y is a newly adopted conclusion, then for each conclusion of the form $(\forall x)$P/X such that Y⊆X, infer Sb(c,x)P/X from $(\forall x)$P/X where c is a term occurring in Q/Y but not occurring in any previous conclusions.

Backwards reasons:

quantifier negation introductions:

adopt interest in $(\exists x)\neg P$ to infer $\neg(\forall x)P$ adopt interest in $(\forall x)\neg P$ to infer $\neg(\exists x)P$ universal generalization:

adopt interest in Sb(^x,x)P/X to infer $(\forall x)$P/X, where ^x is a free variable that has not previously occurred in any conclusions.

existential generalization:

adopt interest in Sb(c,x)P/X to infer $(\exists x)$P/X where c is a term already occurring in some conclusion Q/Y such that Y⊆X. If there are no such terms, adopt interest in Sb(@,x)P/X to infer $(\exists x)$P/X.

Auxiliary rule for backwards reasoning:

If Q/Y is a newly adopted conclusion, then for each interest of the form $(\exists x)$P/X such that Y⊆X, adopt interest in Sb(c,x)P/X to infer $(\exists x)$P/X where c is a term occurring in Q/Y but not occurring in any previous conclusions.

In addition, the syntactical constraint on reductio must be liberalized to allow its use with quantified formulas.

These rules make the method of the invention complete for first-order logic. That is, given any valid formula P of first-order logic, if it is made the query-formula of a query inserted into ultimate-epistemic-interests, the the method of the invention can be used to construct a deductive argument supporting P and thereby come to believe P. However, these rules are inefficient. They have the effect that basically the same reasoning will be repeated over and over again. For instance, given an interest in $(\exists x)(F\ x)$, the reasoner will adopt interest in (F a), and reason backwards from it. Then the reasoner will also adopt interest in (F b), and perform essentially the same backwards reasoning from that formula. If we assume that reason-schemas just concern predicates and relations, and do not contain occurrences of individual constants, then nothing would be lost by keeping the reasoning general, adopting an interest in (F x), for free x, rather than separate interests in (F a) and (F b), reason backwards from (F x), and look for bindings for x that would satisfy the resulting interests.

It will occur to those familiar with the current literature in automated reasoning that this problem can be solved by using skolemization and unification. Skolemization and unification are well understood for deductive systems based upon resolution refutation. However, there are novel problems for how to use them in a natural deduction system, and as will become apparent below, these problems are not trivial.

Unification in forwards-reasoning

The basic strategy for using unification in forwards-reasoning is to have the rules of UI and EI replace bound variables by free variables and skolem functions (explained below), and then use unification to find common instances of formulas containing free variables.

Two expressions E1 and E2 containing variables unify if and only if there is a set of assignments to the variables of each which produces a common expression. For example, where x and y are variables, (F x a) and (F b y) unify to (F b a) by the assignment x=b and y=a. There may be more than one way to unify a pair of expressions. For instance, (F x) and (F y) can be unified either by assigning y to x (producing (F x)) or by assigning x to y (producing (F y)). The latter expressions could also be unified by assigning a to both x and y, producing (F a). The latter unification is "less general" than either of the former, in the sense that (F a) is an instance of either (F x) or (F y), but not conversely. A most general unifier is one that produces an expression such that the expression produced by any other unifier is an instance of it. In this example, the unifier that assigns x to y and the unifier that assigns y to x are both most general unifiers.

In the limiting case in which two expressions are identical, their unifier will be taken to be T. Otherwise, unifiers will be taken to be a-lists (lists of dotted pairs), and as such are applied to expressions by substituting the second member of each dotted-pair for the first member. The proper way to write this in LIST is (SUBLIS u expression), however I will often abbreviate this as u(expression).

If two expressions contain disjoint sets of variables, then a unifier can be regarded as a single assignment to all of the variables simultaneously. In this case, there are standard algorithms for computing a most general unifier if one exists. As a first approximation, we can let (MGU p q vars) be a most general unifier for p and q relative to the variables in vars (where p and q have no variables in common).

In the standard definition of unification, the parts of the expressions that are not variables must be identical in order for the expressions to unify. However, when dealing with quantified formulas, it is useful to allow them to be notational variants rather than requiring them to be identical. Then, for example, we can have (∃y)(F a y) unify with (∃z)(F x z) even though the bound variables y and z are different. It is straightforward to build a test for notational variants into the unification algorithms, and I will so-understand MGU.

Expressions can only be unified by MGU if they contain no variables in common. If they do share variables, those common variables must first be rewritten, and the unifier must be regarded as a pair $(u_1, u_2)$ of assignments rather than a single assignment (thus allowing the same variable to be treated in two different ways in the two expressions). (UNIFIER p q p-vars q-vars) produces this pair of assignments when p-vars are the variables occurring in p and q-vars are the variables occurring in q.

We will also have occasion to unify one set of expressions into another. This amounts to finding all unifiers that unify the first set with some subset of the second set. This is accomplished by the function SET-UNIFIER. (SET-UNIFIER X Y X-vars Y-vars) returns the list of all unifiers unifying X into Y. For example, (set-unifier '((F c)(G y))'((G a)(H c)(G b)(F z)) '(x y)'(z)) returns ((((y . a)) ((z . c))) (((y . b)) ((z . c)))).

Formulas with free variables will be produced by the forwards-inference-rules UI and EI. These rules instantiate quantified conclusions by replacing universally quantified variables by free variables, and existentially quantified variables by skolem-constants (if the formula contains no free variables) or skolem-functions applied to the free variables of the formula. Typographically, skolem-constants and skolem-functions will be indicated by appending "@". For instance, the terms "@y" and "(@y x z)" might be produced by EI. A record of the resulting free variables occurring in the node-formula is kept in the new slot node-variables. For convenience, we also add a slot c-list-variables to c-lists and record the list of node-variables there as well. EI and UI are then formulated as follows (sections of pseudo-code printed in bold face will be discussed later):

UI node
If node is of type "inference", and its node-formula p is a universal generalization, let x be the variable bound by the initial universal quantifier and let p* be the matrix of p (the formula immediately following the initial quantifier). Construct a new variable y and substitute it for x in p* to produce p. Then return the list consisting of the single list <p, {node}, UI,<Y>>

EI node
If node is of type "inference", and its node-formula p is an existential generalization:
Let x be the variable bound by the initial existential quantifier, let p* be the matrix of p (the formula immediately following the initial quantifier), let u-vars be the list of node-variables of node, and let s-funs be the list of skolem-functions occurring in p*.
If s-funs is empty, let level be 1. Otherwise, let level be one plus the maximum of the ei-levels of the members of s-funs. Let discount be $0.5^{(level-1)}$.
If u-vars is empty, let fun be a new variable @y. Let term be fun If u-vars is nonempty, let fun be a new skolem-function @y, and let term be constructed by appending @y to the front of the list of u-vars.
Let p** be the result of substituting term for x in p*.
If there is no node node* in processed-conclusions whose node-formula differs from p** only by having some other singular term in place of term:
set the ei-level of fun to be level
return the list consisting of the single list <p**, {node},EI,<T>,discount>

Earlier, forwards-inference-rules were taken to return list of triples, but now these rules will be taken to return lists of quadruples or quintuples. The fourth and fifth members will presently be explained.

The free variables produced by EI and UI will be called conclusion-variables, to distinguish them from the free-variables (interest-variables) that will be produced (see below) by reasoning backwards from interests by EG and UG. The role of ei-levels will be explained below. The ei-level of a skolem-constant or skolem-function is stored on its property list.

The significance of skolemization and unification is that standard rules of forwards inference can be generalized by employing unification. For instance, suppose we have inference-nodes supporting P and (Q→R), and $(u_1,u_2)$ unifies P and Q. Then P and (Q→R) contain free variables, and so imply their own instances $u_1(P)$ and $u_2(Q→R)$. $u_2(Q→R) = (u_2(Q)→u_2(R))$, and $u_1(P)=u_2(Q)$, so by modus-ponens we can infer $u_2(R)$. This reasoning can be shortened by rewriting modus-ponens as the following rule:

If $(u_1,u_2)$ unifies P and Q, then from P and (Q→R), infer $u_2(R)$.

To illustrate, consider the following implication and non-implication:

(∃y)(∀x)(F x y),(∃x)(∀y)((F x y)→P)⊢P   (i)
(∀x)(∃y)(F x Y),(∀y)(∃x)((F x y)→P)⊬P   (ii)

The easiest way to see that (ii) is invalid is to note that it is equivalent to:

(∀x)(∃y)(F x y),(∃y)(∀x(F x y)→P)⊬P but (∀x)(∃y)(F x y) does not imply (∃y)(∀x)(F x y).
The implication can be established easily as follows:

Given premises:
    (∃y)(∀x)(F x y)    justification = 1
    (∃x)(∀y)((F x y) → P)    justification = 1
Ultimate epistemic interests:
    P    interest = 1
1 (∃y)(∀x)(F x y)
given
maximal-degree-of-support: 1
2 (∃x)(∀y)((F x y) → P)
given
maximal-degree-of-support: 1

---

Retrieving #<Query #1: P> from the inference-queue.
    # 1
    interest: P
    This is of ultimate interest

---

Retrieving #<Node 1> from the inference-queue.
3 (∀x)(F x @y0)
inferred by support-link #1 from {1} By Ei
maximal-degree-of-support: 1
This node encodes a deductive argument.

---

Retrieving #<Node 3> from the inference-queue.
4 (F x1 @ y)
Inferred by support-link #2 fro m{3} by UI
maximal-degree-of-support: 1
This node encodes a deductive argument.

---

Retrieving #<Node 4> from the inference-queue.

---

Retrieving #<Node 2> from the inference-queue.
5 (∀y)((F @y2 y) → P)
Inferred by support-link #3 from {2} by EI
maximal-degree-of-support: 1
This node encodes a deductive argument.

---

Retrieving #<Node 5> from the inference-queue.
6 ((F @y2 x3) → P)
Inferred by support-link #4 from {5} by UI
maximal-degree-of-support: 1
This node encodes a deductive argument.

---

Retrieving #<Node 6> from the inference-queue.
7 P
Inferred by support-link #5 from {4, 6} by modus-ponens1
maximal-degree-of-support: 1
This node encodes a deductive argument.

---

<Node 7> answers #<Query #2: P>

---

ALL QUERIES HAVE BEEN ANSWERED DEDUCTIVELY.
========== ULTIMATE EPISTEMIC INTERESTS ==========
Interest in P
is answered affirmatively by conclusion 7

====================================
ARGUMENT #1
This is a deductive argument for:
    P
which is of ultimate interest.
1. (∃y)(∀x)(F x y)    given
3. (∀x)(F x @y0)    EI from {1}
4. (F x1 @y0)    UI from {3}
2. (∃x)(∀y)((F x y) → P)    given
5. (∀y)((F @y2 y) → P)    EI from {2}
6. ((F @y2 x3) → P)    UI from {5}
7. P    modus-ponens1 from {4, 6}
====================================

However, a similar attempt to prove the non-implication fails:

---

Given premises:
    (∀x)(∃y)(F x y)    justification = 1
    (∀y)(∃x)((F x y) → P)    justification = 1
Ultimate epistemic interests:
    P    interest = 1
1 (∀x)(∃y)(F x y)
given
maximal-degree-of-support: 1
2 (∀y)(∃x)((F x y) → P)
given

89

-continued maximal-degree-of-support: 1

---

Retrieving #<Query #1: P>]from the inference-queue.
  # 1
    interst: P
    This is of ultimate interest

---

Retrieving #<Node 1> from the inference-queue.
  # 3 (∃y)(F x0 y)
    inferred by suppot-link #1 from {1} by UI
    maximal-degree-of-support: 1
    This node encodes a deductive argument.

---

Retrieving #<Node 3> from the inference-queue.
  # 4 (F x0 (@y1 x0))
    inferred by support-link #2 from {3} by EI
    maximal-degree-of-support: 1
    This node encodes a deductive argument.

---

Retrieving #<Node 2> from the inference-queue.
  # 5 (∃x)((F x x2) → P)
    inferred by support-link #3 from {2} by EI
    maximal-degree-of-support: 1
    This node encodes a deductive argument.

---

Retrieving #<Node 5> from the inference-queue.
  # 6 ((F (@y3 x2) x2) → P)
    inferred by support-link #4 from {5} by EI
    maximal-degree-of-support: 1
    This node encodes a deductive argument.

---

Retrieving #<Node 4> from the inference-queue.

Retrieving #<Node 6> from the inference-queue.
========ULTIMATE EPISTEMIC INTERESTS ========
Interest in P
is unsatisfied. NO ARGUMENT WAS FOUND.

---

The reason this fails is that the node-formula of node 4 does not unify with the antecedent of the node-formula of node 6.

As previously discussed, the result of a forwards-inference (e.g., the list of results produced by modus-ponens) will now be a quadruple or a quintuple rather than a triple. For instance, if modus-ponens is used to infer a conclusion Q from the node-formulas of node and node*, using the unifier u, what is returned is the list consisting of the single list <Q, {node, node*}, MODUS-PONENS, u>. The fourth member is the list of instantiations of the basis, and the fifth member is the discount (to be explained later). The list of instantiations of the members of the basis is the list of substitutions produced by unification. For a monadic inference rule, this is <T>. For a binary inference rule, this is the list of two substitutions produced by unification, which is the same thing as the unifier. For instance, if modus-ponens produces the unifier $(u_1, u_2)$ when applied to P and (P*→Q*), then $u_1$ is the instantiation applied to P, and $u_2$ is that applied to (P*→Q*). For inferences in accordance with a ternary inference rule, the list of instantiations would be a triple, and so on. DRAW-CONCLUSION now takes the instantiations and discount as arguments. The list of instantiations is required for constructing the list of reductio-ancestors, the non-reductio-supposition, and the node-supposition for the node resulting from the forwards-inference. The actual computation of the list of reductio-ancestors, the non-reductio-supposition, and the node-supposition is done by CONCLUSION-DATA. Then DRAW-CONCLUSION is revised as follows, where the changes are printed in bold face:

DRAW-CONCLUSION P B R instantiations discharge (optional-argument: interest)

If no member of B is cancelled, let sup be the union of the node-suppositions of the members of B, less discharge, and

90 let S be the sequent <sup, P>. If S has not been validated deductively, and all members of B are S-independent:

If R is not defeasible, let NDA be the set of unions of the crossproducts of the sets of nearest-defeasible-ancestors of members of B*, and otherwise let NDA be NIL.

If (CONCLUSION-DATA B P instantiations interest discharge) is nonempty, let RA be its first member (the reductio-ancestors), NRS the second member (the non-reductio-supposition), and sup the third member of Q. Let S be the sequent <sup,P>.

If (1) sup does not contain an explicit contradiction, (2) every member of B is independent of S, and (3) not SUBSUMED S ND NRS:

Let deductive-only be T if R is not reductio and some member of B is a deductive-only conclusion; otherwise let deductive-only be NIL.

If there is an inference-node of kind "inference" supporting S, let node be that inference-node. If node is a deductive-only conclusion, but deductive-only is NIL, redefine the deductive-only slot in node to make it NIL.

Otherwise, construct a new inference-node node supporting S with reductio-ancestors RA and non-reductio-supposition NRS. Make node deductive-only if and only if deductive-only is T.

If node is a deductive-node, and interest is not NIL, add interest to the list of enabling-interests for node.

Build a support-link link recording the inference of node from B in accordance with R, construct the set of new non-circular arguments this produces for node and its inference-descendants, and recompute the lists of node-ancestors and nearest-defeasible-ancestors for the inference-descendants.

If the preceding step does produce new arguments for node:

ADOPT-INTEREST-IN-DEFEATERS-FOR link.

Record link as a support-link for node.

If node is newly constructed, add it to the inference-graph and store it in the list of conclusions If R is defeasible, add {node} to the list of nearest-defeasible-ancestors of node; otherwise append NDA to the list of nearest-defeasible-ancestors of node.

CANCEL-SUBSUMED-LINKS link.

If node is either newly-constructed, or its maximal-degree-of-support has increased as a result of adding this support-link, let old-degree be the old maximal-degree of support for node:

Let i-list be the corresponding i-list of the conclusion-c-list of node.

If node is either newly-constructed, or its maximal-degree-of-support has increased as a result of adding this support-link, DISCHARGE-INTEREST-IN-DEFEATERS node i-list old-degree UPDATE-BELIEFS link.

If S was not previously concluded, insert node into the inference-queue.

If node already existed but this inference increases the maximal-degree-of-support of node, ADJUST-SUPPORT-FOR-CONSEQUENCE node old-degree If node is either newly-constructed, or its maximal-degree-of-support has increased as a result of adding this support-link, DISCHARGE-INTEREST-IN node i-list old-degree interest If node is either newly-constructed, or its maximal-degree-of-support has increased as a result of adding this support-link, and reductio-adabsurdum is enabled, DISCHARGE-REDUCTIOS node i-list old-degree interest.

Set the old-undefeated-degree-of-support of node to be the undefeated-degree-of-support of node.

As will be explained presently, the list of reductio-ancestors and the non-reductio-supposition will become a list of pairs <node,formula> where node is the node recording the supposition and formula is the instance of the node-formula being assumed by the current inference-node. With this understanding, CONCLUSION-DATA is as follows:

CONCLUSION-DATA basis formula instantiations interest discharge.

Let RA be the union of the results of applying each instantiation to the set of reductio-ancestors of the corresponding member of basis and removing any of the resulting pairs whose first members are equal to discharge.

Let NR be the union of the results of applying each instantiation to the set of non-reductio-supposition of the corresponding member of basis and removing any of the resulting pairs whose first members are equal to discharge.

Let sup be the union of the results of applying each instantiation to the set of node-suppositions of the corresponding member of basis and removing any of the resulting formulas that are equal to discharge.

Return <RA,NR,sup>.

The two main changes are the use of CONCLUSION-DATA and the fact that SUBSUMED now takes NRS as an argument. The details of the latter will be discussed below.

Recall that substantive-reasons are instantiated by FORWARDS-MATCH-INSTANCES. In sentential reasoning, this was done by pattern-matching, but it must now be done by unification. Basically, the list of reason-premises is unified into the set of node-formulas for nodes in the list of processed-conclusions.

In addition to EI and UI, we add four forwards-logical-reasons pertaining specifically to quantifiers:

neg-UG:
  infer $(\exists x)\neg p$ from $\neg(\forall x)p$.
neg-EG:
  infer $(\forall x)\neg p$ from $\neg(\exists x)p$.
E-removal:
  infer $(\forall x)(p\rightarrow q)$ from $((\exists x)p\rightarrow q)$.
A-removal:
  infer $(\exists x)(p\rightarrow q)$ from $((\forall x)p\rightarrow q)$.

Unification in Discharging Interests

In interest-driven reasoning, we reason forwards from given premises, drawing conclusions, and backwards from interests until we find a conclusion that discharges an interest. An interest-link attaches an interest to a set of interests from which it can be derived, so when all of the link-interests of a link have been discharged, that discharges the link itself, which discharges the resultant-interest. This reasoning can also be reformulated in terms of unification. For this purpose we can skolemize interests in much the same way we did for conclusions.

Although unification plays no role in backwards-reasoning, it re-enters the picture when we turn to discharging interests, but it does so with a surprising twist. Consider a case in which a combination of instantiation and generalization operations should allow the discharge of an interest by a conclusion. Begin with a simple case in which the node-formula is (F a) and the interest-formula is $(\exists y)(F\ y)$. When we strip the quantifier off the interest, we are then looking for a binding for the free variable. This is found by unifying (F y) with (F a). The important observation is that, for purposes of unification, we treat y as a variable rather than as a constant. On the other hand, if the interest is $(\forall x)(F\ x)$, and we remove the quantifier to produce (F x), this interest should not be satisfied by the conclusion (F a). So for purposes of unification, x should not be regarded as a variable. The interest (F x) should only be discharged by a conclusion of the form (F z) where z is a conclusion-variable (i.e., z is obtained by UI). What this indicates is that if interest-discharge is to be handled in terms of unification, we must "reverse-skolemize" the interests. That is, existential variables in the interest become free-variables and universal-variables become skolem-constants or terms built out of skolem-functions and free-variables. To illustrate this with a more complicated example, suppose the node-formula is $(\forall x)(\exists y)(\forall z)(F\ x\ y\ z\ b)$ and the interest-formula is $(\exists u)(\forall w)(\exists v)(F\ a\ u\ w\ v)$. Applying UI and EI to the conclusion yields (F x (@y x) z b). Reverse-skolemizing the interest yields (F a ^u ^@w(u) ^v). (Typographically, I will distinguish interest-variables and interest-skolem-functions from conclusion-variables and conclusion-skolem-functions by writing the former with preceding carats: ^x or ^@x.) These unify to give us (F a y ^v b). In general, a skolemized node-formula and a reverse-skolemized interest-formula unify if and only if the interest can be obtained from the conclusion by a combination of universal and existential instantiation and universal and existential generalization.

To implement this reasoning, we add a slot to interests for interest-variables, and similarly to i-lists for i-list-variables. The reverse skolemization of interests is accomplished by a pair of backwards-logical-reasons, EG and UG:

UG sequent interest

If the interest-formula p of interest is a universal generalization:

Let e-vars be the interest-variables of interest, let x be the variable bound by the initial universal quantifier, and let p* be the matrix of p (the formula immediately following the initial quantifier).

If e-vars is empty, let fun be a new variable ^@y. Let term be fun. If e-vars is nonempty, let fun be a new skolem-function ^@y, and let term be constructed by appending fun to the front of the list of e-vars.

Let p** be the result of substituting term for x in p*.

Let ug-condition be the condition (applied to variables node and unifier) that fun does not occur in the result of applying the first member of unifier to the node-supposition of node.

Where sup is the interest-supposition of interest, adopt interest in <sup,p**> with target-interest interest, and let the discharge-condition of the new interest be ug-condition.

EG sequent interest

If the interest-formula p of interest is an existential generalization, let x be the variable bound by the initial existential quantifier and let p* be the matrix of p (the formula immediately following the initial quantifier). Construct a new variable ^x and substitute it for x in p* to produce p. Where sup is the interest-supposition of interest, adopt interest in <sup,p> with target-interest interest, In sentential reasoning, interest-discharge was handled by storing the corresponding-i-list (if one existed) with each c-list and the corresponding-c-list (if one existed) with each i-list. An i-list and c-list corresponded if they had the same formula. But now that interest-discharge requires only unification rather than identity of formulas, there may be several corresponding-i-lists for each c-list (namely, all those with unifying formulas), and similarly there may be several corresponding-c-lists for each i-list. The slots in c-lists and i-lists are accordingly renamed "corresponding-i-lists" and "corresponding-c-lists". The c-list of i-list for a formula is now taken to be the first one whose formula whose a notational variant of the given formula. To implement this, MATCHING-C-LISTS-FOR returns the set of pairs <c-list, unifier> where unifier unifies the c-list-formula of c-list with the given formula; and similarly for MATCHING-I-LISTS-FOR. It is these lists of pairs that are stored in the slots corresponding-c-lists and corresponding-i-lists.

Interest-discharge proceeds by looking at corresponding-i-lists, and link-discharge proceeds by looking at corresponding-c-lists. Changes are printed against a grey background:

DISCHARGE-INTEREST-IN node corresponding-i-lists old-degree new? (optional-argument: interest)

If either new? is T or the maximal-degree-of-support of node is greater than old-degree:

Let δ be the maximal-degree-of-support of node.
    REPLICATE-DISCHARGES node δ.
    For each pair (i-list,unifier) in corresponding-i-lists:
        Let sup be the result of applying the first member of unifier to the node-supposition of node.
        For each interest N in the list of i-list-interests of i-list, if N is interest, or (1) either new? is T, or the maximal-degree of support of node is greater than old-degree, (2) the degree-of-interest of N is less than or equal to δ, (3) node satisfies the discharge-condition of N, and (4) APPROPRIATELY-RELATED-SUPPOSITIONS node N unifier, then:
            Let N-sup be the result of applying the second member of unifier to the interest-supposition of N.
            For all right-links link of N, if the degree of interest in the resultant-interest of link is less than or equal to δ, and either new? is T or the link-strength of link is greater than old-degree:
                If the link-rule of link is "answer" (i.e., it is a link to a query), add node to the list of supporting-nodes of link and DISCHARGE-LINK link.
                If (1) node is a deductive-node, (2) either unifier is <T,T> (the interest-formula and node-formula are identical) or the link-rule is monadic, and (3) sup is a subset of N-sup, then move N from the list of link-interests of link to the list of cancelled-link-interests, and DISCHARGE-LINK link.
                Otherwise, DISCHARGE-LINK link.
            If unifier is <T,T> and sup is a subset of N-sup, then:
                If node was established deductively, CANCEL-INTEREST-IN N node.
                Otherwise, for any generated-suppositions sup of interest which are such that node is deductive in sup, CANCEL-NODE sup node.

DISCHARGE-LINK link δ max-degree pending-interest (using priority, if available, to simplify the computation of interest-priorities):

If the basis-remainder of link is empty:
        Remove link from the list of right-links of all its link-interests and cancelled-link-interests and place it instead in the list of discharged-right-links for the link-interests and cancelled-link-interests.

If the link-rule of link is "answer", then record the single inference-node in the list of supporting-nodes for link as an answer to the query that is the resultant-interest of link, and discharge that ultimate-epistemic-interest.
    Otherwise, MAKE-INFERENCE-FROM-LINK link.

If the basis-remainder of link is nonempty, and pending-interest is either NIL or equal to the pending-interest of link:
        Let S be the sequent from the first member of the basis-remainder of link, and let condition be the condition from the first member of the basis-remainder of link.
    Delete the first member from the basis-remainder.
    If condition is empty and either the set of free-variables occurring in S is empty or the reason-length of the link-rule is 1, let deductive-node be the first deductive inference-graph node (if any) whose node-formula is the sequent-formula of S and whose node-supposition is a subset of the sequent-supposition of S. Otherwise, let deductive-node be NIL.
    If there is already an interest interest in S and satisfying the condition condition:
        Add link to the list of right-links of interest.
        If deductive-node is not NIL, add interest to the list of cancelled-link-interests of link; otherwise, add interest to the list of link-interests of link.
    make interest the pending-interest of link.
    Recompute the degree-of-interest, the interest-priority, and the maximum-degree-of-interests for interest.
    If interest is not a reductio-interest but the resultant-interest of link is, make interest a reductio-interest.
    If interest is not on the inference-queue, and adding link has lowered interest's degree-of-interest, then reinsert interest into the inference-queue.
    If S is not already in interest, construct an interest interest recording interest in S, with link as its sole right-link, make interest the pending-interest of link, and insert interest into the inference-queue. if deductive-node is not NIL, add interest to the list of cancelled-link-interests of link.; otherwise, add interest to the list of link-interests of link.
    If deductive-node is non-NIL let conclusion be deductive-node. Otherwise, if there is a node whose node-formula unifies with the interest-formula of interest, whose node-supposition is appropriately related to the interest-supposition of interest, it satisfies the discharge-condition of interest, and its maximal-degree-of-support is at least δ, then, let it be conclusion. If conclusion is exists:
        DISCHARGE-LINK link δ max-degree pending-interest (using priority, if available, to simplify the computation of interest-priorities).
        if the node-formula of conclusion is the same as the interest-formula of interest:
            If deductive-node exists, CANCEL-INTEREST-IN interest relative to the protected-node deductive-node.
            Otherwise, if the node-supposition of conclusion is a subset of the interest-supposition of interest, then for any generated-suppositions sup of interest which are such that conclusion is deductive in sup, CANCEL-NODE sup conclusion.

If an interest-link has more than one link-interest, then discharging the individual interests by unifying them with conclusions does not guarantee that the target-interest can be inferred. This is because the unifications employed in unifying the individual link-interests may not be compatible with one another. Thus before making an inference from the link, we must verify that the entire set of conclusions unifies with the entire set of interests. This will often fail, even when the link has become fully discharged. Thus the initial inference from a link will often be made by REPLICATE-DISCHARGES. This is an important departure from sentential reasoning. This also affects the cancellation of interests that are discharged by deductive-nodes. There is, in general, no guarantee that such a deductive-node will enter into making an inference from the link. That is only guaranteed when either the interest-sequent contains no free-variables (so only trivial unification is involved in the discharge) or the reason-length of the link-rule is 1 so that the unifier need not be consistent with other unifiers for other members of the link-basis. Accordingly, this is the only case in which the link-interest will be moved into cancelled-link-interests. Because the same interest can be a link-interest for more than one link, the only case in which the interest can be totally cancelled is that in which the node-formula and interest-formula are the same. This requires link-interests to be created even when there is already a deductive conclusion available to discharge them. Such interests are created and put straight into the list of cancelled-link-interests for the link.

Suppositional reasoning and making an inference from a link with a link-discharge each introduce additional complexities that will be discussed in the next section. In the meantime, we can define the following provisionally to capture the preceding observations, and revise them in the next section:

MAKE-INFERENCE-FROM-LINK-WITHOUT-DISCHARGE link.

Find all lists B of inference-nodes (1) of adequate strength, (2) such that, if common variables in different members of B are rewritten then the list of node-formulas of member of B unifies with the interest-formulas of the link-interests and cancelled-link-interests, (3) having node-suppositions appropriately-related to the interest-suppositions relative to the resultant-interest of link, (4) satisfying the discharge-conditions of the corresponding link-interests, and (5) not being deductive-only inference-nodes unless the link-rule is non-defeasible.

For each such B, where R is the link-rule, let instantiations be the list of instantiations of the nodes produced by combining the first member of the unifier with the rewriting of the variables for the resultant-interests of B, resultant-interest the resultant-interest of link, and formula be the result of applying the second member of the unification to the interest-formula of resultant-interest, and DRAW-CONCLUSION formula B R instantiations NIL resultant-interest.

REPLICATE-DISCHARGES node degree

For each pair (i-list, unifier) in the corresponding-i-lists of the node-c-list of node:

Let sup be the result of applying the first member of unifier to the node-supposition of node.

For each interest N in the i-list-interests of i-list, if node satisfies the discharge-condition of N, and node and N have appropriately-related suppositions relative to the resultant-interest of link, then for each discharged-right-link link of N, if it is not an answer-link and degree is greater than or equal to the link-strength:

If node is a deductive-node and either node has no node-variables or the reason-length of the link-rule is 1, and sup is a subset of the result of applying the second member of unifier to the interest-supposition of N, then move N from the link-interests of link to the cancelled-link-interests of link.

If link has a link-discharge, REPLICATE-SHORT-DISCHARGES node link N unifier; otherwise, REPLICATE-LONG-DISCHARGES node link N unifier.

REPLICATE-LONG-DISCHARGES node link N unifier

Let interests be the result of removing N from the link-interests of link.

Find all lists B of inference-nodes (1) of adequate strength, (2) such that, if common variables in different members of the list of node-formulas of N followed by the member of B are rewritten then B unifies with the list of interest-formulas of interest followed by the members of interests via some unifier $(u_1, u_2)$, (3) having node-suppositions appropriately-related to the interest-suppositions relative to the resultant-interest of link, (4) satisfying the discharge-conditions of the corresponding members of interests, and (5) not being deductive-only inference-nodes unless the link-rule is non-defeasible.

For each such B, where R is the link-rule, let instantiations be the list of instantiations of the nodes produced by combining $u_1$ with the rewriting of the variables for the different members of B,resultant-interest be the resultant-interest of link,formula be the result of applying $u_2$ to the interest-formula of resultant-interest, B+the result of adding node to the front of B, instantiations+the result of adding the first member of unifier to the front of instantiations, and DRAW-CONCLUSION formula B+R instantiations NIL resultant-interest.

Suppositional reasoning

Suppositional reasoning introduces new complexities. There are two kinds of suppositional reasoning that occur in the practice of the method of the invention—conditionalization, and reductio. Let us begin with conditionalization. Given a reverse-skolemized interest (P→Q), we want to find a conclusion (P*→Q*) that unifies with it. Such a conclusion can be obtained by conditionalization from a conclusion Q*/{P*}. But notice that the latter conclusion unifies with Q/{P} if and only if (P*→Q*) unifies with (P→Q). Thus we can direct the search for (P*→Q*) by looking for something that unifies with Q/{P}, and then conditionalizing. This is done by adopting interest in Q/{P} and reasoning backwards. To get something that unifies with Q/{P}, we must make a supposition P*/{P*} that unifies with P/{P}, and then draw the corresponding conclusion Q* with respect to {P*}. Thus we must look for an appropriate supposition P*/{P*} to make. This in turn can be done by making the supposition P/{P}, and treating it as a schematic supposition. That is, we treat the interest-variables in P as schematic variables, and instantiate them in any way that might lead us to a conclusion of the form Q*/{P*}. This is analogous to the way we treat conclusion-variables in forwards reasoning. That is, we instantiate them in any way that is potentially useful, and our test for that is that by instantiating them in that way we can make a forwards inference. So we adopt the supposition P/{P}, and reason forwards from it, treating the interest-variables just like conclusion-variables for purposes of forwards reasoning. This will be done by including them among the node-variables for the node encoding the supposition.

In sentential reasoning, before making a new supposition we check that the same supposition has not already been made. In first-order reasoning, we must check more generally that no supposition has been made whose schematic variables can be instantiated in such a way as to make the new supposition an instance of it.

Given an interest in (P→Q)/X, the method of the invention will adopt interest in Q/X∪{P}. Then a conclusion Q*/Y* should discharge this interest if and only if there is a subset (appropriately ordered) $X_0$ of X∪{P} such that Q*/Y* unifies with Q/$X_0$. Recall that a unifier U unifies a list of expressions X into a list of expressions Y relative to the variable-lists var1 and var2 if and only if there is an appropriately-ordered sublist Y0 of Y such that U unifies X with Y relative var1 and var2. The function SET-UNIFIER, defined above, finds all such unifiers. Let (MERGE-MATCHES* m1 m2) be a match equivalent to applying m1 first and then m2. Then interest-discharge can proceed as follows. First determine whether Q* unifies with Q via some unifier ($u_1$ $u_2$). If so, apply the unifiers $u_1$ and $u_2$ to the suppositions Y* and X∪{P}, producing $u_1$(Y*) and $u_2$(X∪{P}). If $u_1$(Y*)⊆$u_2$(X∪{P}), that is sufficient for the conclusion to discharge the interest, but this is not a necessary condition for interest-discharge. The difficulty is that Y* may contain free variables not occurring in Q* and X∪{P} may contain free variables not occurring in X. In that case, interest-discharge can still occur if there is a unifier ($u_1$* $u_2$*) that unifies $u_1$(Y*) into $u_2$(X∪{P}) relative to those remaining variables. If there is such a unifier, then if $u_1$**=(MERGE-MATCHES* $u_1$ $u_2$*) and $u_2$**=(MERGE-MATCHES* $u_2$ $u_2$*), the conclusion Q*/Y* should discharge the interest Q/X∪{P} relative to the unifier ($u_1$ $u_2$). To illustrate, consider the following argument for (∃x)(∃y)((F x y)→(F x x)):

---

Given premises:
Ultimate epistemic interests:
    (∃x)(∃y)((F x y) → (F x x))    interest = 1

---

Retrieving #<Query #1: (∃x)(∃y)((F x y) → (F x x))> from the inference-queue.
    # 1
    interest: (∃x)('y)(F x y) → (F x x))
    This is of ultimate interest
    # 2
    interest (∃y)((F ^@y0 y) → (F ^@y0 ^@y0))
    For interest 1 by EG

---

Retrieving #<Interest 2: (∃y0)((F ^@y0 y) → (F ^@y0 ^@y0)) supposing { }> from the inference-queue.
    # 3
    interest: ((F ^@y0 ^@y1) → (F ^@y0 ^@y0))
    For interest 2 by EG

---

Retrieving #<Interest 3: ((F ^@y0 ^@y1) → (F ^@y0 ^@y0)) supposing { }> from the inference-queue.
1 (F ^@y0 ^@y1) supposition: { (F ^@y0 ^@y1) }
supposition
maximal-degree-of-support: 1
    # 4
    interest: (F ^@y0 ^@y0) supposition: { (F ^@y0 ^@y1) }
    For interest 3 by conditionalization
    Conclusion #1 discharges interest #4
2 ((F ^@y0 ^@y0) → (F ^@y0 ^@y0))
inferred by support-link #1 from { 1 } by conditionalization
maximal-degree-of-support: 1
This node encodes a deductive argument.
This node discharges interest 3
3 (∃y)((F ^@y1 y) → (F ^@y1 ^@y1))
inferred by support-link #2 from { 2 } by EG
maximal-degree-of-support: 1
This node encodes a deductive argument.
This node discharges interest 2
4 (∃x)(∃y)((F x y) → (F x x))
inferred by support-link #3 from { 3 } by EG
maximal-degree-of-support: 1
This node encodes a deductive argument.
This node discharges interest 1

---

<Node 4> answers #<Query #1 (∃x)(∃y)((F x y) → (F x x))>

---

ALL QUERIES HAVE BEEN ANSWERED DEDUCTIVELY.
================ ULTIMATE EPISTEMIC INTERESTS ================
interest in (∃x)(∃y)((F x y) → (F x x))
is answered affirmatively by conclusion 4

---

ARGUMENT #1
This is a deductive argument for:
    (∃x)(∃y)((F x y) → (F x x))
which is of ultimate interest.
  |----------------------------------------
  | Suppose: { (F ^@y0 ^@y1) }
  |----------------------------------------
  | 1. (F ^@y0 ^@y1)    supposition
2. ((F ^@y0 ^@y0) → (F ^@y0 ^@y0))    conditionalization from { 1 }
3. (∃y)((F ^@y1 y) → (F ^@y1 ^@y1))    EG from { 2 }
4. (∃x)(∃y)((F x y) → (F x x))    EG from { 3 }

In this example, conclusion 1, (F ^@y0 ^@y1)/{(F ^@y0 ^@y1)}, discharges interest in the sequent (F ^@y0 ^@y0) /{(F ^@y0 ^@y1)}. Unifying (F ^@y0 ^@y1) with (F ^@y0 ^@y0) produces the unifier (((^@y1 . ^@y0)) t), and applying that to the suppositions yields {(F ^@y0 ^@y0)} and {(F ^@y0^@y1)}. The former is not a subset of the latter, but it does unify into it via the unifier (t((^@b 1. ^@y0))). Accordingly, (F ^@y0^@y1)/{(F ^@y0^@y1)}, discharges interest in the sequent (F ^@y0 ^@y0)/{(F ^@y0 ^@y1) via the unifier (((^@y1 . ^@y0))((^@y1 . ^@y0))).

To implement conditionalization in this form, we will keep track of the interest-variables occurring in the node-supposition and interest-supposition in the slots node-supposition-variables and interest-supposition-variables, and modify the definition of APPROPRIATELY-RELATED-SUPPOSITIONS so that it unifies the node-supposition into the interest-supposition and returns the list of unifiers. Those unifiers are then used in computing the conclusion to be drawn.

APPROPRIATELY-RELATED-SUPPOSITIONS node interest unifier optional argument: target If target is not supplied, let it be interest.

Let i-sup be the result of applying the second member of unifier to the interest-supposition of interest, n-vars the result of applying the first member of unifier to the list of free-variables occurring in the node-supposition of node but not the node-formula of node, and i-vars the result of applying the second member of unifier to the list of free-variables occurring in the interest-supposition of interest but not the interest-formula of interest.

If target is not a query and it is not a reductio-interest, let n-sup be the result of applying the first member of unifier to the node-supposition of node, and return SET-UNIFIER n-sup i-sup n-vars i-vars.

Otherwise, let r-sup be the result of applying the first member of unifier to the list of node-formulas of those non-reductio-suppositions of node not contained in inherited-non-reductio-suppositions, and return SET-UNIFIER r-sup i-sup n-vars i-vars.

Similarly, where B and instantiations are lists of the same length, so that we can talk about the corresponding members of each, let us define:

SUPPOSITION-UNIFIERS B instantiationstarget unifier

Let i-sup be the result of applying the second member of unifier to the interest-supposition of interest, i-vars the result of applying the second member of unifier to the list of free-variables occurring in the interest-supposition of interest but not the interest-formula of interest, and c-vars the union over all the nodes node in B of the results of applying the corresponding member of instantiations to the list of free-variables occurring in the node-supposition of node but not the node-formula of node.

If target is not a query and it is not a reductio-interest, let n-sup be the union of the results of applying the each member of instantiations to the node-supposition of the corresponding member of B, and return SET-UNIFIER n-sup i-sup n-vars i-vars.

Otherwise, let r-sup be the union of the results of applying each member of instantiations to the node-formulas of the non-reductio-suppositions not contained in inherited-non-reductio-suppositions of the corresponding member of B, and return SET-UNIFIER r-sup i-sup n-vars i-vars.

In making an inference from a link with a link-discharge, we will make the assumption that (as in conditionalization) there is a single link-interest or cancelled-link-interest:

MAKE-INFERENCE-FROM-LINK-WITH-DISCHARGE link.

Let interest be the sole link-interest or cancelled-link-interest.

For every inference-node node which is (1) of adequate strength, (2) such that the node-formula of node unifies with the interest-formula of interest via some unifier unifier, (3) has a node-supposition appropriately-related to the interest-supposition of interest relative to the resultant-interest of link, (3) satisfies the discharge-condition of interest, and (4) is not a deductive-only inference-nodes unless the link-rule is non-defeasible, let unifiers be APPROPRIATELY-RELATED-SUPPOSITIONS node interest unifier.

For every u in unifiers, where u1 is the first member of unifier and u2 is the second member, and u1* is the first member of u and u2* is the second member, let instantiation be MERGE-MATCHES* u1 u1* and i-instantiation be MERGE-MATCHES* u2 u2*, R the link-rule, resultant-interest the resultant-interest of link, formula the result of applying i-instantiation to the interest-formula of resultant-interest, and discharge the result of applying i-instantiation to the link-discharge of link, and DRAW-CONCLUSION formula B R <instantiation> discharge resultant-interest.

REPLICATE-SHORT-DISCHARGES node link N unifier

If either the link-rule is deductive or the node is not deductive-only:

Where target is the resultant-interest of link, let unifiers be APPROPRIATELY-RELATED-SUPPOSITIONS node interest unifier target.

For every u in unifiers, where u1 is the first member of unifier and u2 is the second member, and u1* is the first member of u and u2* is the second member, let instantiation be MERGE-MATCHES* u1 u1* and i-instantiation be MERGE-MATCHES* u2 u2*, R the link-rule, resultant-interest the resultant-interest of link, formula the result of applying i-instantiation to the interest-formula of resultant-interest, and discharge the result of applying i-instantiation to the link-discharge of link, and DRAW-CONCLUSION formula B R <instantiation> discharge resultant-interest.

Similarly, we revise the earlier definitions of MAKE-INFERENCE-FROM-LINK-WITHOUT-DISCHARGE and REPLICATE-LONG-DISCHARGES:

MAKE-INFERENCE-FROM-LINK-WITHOUT-DISCHARGE link.

Find all lists B of inference-nodes (1) of adequate strength, (2) such that, if common variables in different members of B are rewritten then the list of node-formulas of member of B unifies with the interest-formulas of the link-interests and cancelled-link-interests via some unifier ($u_1$ $u_2$2), (3) having node-suppositions appropriately-related to the interest-suppositions relative to the resultant-interest of link, (4) satisfying the discharge-conditions of the corresponding link-interests, and (5) not being deductive-only inference-nodes unless the link-rule is non-defeasible.

For each such B, where R is the link-rule, let instantiations be the list of instantiations of the nodes produced by combining $u_1$ with the rewriting of the variables for the different members of B, resultant-interest the resultant-interest of link, and formula be the result of applying $u_2$ to the interest-formula of resultant-interest, and unifiers the list of unifiers produced by SUPPOSITION-UNIFIERS B instantiations target $u_2$.

For each unifier $(u^*_1 \; u^*_2)$ in unifiers, let instantiations* be the list of results of applying MERGE-MATCHES * to each member of instantiations and $u^*_1$, let formula* be the result of applying $u^*_2$ to formula, and DRAW-CONCLUSION formula* B R instantiations*NIL resultant-interest.

REPLICATE-LONG-DISCHARGES node link N unifier

Let interests be the result of removing N from the link-interests of link.

Find all lists B of inference-nodes (1) of adequate strength, (2) such that, if common variables in different members of the list of node-formulas of N followed by the member of B are rewritten then B unifies with the list of interest-formulas of interest followed by the members of interests via some unifier $(u_1 \; u_2)$, (3) having node-suppositions appropriately-related to the interest-suppositions relative to $(u_1 \; u_2)$ and the resultant-interest of link, (4) satisfying the discharge-conditions of the corresponding members of interests, and (5) not being deductive-only inference-nodes unless the link-rule is non-defeasible.

For each such B, where R is the link-rule, let instantiations be the list of instantiations of the nodes produced by combining $u_2$ with the rewriting of the variables for the different members of B, resultant-interest be the resultant-interest of link, formula be the result of applying $u_2$ to the interest-formula of resultant-interest, B+the result of adding node to the front of B, instantiations+the result of adding the first member of unifier to the front of instantiations, and unifiers the list of unifiers produced by SUPPOSITION-UNIFIERS B instantiations+target $u_2$.

For each unifier $(u^*_1 \; u^*_2)$ in unifiers, let instantiations* be the list of results of applying MERGE-MATCHES* to each member of instantiations+and $u^*_1$, let formula* be the result of applying $u^*_2$ to formula, and DRAW-CONCLUSION formula* B+R instantiations*NIL resultant-interest.

(Question: is the following a good idea, or can I just rely upon the fact that the code is contained in the appendix, on microfiche?)

The complexity of the preceding operations makes it desirable to include the actual LISP code in order to resolve any unclarities:

```
(defun appropriately-related-suppositions (node interest unifier & optional a-list target)
  (when (null target) (setf target interest))
  (let ((i-sup (match-sublis (mem2 unifier) (interest-supposition interest)))
        (c-vars
          (match-sublis
            (mem1 unifier)
            (match-sublis
              a-list
              (setdifference
                (node-supposition-variables node)
                (node-variables node)))))
        (i-vars
          (match-sublis
            (mem2 unifier)
            (setdifference
              (interest-supposition-variables interest)
              (interest-variables interest))))
        (unifiers nil))
    (if (and (not (query-p target)) (reductio-interest target))
      (setf
        unifiers
        (set-unifier
          (match-sublis
            (mem1 unifier)
            (match-sublis
              a-list
              (domain
                (subset
                  #'(lambda (S) (not (member (cdr S)*inherited-non-reductio-suppositions*)))
                  (non-reductio-supposition node)))))
          i-sup c-vars i-vars))
      (setf unifiers
        (set-unifier
          (match-sublis (mem1 unifier)
                        (match-sublis a-list (node-supposition node)))
          i-sup c-vars i-vars)))
    unifiers))
(defun supposition-unifiers (B instantiations target u2)
  (let ((c-vars
          (unionmapcar2=
            #'(lambda (x i)
                (match-sublis
                  i (setdifference (node-supposition-variables x) (node-variables x))))
            B instantiations)))
    (cond ((nul c-vars) (list (list t t)))
      (t
        (let* ((i-sup (match-sublis u2 (interest-supposition target)))
               (i-vars
                 (match-sublis
                   u2
```

-continued

```
            (setdifference
              (interest-supposition-variables target)
              (interest-variables target))))
          (unifiers nil))
        (if (and (not (query-p target)) (reductio-interest target))
          (setf
           unifiers
           (set-unifier
             (domain
               #'(lambda (S) (not (member (cdr S)*inherited-non-reductio-suppositions*)))
              (unionmapcar2=
               #'(lambda (x i)
                  (match-sublis i (non-reductio-supposition x)))
               B instantiations)))
             i-sup c-vars i-vars))
          (setf unifiers
            (unionmapcar2=
             #'(lambda (x i)
                (match-sublis i (node-supposition x)))
             B instantiations)
             i-sup c-vars i-vars)))
        unifiers)))))
(defun make-inference-from-link-with-discharge (link depth d-interests)
  (let* ((interest (mem1 (append (link-interests link) (cancelled-link-interests link))))
         (l-list (interest-i-list interest))
         (R (link-rule link))
         (deductive-rule? (not (defeasible-rule R)))
         (c-lists (corresponding-c-lists i-list))
         (target (resultant-interest link)))
    (dolist (c-list c-lists)
      (let* ((unifier (mem2 c-list))
             (u1 (mem1 unifier))
             (u2 (mem2 unifier))
             (formula (match-sublis u2 (resultant-formula link)))
             (discharge (match-sublis u2 (link-discharge link))))
        (dolist (c (c-list-nodes (car c-list)))
          (when
            (and (or deductive-rule? (not (deductive-only c)))
              (>= (maximal-degree-of-support c) (link-strength link)
              (funcall** (discharge-condition interest) c (list u1 u2))
              (or (not (direct-reductio-interest target)
                (and (not (equal (node-justification c) "reductio-supposition"))
                  (not (equal (node-justification c) "supposition")))))
            (let ((unifiers (appropriately-related-suppositions c interest unifier nil target)))
              (when unifiers (pushnew interest (discharged-interests c)))
              (dolist (u unifiers)
                (when (cancelled-interest (resultant-interest link))
                  (return-from make-inference-from-link-with-discharge))
                (when
                  (constrained-assignment
                    u (node-supposition-variables c)
                    (interest-variables target))
                  (draw-conclusion
                    (match-sublis (mem2 u) formula) (list c) R
                    (list (merge-matches* u1 (mem1 u)))
                    1 (match-sublis (mem2 u) discharge) (1+ depth)
                    d-interests target)))))))))))
(defun write-vars-apart (X & optional node)
  (cond ((and (null node) (equal length X) 1))
    (list (list (c-list-formula (mem1 X))) (c-list-variables (mem1 X)) (list t)))
   (t
    (let ((formulas (if node (list (node-formula node))))
          (variables (if node (node-varaibles node)))
          (a-lists (if node (list t))))
      (dolist (c X)
        (let* ((formula (c-list-formula c))
               (vars (c-list-variables c))
               (vars* (=intersection vars variables)))
          (cond (vars*
            (setf variables (append (setdifference vars vars*) variables))
              (let* ((m (mapcar
                         #'(lambda (v)
                            (let ((v* (make-conclusion-variable)))
                              (progn
                                (push v* variables)
                                (cons v v*))))
                         vars*)))
                (push m a-lists)
                (push (match-sublis m formula) formulas)))
            (t (push formula formulas)
```

```
                (push t a-lists)
                (setf variables (append vars variables))))))
        (list (reverse formulas) variables (reverse a-lists))))))
(defun replicate-short-discharges (node link interest unifier depth d-interests)
    (let* ((R (link-rule link))
        (deductive-rule? (not (defeasible-rule R)))
        (target (resultant-interest link)))
      (when (or deductive-rule? (not (deductive-only node)))
        (let (unifiers (appropriately-related-suppositions node interest unifier nil target)))
        (when unifiers
            (pushnew interest (discharged-interests node))
            (let* ((u1 (mem1 unifier))
            (u2 (mem2 unifier))
            (formula (match-sublis u2 (resultant-formula link)))
            (discharge (match-sublis u2 (link-discharge link))))
            (dolist (u unifiers)
              (when (cancelled-node node) (return-from replicate-short-discharges))
              (let ((u* (list (merge-matches* u1 (mem1 u)) (merge-matches* u2 (mem2 u)))))
              (when
                (and
                  (constrained-assignment
                    u* (node-supposition-variables node)
                  (interest-variables target))
                  (or (not (direct-reductio-interest target))
                    (and (not (equal (node-justification node) "reductio-supposition"))
                      (not (equal (node-justification node) "supposition")))))
                (draw-conclusion
                  match-sublis (mem2 u) formula) (list node) R
                  list (mem1 u*))
                  1 (match-sublis (mem2 u) discharge) (1+ depth)
                  d-interests target))))))))))
(defun make-inference-from-link-without-discharge (link depth d-interests)
    (let* ((interests (append (link-interests link) (cancelled-link-interests link)))
        (i-lists (mapcar #'interest-i-list-interests))
        (i-formulas (mapcar #'i-list-forula i-lists))
        (R (link-rule link))
        (target (resultant-interest link))
        (deductive-rule? (not (defeasible-rule R)))
        (combos ;;this is the list of combinations of corresponding-c lists for the i-lists
          (gencrossproduct (mapcar #'corresponding c-lists i-lists))))
        ;; combos and interests are listed in the same order
        (dolist (c-lists combsos) ;;if i-lists is empty, c-lists = nil.
          (let* ((c-lists+ (mapcar #'car c-lists))
              (vars-apart (write-vars-apart c-lists+))
              (formulas (mem1 vars-apart))
              (variables (mem2 vars-apart))
              (a-lists (mem3 vars-apart))
              (unifier
                (if (equal (length formulas) 1)
                  (mem2 (mem1 c-lists))
                  (unifier
                    formulas
                    i-formulas
                    variables
                    (unionmapcar= #'i-list-variables i-lists)))))
            (when (and unifier (constrained-assignment unifier variables (interest-variables target)))
              (let* ((u1 (mem1 unifier))
                  (u2 (mem2 unifier))
                  (backwards-bases
                    (gencrossproduct
                      (mapcar
                        #'(lambda (corresponding-c-list interest a-list)
                          (subset
                            #'(lambda(c)
                              (and (or deductive-rule? (not (deductive-only c)))
                                (>= (maximal-degree-of-support c)
                                  (link-strength link))
                                (funcall** (discharge-condition interest) c (list u1 u2))
                                (appropriately-related-suppositions
                                  c interest unifier a-list target)
                                (pushnew interest (discharged-interests c))))
                            (c-list-nodes (mem1 corresponding-c-list))))
                        c-lists interests a-list)))
                  (formula (match-sublis u2 (resultant-formula link))))
                (dolist (B backwards-bases)
                  (when (or (null B)
                      (not (direct-reductio-interest target))
                      (some #'(lambda (N)
                        (and (not (equal (node-justification N) "reductio-supposition"))
                          (not (equal (node-justification N) "supposition"))))
```

```
              B))
       (let* ((instantiations (mapcar #'(lambda (a-list) (merge-matches* a-list u1)) a-lists))
           (unifiers
             (supposition-unifiers B instantiations target u2)))
         (dolist (u unifiers)
           (when (cancelled-interest target)
             (return-from make-inference-from-link-without-discharge))
           (let ((instantiations*
                  (mapcar #'(lambda (i) (merge-matches* i (mem1 u))) instantiations)))
             (draw-conclusion
               (match-sublis (mem2 u) formula)
               B R instantiations* 1 nil (1+ depth) d-interests target)))))))))
(defun replicate-long-discharges (node link N U0 depth d-interests)
   (let* ((R (link-rule link))
       (target (resultant-interest link))
       (deductive-rule? (not (defeasible-rule R))))
    (when (or deductive-rule? (not (deductive-only node)))
      (let* ((interests (remove N (append (link-interests link) (cancelled-link-interests link))))
          (i-lists (mapcar #'interest-i-list interests))
          (combos ;;this is the list of combinations of corresponding c-lists for the i-lists))))
             (gencrossproduct (mapcar #'corresponding-c-lists i-lists))))
       ;; combos and interests are listed in the same order
       (dolist (c-lists combos) ;;if i-lists is empty, c-lists = nil.
         (let* ((vars-apart (write-vars-apart (mapcar #'car c-lists) node))
             (formulas (mem1 vars-apart))
             (variables (mem2 vars-apart))
             (a-lists (cdr (mem3 vars-apart)))
             (unifier
               (if (equal (length c-lists ) 0) U0
                 (unifier
                   formulas
                   (cons (interest-formula N) (mapcar #'i-list-formula i-lists))
                   variables
                   (union= (interest-variables N) (unionmapcar =#'i-list-variables i-lists))))))
           (when
             (and unifier (constrained-assignment unifier variables (interest-variables target)))
             (let* ((u1 (mem1 unifier))
                 (u2 (mem2 unifier))
                 (backwards-bases
                   (gencrossproduct
                     (mapcar
                       #'(lambda (corresponding c-list interest a-list)
                         (subset
                           #'(lambda (c)
                             (and (or deductive-rule? (not (deductive-only c)))
                               (>= (maximal-degree-of-support c)
                                 (link-strength link))
                               (funcall** (discharge-condition interest) c unifier)
                               (appropriately-related-suppositions
                                 c interest unifier a-list target)
                               (pushnew interest (discharged-interests c))))
                           (c-list nodes (mem1 corresponding c-list))))
                       c-lists interests a lists)))
                 (formula (match-sublis u2 (interest-formula target))))
               (dolist (B backwards-bases)
                 (when (cancelled-node node) (return-from replicate-long-discharges))
                 (when
                   (or (not (direct-reductio-interest target))
                     (some #'(lambda (N)
                          (and (not (equal (node-justification N) "reductio-supposition"))
                            (not (equal (node-justification N) "supposition"))))
                       (cons node B)))
                   (let* ((instantiations
                       (cons (mem1 U0)
                         (mapcar
                           #'(lambda (a-list) (merge-matches* a-list u1)) a-lists)))
                       (B+ (cons node B))
                       (unifiers
                         (supposition-unifiers
                           B+ instantiations target u2)))
                     (dolist (u unifiers)
                       (when (cancelled-interest target)
                         (return-from replicate-long-discharges))
                       (let ((instantiations*
                         (mapcar #'(lambda (i) (merge-matches* i (mem1 u))) instantiations)))
                         (draw-conclusion
                           (match-sublis (mem2 u) formula)
                           B+ R instantiations* 1 nil (1+ depth) d-interests target))))))))))))))
```

The presence of free variables in suppositions makes it more complicated to keep track of the non-reductio-supposition (and also the reductio-ancestors) of a node. We begin by making a supposition, and recording it in an inference-node. Reasoning forwards from that supposition can have the effect of instantiating some of the free variables in it, so sequents derived from a supposition node may contain formulas in their sequent suppositions that are instances of the original supposition formula rather being identical with the original supposition formula. For some purposes, we will subsequently want to know what inference-nodes record suppositions upon which a later inference-node depends, and for other purposes we will want to know what the supposition-formulas of an inference-node are. To record all of this information, we will take the non-reductio-supposition for a node to be a list of pairs <node,formula> where node is the node recording the supposition and formula is the instantiation of the original supposition formula that is being supposed by the current node. The list of reductio-ancestors of a node will be treated similarly.

Reductio-ad-absurdum

When we turn to reductio reasoning, the presence of free variables introduces three complications. First, reductio-interests, like other interests, will be discharged by unification and by unifying the node-supposition into the interest-supposition. In sentential reasoning, a node discharges a reductio-interest if the node-formula and the interest-formula are the same and the non-inherited part of the non-reductio-supposition of the node is contained in the interest-supposition. With free variables, the requirement is instead that the node-formula unifies with the interest-formula via some unifier unifier, and then the result of applying the first member of unifier to the non-inherited part of the non-reductio-supposition of the node unifies into the result of applying the second member of unifier to the interest-supposition. This is the way the definition of APPROPRIATELY-RELATED-SUPPOSITIONS was revised above.

DISCHARGE-REDUCTIOS node i-lists
  DISCHARGE-FORTUITOUS-REDUCTIOS node
    If node is has reductio-ancestors, then for every pair <i-list, unifier> in i-lists, let Y be the result of applying the first member of unifier to the node-supposition of node. For each direct-reductio-interest interest in the list of i-list-interests of i-list, let unifiers be the list of unifiers produced by APPROPRIATELY-RELATED-SUPPOSITIONS node interest unifier:
    For each node* in the direct-reductio-interest slot of interest (i.e., interest is a reductio-interest in the negation of the node-sequent node*) and for each unifier* produced by first applying unifier and then a member of unifiers:
      Let Y* be the result of applying the second member of unifier* to the node-supposition of node*, RA the union of the result of applying the first member of unifier* to the reductio-ancestors of node and the result of applying the second member of unifier* to the reductio-ancestors of node*, and NR the union of the result of applying the first member of unifier* to the non-reductio-supposition of node and the result of applying the second member of unifier* to the non-reductio-supposition of node*.
    For each R in RA, if either R is not a base-reductio-supposition or it is the only member of RA, and the node-formula of R is P, then DRAW-REDUCTIO-CONCLUSION P node node* R Y Y* RA NR interest.

DISCHARGE-RETROSPECTIVE-REDUCTIOS node. interest
  For every pair (c-list,unifier) in the list of corresponding-c-lists of the interest-i-list of interest, let Y* be the result of applying the second member of unifier to the node-supposition of node. For each node N in the list of c-list-nodes of c-list, if the maximal-degree-of-support of N is greater than or equal to the degree-of-interest of interest, let unifiers be the list of unifiers produced by APPROPRIATELY-RELATED-SUPPOSITIONS node interest unifier. For each unifier* produced by first applying unifier and then a member of unifiers:
    Let Y be the result of applying the first member of unifier* to the node-supposition of N, RA the union of the result of applying the first member of unifier* to the reductio-ancestors of N and the result of applying the second member of unifier* to the reductio-ancestors of node, and NR the union of the result of applying the first member of unifier* to the non-reductio-supposition of N and the result of applying the second member of unifier* to the non-reductiio-supposition of node.
    For each reductio-ancestor R of N, if either R is not a base-reductio-supposition or it is the only reductio-ancestor of N, and the node-formula of R is P, then DRAW-REDUCTIO-CONCLUSION P N node R Y Y* RA NR interest.

DISCHARGE-FORTUITOUS-REDUCTIOS node
  For each pair <node*,unifier> where the node-formula of node unifies with that of node* via the unifier unifier:
    If node and node* both have empty node-suppositions, then for each ultimate-epistemic-interest, let P be the result of applying the first member of unifier to the query-formula, and infer P from node and node*.
    If node discharges some interest generated by a supposition in the list of non-reductio-suppositions of node*, and the node-supposition of node is a subset of the node-supposition of node*, then for each supposition sup in the list of non-reductio-suppositions of node*, if node* is deductive-in sup, then for every generated-interest in of sup, if node and in have appropriately-related-suppositions relative to the trivial unifier '(TT), then where P is the result of applying the first member of unifier to the interest-formula of in, DRAW-CONCLUSION P {node, node*} "fortuitous-reductio" unifier NIL.
    If node* discharges some interest generated by a supposition in the list of non-reductio-suppositions of node, and the node-supposition of node* is a subset of the node-supposition of node, then for each supposition sup in the list of non-reductio-suppositions of node, if node is deductive-in sup, then for every generated-interest in of sup, if node* and in have appropriately-related-suppositions relative to the trivial unifier '(TT), then where P is the result of applying the second member of unifier to the interest-formula of in and unifier* is the result of reversing the order of the members of unifier, DRAW-CONCLUSION P {node, node } "fortuitous-reductio" unifier* NIL.

DRAW-REDUCTIO-CONCLUSION P node node* R Y Y* RA NR interest
  If neither node nor node* is a cancelled-node, ¬P is not in Y or Y*, and neither RA nor NR contains multiple instantiations of the same supposition-node unless that supposition was made more than once, then:
    Let sup be Y∪Y*−{P}, S the sequent <sup,¬P>, reductio-ancestors the result of removing R from RA, nonreductio-supposition the subset of NR consisting of pairs whose first members are not equal to P, and NDA the union of the crossproduct of the nearest-defeasible-ancestors of node and the nearest-defeasible-ancestors of node*. If not SUBSUMED S NDA non-reductio-supposition:

If there is an inference-node of kind "inference" supporting S and having non-reductio-supposition as its list of non-reductio-suppositions and reductio-ancestors as its list of reductio-ancestors, let conclusion be that inference-node. Append NDA to the list of nearest-defeasible-ancestors for conclusion.

Otherwise, construct a new inference-node conclusion supporting S, setting its deductive-only slot to be NIL.

Build a support-link link recording the inference of conclusion from {node,node*} in accordance with reductio, construct the set of new non-circular arguments this produces for conclusion and its inference-descendants, and recompute the lists of nearest-defeasible-ancestors for the inference-descendants.

If the preceding step does produce new arguments for conclusion:

Record link as a support-link for conclusion.

If conclusion is newly constructed, add it to the inference-graph and store it in the list of conclusion. Add the members of NDA to the list of nearest-defeasible-ancestors for conclusion, and set the list of non-reductio-suppositions equal to non-reductio-supposition, and the list of reductio-ancestors equal to reductio-ancestors.

When R is non-NIL and conclusion is a deductive-node, add the generating-interests of R to the list of enabling-interests of conclusion.

If conclusion is a deductive-node, and interest is not NIL add interest to the list of enabling-interests for conclusion.

CANCEL-SUBSUMED-LINKS link.

If conclusion is either newly-constructed, or its maximal-degree-of-support has increased as a result of adding this support-link, let old-degree be the old maximal-degree of support for conclusion. Let i-list be the corresponding i-list of the conclusion-c-list of conclusion.

If conclusion is either newly-constructed, or its maximal-degree-of-support has increased as a result of adding this support-link, DISCHARGE-INTEREST-IN-DEFEATERS conclusion i-list old-degree UPDATE-BELIEFS link.

If S was not previously concluded, insert conclusion into the inference-queue.

If conclusion already existed but this inference increases the maximal-degree-of-support of node, ADJUST-SUPPORT-FOR-CONSEQUENCES conclusion old-degree If conclusion is either newly-constructed, or its maximal-degree-of-support has increased as a result of adding this support-link, DISCHARGE-INTEREST-IN conclusion i-list old-degree interest If conclusion is either newly-constructed, or its maximal-degree-of-support has increased as a result of adding this support-link, DISCHARGE-REDUCTIOS conclusion i-list old-degree interest.

Set the old-undefeated-degree-of-support of node to be the undefeated-degree-of-support of node.

The second complication that pertains to making reductio-suppositions is the same as that required for non-reductio-suppositions. A reductio-supposition supposes the negation of a reductio-interest. As before, the conclusion-variables for the supposition will be the interest-variables for the interest. This is justified by noting that the reductio-reasoning generated by an interest in P is analogous to adopting interest in the conditionals (~P→(Q &~Q)) for different choices of Q, and then trying to establish these conditionals by conditionalization. We do the latter by supposing ~P, and taking the conclusion-variables of the supposition to be the interest-variables of the interest. And, as observed above, in sentential reasoning, before making a new supposition we check that the same supposition has not already been made. In first-order reasoning, we must check more generally that no supposition has been made whose schematic variables can be instantiated in such a way as to make the new supposition an instance of it.

MAKE-REDUCTIO-SUPPOSITION interest.

If the value of the reductio-trigger for the interest-i-list of interest is T, then:

Reset the reductio-trigger to NIL.

Where the interest-formula of interest is q, if there is an existing reductio-supposition supposing q,, let that be sup. If not, but there is an existing reductio-supposition whose node-formula matches q relative to its node-variables, let that be sup. If there is no such reductio-supposition, but there is an existing non-reductio-supposition whose node-formula matches q relative to its node-variables, let that be sup, and convert it to a reductio-supposition. If there is no such supposition:

If interest is a non-reductio-interest, then for every non-reductio-supposition-node generating part of the interest-supposition, add that node to the list of inherited-non-reductio-suppositions.

Construct an inference-node node whose node-sequent is ¬q/{¬q}, whose list of node-arguments is {<NIL, 1>}, and whose node-variables are the interest-variables of interest, and insert it into the inference-queue. Let node be its own only reductio-ancestor.

Make node the i-list-reductio-supposition of the i-list of interest.

START-REDUCTIO-INTERESTS N.

The third complication concerns the generation of reductio-interests from conclusions containing free variables. To take a simple example, suppose we have a conclusion (∀x)(F x), and by UI we infer (F x). To use this conclusion in reductio-reasoning, we will adopt interest in its negation ~(F x). In the resulting interest, how is the free variable x to be treated? In the conclusion (F x), x is a conclusion variable, unifying with any term. What we want for reductio-reasoning is to find some instance of ~(F x). What this means is that in the interest in ~(F x), x is to be treated as an interest-variable.

GENERATE-REDUCTIO-INTERESTS node.

Let P be the negation of the node-formula of node, let sup be the non-reductio-supposition of node, and let sequent be the sequent constructed from this supposition and formula.

If there is no previously existing interest in sequent, construct one, setting the value of its slot direct-reductio-interest to be the unit set of node. Let the interest-variables of the new interest be the node-variables of node.

If there is already such an interest interest:
  add node to the list direct-reductio-interest for interest.
  if interest was not previously a reductio-interest, reconstrue it as one;

recompute the degree-of-interest and the interest-priority for interest.

To illustrate all of this, consider a simple example of reductio-reasoning using free variables:

---

Given premisess:
  $(\forall x)((P\ x\ ) \leftrightarrow ((H\ x\ ) \& \sim(P\ x\ )))$   justification = 1
Ultimate epistemic interests:
  $(\forall x)\sim(H\ x)$   interest = 1
1  $(\forall x)((P\ x) \leftrightarrow ((H\ x) \& \sim(P\ x)))$
given
maximal-degree-of-support: 1

---

Retrieving #<Query #1: $(\forall x)\sim(H\ x)$> from the inference-queue.
  # 1
    interest: $(\forall x)\sim(H\ x)$
    This is of ultimate interest
  # 2
    interest: $\sim(H\ {^\wedge}x0)$
    For interest 1 by UG

---

Retrieving #<Interest 2: $\sim(H\ {^\wedge}x)$) supposing { }> from the inference-queue.
2 $(H\ {^\wedge}x0)$   supposition: { $(H\ {^\wedge}x0)$ }
reductio-supposition
maximal-degree-of-support: 1
    Readopting interest in:
      # 2
        reductio interest $\sim(H\ {^\wedge}x0)$
        For interest 1 by UG

---

Retrieving #<Node 1> from the inference-queue.
3 $((P\ x1) \leftrightarrow ((H\ x1) \& \sim(P\ x1)))$
Inferred by support-link #1 from { 1 } by UI
maximal-degree-of-support: 1
This node encodes a deductive argument.

---

Retrieving #<Node 3> from the inference-queue.
4 $((P\ x1) \to ((H\ x1) \& \sim(P\ x1)))$
Inferred by support-link #2 from { 3 } by bicondit-simp
maximal-degree-of-support: 1
This node encodes a deductive argument.
5 $(((H\ x1) \& \sim(P\ x1)) \to (P\ x1))$
Inferred by support-link #3 from { 3 } bicondit-simp
maximal-degree-of-support: 1
This node encodes a deductive argument.

---

Retrieving #<Node 5> from the inference-queue.
6 $((H\ x1) \to (\sim(P\ x1) \to (P\ x1)))$
Inferred by support-link #4 from { 5 } by exportation
maximal-degree-of-support: 1
This node encodes a deductive argument.
      # 3
        reductio interest: $\sim(((H\ x1) \& \sim(P\ x1)) \to (P\ x1))$
        using node 5

---

Retrieving #<Node 6> from the inference-queue.
      # 4
        reductio interest: $\sim((H\ x1) \to (\sim(P\ x1) \to (P\ x1)))$
        using node 6

---

Retrieving #<Node 4> from the inference-queue.
      # 5
        reductio interest: $\sim((P\ x1) \to ((H\ x1) \& \sim(P\ x1)))$
        using node 4

---

Retrieving #<Node 2> from the inference-queue.
7 $(\sim(P\ {^\wedge}x0) \to (P\ {^\wedge}x0))$   supposition: { $(H\ {^\wedge}x0)$ }
Inferred by support-link #5 from { 6,2 } by modus-ponens2
maximal-degree-of-support: 1
This node encodes a deductive argument.

---

Retrieving #<Node 7> from the inference-queue.
      # 6
        reductio interest: $\sim(\sim(P\ {^\wedge}x0) \to (P\ {^\wedge}x0))$
        using node 7

---

Retrieving #<Interest 6: $\sim(\sim(P\ {^\wedge}x0) \to (P\ {^\wedge}x0))$ supposing { }> from the inference-queue.
  # 7
    reductio interest: $\sim(P\ {^\wedge}x0)$ -continued

```
                     For reductio interest 6 by i-neg-condit
-------------------------------------------------------------------
Retrieving #<Interest 7: ~(P ^x0) supposing { }> from the inference-queue.
# 8 (P ^x0)    supposition: { (P ^x0) }
reductio-supposition
maximal-degree-of-support: 1
                     Readopting interest in:
                     # 7
                     reductio interest: ~(P ^x0)
                     For reductio interest 6 by i-neg-condit
-------------------------------------------------------------------
Retrieving #<Interest 5: ~((P x1) → ((H x1) & ~(P x1))) supposing { }> from the inference-queue.
               # 8
               reductio interest: ~((H x1) & ~(P x1))
               For reductio interest 5 by i-neg-condit
-------------------------------------------------------------------
Retrieving #<Interest 8: ~((H x1) & ~(P x1)) supposing { }> from the inference-queue.
               # 9
               reductio interest: (~(H x1) v (P x1))
               For reductio interest 8 by i-DM
-------------------------------------------------------------------
Retrieving #<Interest 9: (~(H x1) v (P x1)) supposing { }> from the inference-queue.
               # 10
               reductio interest: ((H x1) → (P x1))
               For reductio interest 9 by disj-cond
               # 11
               reductio interest: (~(P x1) → ~(H x1))
               For reductio interest 9 by disj-cond-2
-------------------------------------------------------------------
Retrieving #<Interest 10: ((H x1) → (P x1)) supposing { }> from the inference-queue.
# 9 (H x1)    supposition: { (H x1) }
supposition
maximal-degree-of-support: 1
                     # 12
                     reductio interest: (P x1)    supposition: { (H x1) }
                     For reductio interest 10 by conditionalization
                     Conclusion #8 discharges interest #12
# 10 ((H ^x0) → (P ^x0))    supposition: { (P ^x0) }
Inferred by support-link #6 from { 8 } by conditionalization
maximal-degree-of-support: 1
This node encodes a deductive argument.
This node discharges interest 10
# 11 (~(H ^x0) v (P ^x0))    supposition: { (P ^x0) }
Inferred by support-link #7 from { 10 } by disj-cond
maximal-degree-of-support: 1
This node encodes a deductive argument.
This node discharges interest 9
# 12 ~((H ^x0) & ~(P ^x0))    supposition: { (P ^x0) }
Inferred by support-link #8 from { 11 } by i-DM
maximal-degree-of-support: 1
This node encodes a deductive argument.
This node discharges interest 8
                     # 13
                     reductio interest: (P x1)
                     For reductio interest 5 by i-neg-condit
                     Conclusion #8 discharges interest #13
# 13 ~((P ^x0) → ((H ^x0) & ~(P ^x0)))    supposition: { (P ^x0) }
Inferred by support-link #9 from { 8, 12 } by i-neg-condit
maximal-degree-of-support: 1
This node encodes a deductive argument.
This node discharges interest 5
Node #13 discharges reductio-interest #5, generated by node #4.
# 14 ~(P ^x0)
Inferred by support-link #10 from { 13, 4 } by reductio
maximal-degree-of-support: 1
This node encodes a deductive argument.
                     Readopting interest in:
                     # 7
                     reductio interest: ~(P ^x0)
                     For reductio interest 6 by i-neg-condit using conclusion 14
                     Conclusion #13 discharges interest #7
# 15 ~(~(P ^x0) → (P ^x0))
Inferred by support-link #11 from { 14, 14 } by i-neg-condit
maximal-degree-of-support: 1
This node encodes a deductive argument.
This node discharges interest 6
-------------------------------------------------------------------
                     Cancelling #<Interest 6: ~(~(P ^x0) → (P ^x0)) supposing { }>
-------------------------------------------------------------------
```

-continued

Cancelling #<Interest 7: ~(P ^x0) supposing { }>

---

Retrieving #<Node 14> from the inference-queue.
16 (P ^x0)    supposition: { (H ^x0) }
Inferred by support-link #12 from { 7, 14 } by modus-ponens2
maximal-degree-of-support: 1
This node encodes a deductive argument
18 ((H ^x0) → (P ^x0))
Inferred by support-link #13 from { 16 } by conditionalization
maximal-degree-of-support: 1
This node encodes a deductive argument.
This node discharges interest 10
18 (~(H ^x0) v (P ^x0))
Inferred by support-link #14 from { 17 } by disj-cond
maximal-degree-of-support: 1
This node encodes a deductive argument.
This node discharges interest 9
19 ~((H ^x0) & ~(P ^x0))
Inferred by support-link #15 from { 18 } by I-DM
maximal-degree of-support: 1
This node encodes a deductive argument.
This node discharges interest 8
20 ~((P ^x0) → ((H ^x0) & ~(P ^x0)))    supposition: { (H ^x0) }
Inferred by support-link # 16 from { 19, 16 } by i-neg-condit
maximal-degree-of-support: 1
This node encodes a deductive argument.
This node discharges interest 5
Node #20 discharges reductio-interest #5, generated by node #4
21 ~(H ^x0)
Inferred by support-link #17 from { 20, 4 } by reductio
maximal-degree-of-support: 1
This node encodes a deductive argument.
22 ($\forall$x)~(H x)
Inferred by support-link #18 from { 21 } by UG
maximal-degree-of-support: 1
This node encodes a deductive argument.
This node discharges interest 1

---
<Node 22> answers #<Query #1: ($\forall$x)~(H x)>.
---

ALL QUERIES HAVE BEEN ANSWERED DEDUCTIVELY.
======= ULTIMATE EPISTEMIC INTERESTS =======
Interest in ($\forall$x)~(H x)
is answered affirmatively by conclusion 22

ARGUMENT #1
This is a deductive argument for:
  ($\forall$x)~(H x)
which is of ultimate interest.
1. ($\forall$x)((P x) ←→ ((H x) & ~(P x)))    given
3. ((P x1) ←→ ((H x1) & ~(P x1)))    UI from { 1 }
4. ((P x1) → ((H x1) & ~(P x1)))    bicondit-simp from { 3 }
5. (((H x1) & ~(P x1)) → (P x1))    bicondit-simp from { 3 }
6. ((H x1) → (~(P x1) → (P x1)))    exportation from { 5 }
|---------------------------------
| Suppose: { (P ^x0) }
|---------------------------------
| 8. (P ^x0)    reductio-supposition
| 10. ((H ^x0) → (P ^x0))    conditionalization from { 8 }
| 11. (~(H ^x0) v (P ^x0))    disj-cond from { 10 }
| 12. ~((H ^x0) & ~(P ^x0))    i-DM from { 11 }
| 13. ~((P ^x0) → ((H ^x0) & ~(P ^x0)))    i-neg-condit from { 8, 12 }
14. ~(P ^x0)    reductio from { 13, 4 }
|---------------------------------
| Suppose: { (H ^x0) }
|---------------------------------
| 2. (H ^x0)    reductio-supposition
| 7. (~(P ^x0) → (P ^x0))    modus-ponens from { 6, 2 }
| 16. (P ^x0)    modus-ponens2 from { 7, 14 }
17. ((H ^x0) → (P ^x0))    conditionalization from { 16 }
18. (~(H ^x0) v (P ^x0))    disj-cond from { 17 }
19. ~(H &x0) & ~(P ^x0))    i-DM from { 18 }
|---------------------------------
| Suppose: { (H ^x0) }
|---------------------------------
| 20. ~((P ^x0) → ((H ^x0) & ~(P ^x0)))    i-neg-condit from { 19, 16 }
21. ~(H ^x0)    reductio from { 20, 4 }
22. ($\forall$x)~(H x)    UG from { 21 }

-continued

Cumulative size of arguments = 20
Size of inference-graph = 22 of which 1 were unused suppositions.
90% of the inference-graph was used in the argument.

In this example, node 2 is a reductio-supposition generated by interest 2, and accordingly the node-variables of node 2 are the interest-variables of interest 2, viz., ^x0. Similarly, interest 5 is a reductio-interest generated by node 4, and hence the interest-variables of interest 5 are the node-variables of node 4, viz., x1. The interest-formula of interest 5 is ~((P x1)→((H x1) & ~(P x1))), and that unifies with the node-formula of node 13, which is ~((P ^x0)→((H ^x0) & ~(P ^x0))). Thus we get a reductio-inference at node 14. Exactly the same reasoning generates a second reductio-inference at node 14.

There remain several details to be explained. First, the cancellation of subsumed-nodes must now proceed by matching new conclusions with previous more general conclusions. To determine whether an existing node node should prevent the construction of a new node supporting a sequent S with nearest-defeasible-ancestors NDA and non-reductio-supposition non-reductio-supposition, we must first pattern-match the sequent-formula of S with the node-formula of node, using the node-variables of the latter as the variables for pattern matching. If there is such a match m, let sup be the result of applying m to the node-supposition of node. The node-supposition may contain variables not occurring free in the node-formula. If so, find all ways of pattern-matching the sequent-supposition of S with subsets of sup. If there are no such variables, this returns the identity-match if the sequent-supposition is a subset of sup, and it returns no matches otherwise. Subsumption requires that there be some such match. However, that is not sufficient for subsumption. The difficulty is that when reasoning with free variables, the same supposition-formula could be produced by instantiating the node-formulas of different supposition-nodes, and one of those supposition-nodes might be a reductio-supposition while the other is not. If S is identical with the node-sequent of node, but one of its supposition-formulas is produced by a reductio-supposition-node where that same supposition-formula is produced in node by a non-reductio-supposition-node, then reductio-reasoning would be possible from S that is not possible from node. If, in this case, we allow the construction of a new node to be blocked by subsumption from node, this will block the reductio-reasoning, so this should not be a case of subsumption. Accordingly, there must be a further requirement for subsumption that for one of the matches m* matching the sequent-supposition into sup, the result of applying first m and then m* to the non-reductio-supposition of node should produce a subset of non-reductio-supposition.

SUBSUMED S NDA non-reductio-supposition

Let P be the sequent-formula of S. Some c-list is such that there is a pattern-match m matching P with the c-list-formula relative to the c-list-variables. Let sup be the result of applying m to the sequent-supposition of S. For some c-list-node node of c-list, if vars is the set of node-variables occurring in the node-sequent but not in the node-formula, and sm is the set of pattern-matches matching sup with a subset of the node-supposition relative to the variables vars, then (1) sm is nonempty, (2) for every set X in NDA there is a set Y in the list of nearest-defeasible-ancestors of node such that Y⊆X, and (3) for some m* in sm, the result of applying first m and then m* to the non-reductio-supposition of node is a subset of non-reductio-supposition.

CANCEL-SUBSUMED-LINKS is modified analogously:
CANCEL-SUBSUMED-LINKS link

If link is a deductive support-link:

Let P be the node-formula of the support-link-target of link. Let c-list be any c-list such that there is a pattern-match m matching P with the c-list-formula relative to the c-list-variables. For every such c-list, and for every c-list node node* of c-list, if vars is the set of node-variables occurring in the node-sequent of node* but not in the node-formula, let sup be the result of applying m to the node-supposition of node*, and let sm be the set of pattern-matches matching sup with a subset of the node-supposition relative to the variables vars. If (1) sm is non-empty, and (2) for some m* in sm, the result of applying first m and then m* to the non-reductio-supposition of node is a subset of the non-reductio-supposition of node*, then for every deductive support-link link* of node*, if for every set X in the support-link-nearest-defeasible-ancestors of link* there is a set Y in the support-link-nearest-defeasible-ancestors of link such that Y⊆X, delete link* from the list of support-links for node*, adjusting the node-arguments and nearest-defeasible-ancestors for node* and its inference-descendants, and if this deletes all the support-links for node*, cancel-node node*.

The node-discount-factor has been added as a new slot in inference-nodes, and this is used in prioritizing reasoning. COMPUTE-PRIORITIES is modified to compute the discounted-node-strength of a node as the product of its maximal-degree-of-support and its node-discount-factor. The only inference-rule in connection with which the node-discount-factor is currently used is EI. This answers to a difficulty that makes the use of EI potentially explosive. EI was formulated as follows:

EI node

If node is of type "inference", and its node-formula p is an existential generalization:

Let x be the variable bound by the initial existential quantifier, let p* be the matrix of p (the formula immediately following the initial quantifier), let u-vars be the list of node-variables of node, and let s-funs be the list of skolem-functions occurring in p*.

If s-funs is empty, let level be 1. Otherwise, let level be one plus the maximum of the ei-levels of the members of s-funs. Let discount be $0.5^{(level-1)}$.

If u-vars is empty, let fun be a new variable @y. Let term be fun If u-vars is nonempty, let fun be a new skolem-function @y, and let term be constructed by appending @y to the front of the list of u-vars.

Let p** be the result of substituting term for x in p*.

If there is no node node* in processed-conclusions whose node-formula differs from p** only by having some other singular term in place of term:

set the ei-level of fun to be level return the list consisting of the single list <p**, {node}, EI, <T>, discount>

This has the effect of systematically discounting nodes generated by repetitive uses of EI. Consider its use in the following example:

Given premises:
  (∀x)((F x) → (∃y)((F y) & (G x y)))    justification = 1
Ultimate epistemic interests:
  (∀x)((F x) → (∃y)(∃z)((G x y) & (G y z)))    interest = 1
1 (∀x)((F x) → (∃y)((F y) & (G x y)))
given
maximal-degree-of-support: 1

---

Retrieving #<Node 1> from the inference-queue.
2 ((F x0) → (∃y)((F y) & (G x0 y)))
Inferred by support-link #1 from { 1 } by UI
maximal-degree-of-support: 1
This node encodes a deductive argument.

---

Retrieving #<Node 2> from the inference-queue.

---

Retrieving #<Query #1: (∀x)((F x) → (∃y)(∃z)((G x y) & (G y z)))> from the inference-queue.
    # 1
        interest: (∀x)((F x) → (∃x)∃z)((G x y) & (G y z)))
        This is of ultimate interest
    # 2
        interest: ((F ^x5) → (∃y)(∃z)((G ^x5 y) & (G y z)))
        For interest 1 by UG

---

Retrieving #<Interest 2: ((F ^x5) → (∃y)(∃z)((G ^x5 y) & (G y z))) supposing { }> from the inference-queue.
 # 3 (F ^x5)    supposition: { (F ^x5) }
supposition
maximal-degree-of-support: 1
    # 3
        interest: (∃y)(∃z)((G ^x5 y) & (G y z))    supposition: { (F ^x5) }
        For interest 2 by conditionalization

---

Retrieving #<Node 3> from the inference-queue.
4 (∃y)((F y ) & (G ^x5 y))    supposition: { (F ^x5) }
inferred by support-link #2 from { 2, 3 } by modus-ponens2
maximal-degree-of-support: 1
This node encodes a deductive argument.

---

Retrieving #<Node 4> from the inference-queue.
5 ((F @y6) & (G ^x5 @y6))    supposition: { (F ^x5) }
Inferred by support-link #3 from { 4 } by EI
maximal-degree-of-support: 1
This node encodes a deductive argument.

---

Retrieving #<Node 5> from the inference-queue.
6 (F @y6)    supposition: { (F ^x5) }
inferred by support-link #4 from { 5 } by simp
maximal-degree-of-support: 1
This node encodes a deductive argument.
7 (G ^x5 @y6)    supposition: { (F ^x5) }
inferred by support-link #5 from { 5 } by simp
maximal-degree-of-support: 1
This node encodes a deductive argument.

---

Retrieving #<Node 6> from the inference-queue.
8 (∃y)((F y) & (G @y6 y))    supposition: { (F ^x5) }
Inferred by support-link #6 from { 2, 6 } by modus-ponens2
maximal-degree-of-support: 1
This node encodes a deductive argument.

---

Retrieving #<Node 7> from the inference-queue.

---

Retrieving #<Node 8> from the inference-queue.
9 ((F @y7) & (G @y6 @y7))    supposition: { (F ^x5) }
Inferred by support-link #7 from { 8 } by EI
maximal-degree-of-support: 1
This node encodes a deductive argument.

---

Retrieving #<Interest 3: (∃y)(∃z)((G ^x5 y) & (G y z)) supposing { (F ^x5) }> from the inference-queue.
    # 4
        interest: (∃z)((G ^x5 ^@y8) & (G ^@y8 z))    supposition: { (F ^x5) }
        For interest 3 by EG

---

Retrieving #<Interest 4: (∃z)((G ^x5 ^@y8) & (G ^@y8 z)) supposing { (F ^x5) }> from the inference-queue.
    # 5
        interest: ((G ^x5 ^@y8) & (G ^@y8 ^@y9))    supposition: { (F ^x5) }
        For interest 4 by EG

---

Retrieving #<Interest 5: ((G ^x5 ^@y8) & (G ^@y8 ^@y9)) supposing { (F ^x5) }> from the inference-queue.
    # 6 interest: (G ^@y8 ^@y9)   supposition: { (F ^x5) }
For interest 5 by adjunction
Conclusion #7 discharges interest #6
7
 interest: (G ^x5 ^@y8)   supposition: { (F ^x5) }
 For interest 5 by adjunction using conclusion 7
 Conclusion #7 discharges interest #7

---

Retrieving #<Interest 7: (G ^x5 ^@y8) supposing { (F ^x5) }> from the inference-queue.

---

Retrieving #<Interest 6: (G ^@y8 ^@y9) supposing { (F ^x5) }> from the inference-queue.

---

Retrieving #<Node 9> from the inference-queue.
10 (F @y7)   supposition: { (F ^x5) }
Inferred by support-link #8 from { 9 } by simp
maximal-degree-of-support: 1
This node encodes a deductive argument.
11 (G @y6 @y7)   supposition: { (F ^x5) }
Inferred by support-link #9 from { 9 } by simp
maximal-degree-of-support: 1
This nodes encodes a deductive argument.
12 ((G ^x5 @y6) & (G @y6 @y7))   supposition: { (F ^x5) }
Inferred by support-link #10 from { 11, 7 } by adjunction
maximal-degree-of-support: 1
This node encodes a deductive argument.
This node discharges interest 5
13 (∃z)((G ^x5 @y6) & (G @y6 z))   supposition: { (F ^x5) }
Inferred by support-link #11 from { 12 } by EG
maximal-degree-of-support: 1
This node encodes a deductive argument.
This node discharges interest 4
14 (∃y)(∃z)((G ^x5 y) & (G y z))   supposition: { (F ^x5) }
Inferred by support-link #12 from { 13 } by EG
maximal-degree-of-support: 1
This node encodes a deductive argument.
This node discharges interest 3
15 ((F ^x5) → (∃y)(∃z)((G ^x5 y) & (G y z)))
Inferred by support-link #13 from { 14 } by conditionalization
maximal-degree-of-support: 1
This node encodes a deductive argument.
This node discharges interest 2
16 (∀x)((F x) → (∃y)(∃z)((G x y) & (G y z)))
Inferred by support-link #14 from { 15 } by UG
maximal-degree-of-support: 1
This node encodes a deductive argument.
This node discharges interest 1

---

<Node 16> answers #<Query #1: (∀x)((F x) → (∃y)(∃z)((G x y) & G y z)))>

---

ALL QUERIES HAVE BEEN ANSWERED DEDUCTIVELY.
=========== ULTIMATE EPISTEMIC INTERESTS ===========
Interest in (∀x)((F x) → (∃y)(∃z)((G x y) & (G y z)))
is answered affirmatively by conclusion 16

---

ARGUMENT #1
This is a deductive argument for:
 (∀x)((F x) → (∃y)(∃z)((G x y) & (G y z)))
which is of ultimate interest.
1. (∀x)((F x) → (∃y)((F y) & (G x y)))   given
2. ((F x0) → (∃y)((F y) & (G x0 y)))   UI from { 1 }
 |----------------------------------
 | Suppose: { (F ^x5) }
 |----------------------------------
 | 3. (F ^x5)   supposition
 | 4. (∃y)((F y) & (G ^x5 y))   modus-ponens2 from { 2, 3 }
 | 5. ((F @y6) & (G ^x5 @y6))   EI from { 4 }
 | 7. (G ^x5 @y6)   simp from { 5 }
 | 6. (F @y6)   simp from { 5 }
 | 8. (∃y)((F y) & (G @y6 y))   modus-ponens2 from { 2, 6 }
 | 9. ((F @y7) & (G @y6 @y7))   adjunction from { 8 }
 | 11. (G @y6 @y7)   simp from { 9 }
 | 12. ((G ^x5 @y6) & (G @y6 @y7))   adjunction from { 11, 7 }
 | 13. (∃z)((G ^x5 @y6) & (G @y6 z))   EG from { 12 }
 | 14. (∃y)(∃z)((G ^x5 y) & (G y z))   EG from { 13 }
15. ((F ^x5) → (∃y)(∃z)((G ^x5 y) & (G y z)))   conditionalization from { 14 }
16. (∀x)((F x) → (∃y)(∃z)((G x y) & (G y z)))   UG from { 15 }

---

If we attempt to do this same problem without using the EI discount, we get infinite
cycling (of length 4) beginning with conclusion 9.
Given premises:

(∀x)((F x) → (∃y)((F y) & (G x y)))  justification = 1
Ultimate epistemic interests:
  (∀x)((F x) → (∃y)(∃z)((G x y) & (G y z)))  interest = 1
1 (∀x)((F x) → (∃y)((F y) & (G x y)))
given
maximal-degree-of-support: 1

---

Retrieving #<Node 1> from the inference-queue.
2 ((F x0) → (∃y)((F y) & (G x0 y)))
inferred by support-link #1 from { 1 } by UI
maximal-degree-of-support: 1
This node encodes a deductive argument.

---

Retrieving #<Node 2> from the inference-queue.

---

Retrieving #<Query #1: (∀x)((F x) → (∃y)(∃z)((G x y) & (G y z)))> from the inference-queue.
            # 1
               interest: (∀x)((F x) → (∃y)(∃z)((G x y) & (G y z)))
               This is of ultimate interest
            # 2
               interest: ((F ^x5) → (∃y)(∃z)((G ^x5 y) & (G y z)))
               For interest 1 by UG

---

Retrieving #<Interest 2: ((F ^x5) → (∃z)(∃z)((G ^x5 y) & (G y z))) supposing { }> from the inference-queue.
3 (F ^x5)   suposition: { (F ^x5) }
supposition
maximal-degree-of-support: 1
            #3
               interest: (∃y)(∃z)((G^x5 y) & (G y z))   supposition: { (F ^x5) }
               For interest 2 by condionalization

---

Retrieving #<Node 3> from the inference-queue.
4 (∃y)((F y) & (G ^x5 y))   supposition: { (F ^x5) }
Inferred by support-link #2 from { 2, 3 } by modus-ponens2
maximal-degree-of-support: 1
This node encodes a deductive argument.

---

Retrieving #<Node 4> from the inference-queue.
5 ((F @y6) & (G ^x5 @y6)))   supposition: { (F ^x5) }
Inferred by support-link #3 from { 4 } by EI
maximal-degree-of-support: 1
This node encodes a deductive argument.

---

Retrieving #<Node 5> from the inference-queue.
6 (F @y6)   supposition: { (F ^x5) }
Inferred by support-link #4 from { 5 } by simp
maximal-degree-of-support: 1
This node encodes a deductive argument.
7 (G ^x5 @y6)   supposition: { (F ^x5) }
Inferred by support-link #5 from { 5 } by simp
maximal-degree-of-support: 1
This node encodes a deductive argument.

---

Retrieving #<Node 6> from the inference-queue.
8 (∃y)((F y) & (G@y6 y))   supposition: { (F ^x5) }
Inferred by support-link #6 from { 2, 6 } by modus-ponens2
maximal-degree-of-support: 1
This node encodes a deductive argument.

---

Retrieving #<Node 7> from the inference-queue.

---

Retrieving #<Node 8> from the inference-queue.
9 ((F @y7) & (G @y6 @y7))   supposition: { (F ^x5) }
Inferred by support-link #7 from { 8 } by EI
maximal-degree-of-support: 1
This node encodes a deductive argument.

---

Retrieving #<Node 9> from the inference-queue.
10 (F @y7)   supposition: { (F ^x5) }
Inferred by support-link #8 from { 9 } by simp
maximal-degree-of-support: 1
This node encodes a deductive argument.
11 (G @y6 @y7)   supposition: { (F ^x5) }
Inferred by support-link #9 from { 9 } by simp
maximal-degree-of-support: 1
This node encodes a deductive argument.

---

Retrieving #<Node 10> from the inference-queue.
12 (∃y)((F y) & (G @y7 y))   supposition: { (F ^x5) }
Inferred by support-link #10 from { 2, 10 } by modus-ponens2

-continued

```
maximal-degree-of-support: 1
This node encodes a deductive argument.
-----------------------------------------------------------
Retrieving #<Node 11> from the inference-queue.
-----------------------------------------------------------
Retrieving #<Node 12> from the inference-queue.
# 13 ((F @y8) & (G @y7 @y8))   supposition: { (F ^x5) }
Inferred by support-link #11 from { 12 } by EI
maximal-degree-of support: 1
This node encodes a deductive argument.
-----------------------------------------------------------
Retrieving #<Node 13> from the inference-queue.
# 14 (F @y8)   supposition: { (F ^x5) }
Inferred by support-link #12 from { 13 } by simp
maximal-degree-of-support: 1
This node encodes a deductive argument.
# 15 (G @y7 @y8)   supposition: { (F ^x5) }
Inferred by support-link #13 from { 13 } by simp
maximal-degree-of-support: 1
This node encodes a deductive argument.
-----------------------------------------------------------
Retrieving #<Node 14> from the inference-queue.
# 16 (∃y)((F y) & (G @y8 y))   supposition: { (F ^x5) }
Inferred by support-link #14 from { 2, 14 } by modus-ponens2
maximal-degree-of-support: 1
This node encodes a deductive argument.
-----------------------------------------------------------
Retrieving #<Node 15> from the inference-queue.
-----------------------------------------------------------
Retrieving #<Node 16> from the inference-queue.
# 17 ((F @y9) & (G @y8 @y9))   supposition: { (F ^x5) }
Inferred by support-link #15 from { 16 } by EI
maximal-degree-of-support: 1
This node encodes a deductive argument.
-----------------------------------------------------------
```

All of this reasoning is legitimate, and might be required for another problem, so it cannot be blocked, but only delayed. That is the effect of lowering the priority.

A slot has been added to interests for discharge-condition. This is a condition that a conclusion must satisfy in order to discharge the interest. Its use here is in the rule UG.

UG sequent interest

If the interest-formula p of interest is a universal generalization:
  Let e-vars be the interest-variables of interest, let x be the variable bound by the initial universal quantifier, and let p* be the matrix of p (the formula immediately following the initial quantifier).
    If e-vars is empty, let fun be a new variable ^@y. Let term be fun. If e-vars is nonempty, let fun be a new skolem-function ^@y, and let term be constructed by appending fun to the front of the list of e-vars.
    Let p** be the result of substituting term for x in p*.
    Let ug-condition be the condition (applied to variables node and unifier) that fun does not occur in the result of applying the first member of unifier to the node-supposition of node.
    Where sup is the interest-supposition of interest, adopt interest in <sup,p**> with target-interest interest, and let the discharge-condition of the new interest be ug-condition.

The ug-condition implements the standard constraint on the use of UG requiring that in order to infer (∀x)(F x)/Y from (F z)/Y, z must not occur in Y.

Planning

In carrying out the method of the invention, plans are conceived as graphs (sets of plan-nodes), where plan-nodes are data structures encoding the links in the graph and the condition/operator structure of the plan steps. This is done as follows:

A plan-node is a data structure having slots for the following:

Call sets. This is a set of sets of plan-nodes. Successful "non-vacuous" execution (that is, execution in which the if-conditions are satisfied) of all the nodes in any one of these sets "calls" the current node. Different sets represent different paths to the current node. For example, in FIG. 20, the call-sets for node #3 will be {{node #1} {node #5}}, while the call-sets for node #4 will be {{node #2, node #3} {node #3, node #5}}. The difference reflects the difference between or-links and and-links.

If-condition. If this condition is satisfied at the time the node is called, then successful non-vacuous execution of the node requires that the node-operation be performed at a time beginning with a time at which the when-condition is satisfied. If this condition is not satisfied, the node is executed vacuously without anything being done.

When-condition. Performance of the operation is to begin at a time at which this condition is satisfied. It need not begin immediately upon the when-condition becoming satisfied, but it must begin while the when-condition is satisfied. The variable *call-time* is bound to the time a node is called.

Operation. This is the operation to be performed. Among the possibilities are nulop (the null operation, whose performance requires nothing) and bind-variable. I will refer to this operation as the operation prescribed by the node.

Subplan. This is a plan for how to perform the operation. Like any plan, it is a set of plan-nodes, and it may be empty.

Goals. It is convenient to keep track of which nodes of a plan aim at the "direct" satisfaction of goals without any further action on the part of the agent. This slot lists the goals (if any) that the present node aims to satisfy directly.

Plan-nodes can have multiple call-sets, because they can be called in more than one way, as is illustrated by the following example. If the empty-set is one call-set of a node, then the node is an initial-node. This means that it is one of the nodes with plan-execution begins, and need not be called by other nodes.

To illustrate this plan-representation scheme, consider the following informally expressed plan for riding the elevator to Jones' floor:

1. Position yourself in front of the elevator door.
2. Check the number of Jones' floor on the directory next to the elevator.
3. If the door is closed, push the button.
4. When the door is open, walk through it into the elevator.
5. If you fail, push the button and try again.
6. If you succeed, push the button for Jones' floor.
7. Ride the elevator to that floor.

Figure 20:
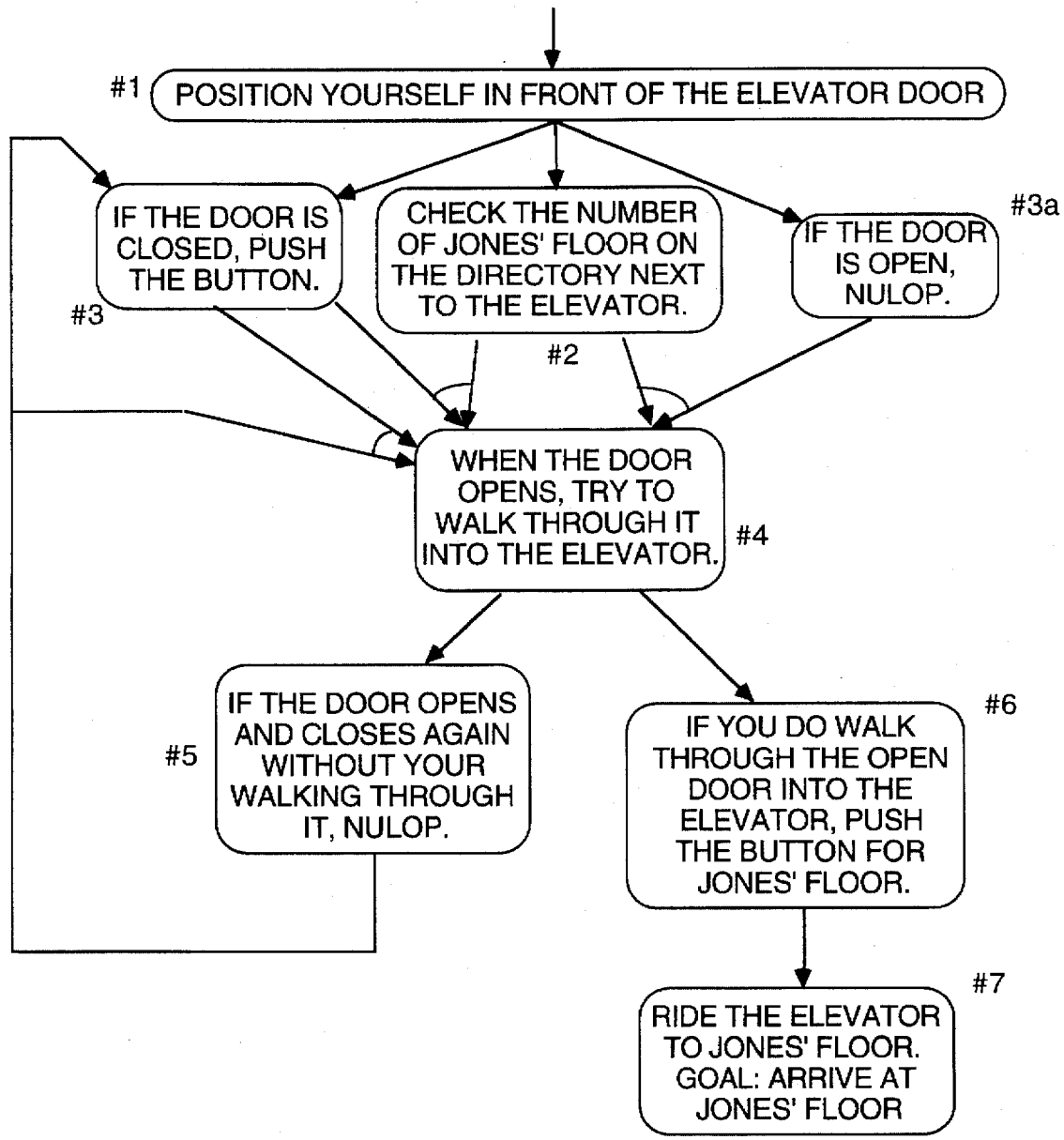
FIG. 20 is a generally diagrammatic view illustrating the elevator plan.

We can represent this plan more precisely as a graph of plan-nodes, diagrammed as in FIG. 20. Note the addition of node 3a to the diagram. This is required by the precise semantics that has now been provided for the if-condition. The if-condition plays two separate roles: (1) it determines whether the operation is to be performed, and (2) it directs the flow of execution through the plan. If the if-condition is not satisfied, then the node is executed vacuously, and its execution does not contribute to the calling of its immediate descendants. This has the consequence that if node #2 has been executed but the door is open when node #3 is called, then nodes #2 and #3 together will not call node #4. To get node #4 called under these circumstances, we must add node #3a.

Figure 21:
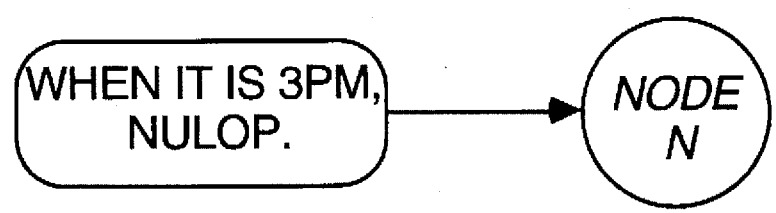
FIG. 21 is a generally diagrammatic view diagraming a timing link to a timing node.

Scheduling is made an integral part of planning. Scheduling constrains the times at which nodes are called (their call-times) with two mechanisms. First, it establishes additional scheduling links between nodes. The addition of such links imposes new constraints on the order in which nodes are executed. Scheduling links can occur between members of a single plan or members of different plans, and can link nodes of subsidiary plans and higher-level plans. Scheduling links between pre-existing nodes constrain the call times of nodes relative to each other. Scheduling can also fix call times absolutely, stipulating either that a node is to be called at a certain time, or when some particular event occurs. Such absolute scheduling can be achieved by the introducing timing nodes into a plan. These are nodes that are automatically "executed" at a certain time or when a certain event occurs (without the agent having to do anything). They can be represented in the planning formalism used by the method of the invention as nodes in which everything but the when-condition is vacuous: when P, nulop. We can then set the absolute call time of a node by taking the unit set of a timing node to be one of the call-sets of the given node. For example if we want node n to be called at 3 PM, we can construct a timing node m having the form when it is 3 PM, nulop. Then if we insert {m} into (call-sets n), this has the result that n is automatically called at 3 PM. This can be represented graphically as in FIG. 21.

The actual production of plans is not covered herein. In this regard, various methods are possible. Existing generative planners could be used as Q&I modules, or in accordance with the method of the invention, one could engage in explicit reasoning aimed at the production of plans. The following section pertains to the adoption of plans, however they are constructed.

The following is not represented in the LISP code contained in the appendix.

For two different reasons, practical reasoning is defeasible. First, practical decisions are based upon beliefs supplied by epistemic cognition. If those beliefs are retracted, the practical decisions based upon them must also be retracted. Second, the adoptability of a plan turns upon its being a better plan than any competitors that have been discovered. As new plans are constructed, previously adopted plans may cease to be adoptable.

In the practice of the method of the invention, comparisons between plans proceed in terms of an unspecified relation of rational preferability.

Plans are tied when they compete but neither is preferable to the other. Rather than deciding arbitrarily between tied plans, OSCAR stores them as a set of "disjunctively adoptable plans". This is analogous to having a disjunctive intention (the intention to do either A or B, without deciding which). Choices are only made between tied plans when execution begins.

A minimally good plan is any plan that is rationally preferable to the null plan (the empty set of plan-nodes).

In accordance with the method of the invention, plan adoption is based on the following set of defeasible principles:

(P1) "$\sigma$ is a minimally good plan" is a defeasible reason for adopting $\sigma$.

(P2) "$\alpha$ is justifiably believed to compete with $\sigma$ and $\sigma$ is not justifiably believed to be preferable to $\alpha$" is a defeater for (P1).

(P3) "$\alpha_1, \ldots, \alpha_n$ are justifiably believed to compete pairwise, each is justifiably believed to be minimally good, and none is justifiably believed to be preferable to another" is a prima facie reason for disjunctively adopting $\{\alpha_1, \ldots, \alpha_n\}$.

(P4) "$\alpha$ is justifiably believed to compete with each of $\alpha_1, \ldots, \alpha_n$ and no $\alpha_i$ is justifiably believed to be preferable to $\alpha$" is a defeater for (P3).

However, in constructing a system of defeasible plan adoption, it is insufficient to just state the defeasible reasons and defeaters for practical reasoning. We must also describe the structure of the reasoning itself. This is no simple task. Witness how complex defeasible epistemic reasoning is. Defeasible practical reasoning promises to be equally complex. Rather than constructing an entire inference engine for defeasible practical reasoning, the method of the invention makes do with a single module dedicated to epistemic reasoning and integrates practical reasoning into that module using a technical trick. The trick involves "doxastifying" normative judgments. Corresponding to the adoption of a plan is the "epistemic judgment" (i.e., belief) that it should be an adopted plan. This judgment is epistemic in name only. It requires no "objective fact" to anchor it or give it truth conditions. It is merely a computational device whose sole purpose is to allow us to use defeasible epistemic reasoning to accomplish defeasible practical reasoning. Let us abbreviate "$\sigma$ should be an adopted plan" (where this is a practical 'should'—not a moral 'should') as "$\sigma$ is adoptable". Similarly, let us say that a set of plans is disjunctively-adoptable if and only if it should be disjunctively adopted. A plan is adoptable if and only if its unit set is disjunctively-adoptable. The method of the present invention employs the following array of epistemic prima facie reasons and defeaters:

(E1) "$\sigma$ is a minimally good plan" is a defeasible reason for "$\sigma$ is adoptable".

(E2a) "$\alpha$ competes with $\sigma$ and $\alpha$ is minimally good" is a defeasible undercutting defeater for (E1).

(E2b) "σ is preferable to α" is a conclusive undercutting defeater for (E2a).

(E3) "$\alpha_1, \ldots, \alpha_n$ compete pairwise and each is minimally good" is a prima facie reason for "$\{\alpha_1, \ldots, \alpha_n\}$ is disjunctively-adoptable".

(E4a) "One of $\alpha_1, \ldots, \alpha_n$ referable to another" is a conclusive undercutting defeater for (E3).

(E4b) "α is minimally good and competes with each of $\alpha_1, \ldots, \alpha_n$" is a defeasible undercutting defeater for (E3).

(E4c) "some $\alpha_1$ is preferable to α" is a conclusive undercutting defeater for (E4b).

With this array of prima facie reasons and defeaters, the epistemic reasoner will conclude that a plan is adoptable if and only if a properly constructed defeasible practical reasoner would adopt the plan, and it will conclude that a set of plans is disjunctively-adoptable if and only if a properly constructed defeasible practical reasoner would disjunctively adopt the set of plans. To illustrate, suppose we have a prima facie reason of the form (P1) for adopting σ, but we also have a defeater of the form (P2). Then we will have a prima facie reason of the form (E1) for concluding that σ is adoptable, and a defeater of the form (E2a) for this prima facie reason, and we will lack a defeater defeater of the form (E2b). The upshot of this is that the same practical reasoning can be accomplished by coupling the defeasible epistemic reasoner with a much simpler practical reasoner that adopts or retracts plans on the basis of epistemic judgments to the effect that they are or are not adoptable.

In order to make proper use of plan-adoptability beliefs in practical reasoning, the rest of the system of practical cognition must be doxastified as well. The trick to achieving this consists of making use of the full structure of ultimate-epistemic-interests. First, there will be a list of permanent-ultimate-epistemic-interests that are in ultimate-epistemic-interests from the start, without having to be placed there by practical cognition. Second, recall that an ultimate epistemic interest encodes a query, together with a degree of interest and an instruction for what to do with an answer. The latter instruction can be of any kind. In particular, it can tell the reasoner to insert another query into ultimate-epistemic-interests. With these observations, suppose we supply epistemic cognition with the following permanent-ultimate-epistemic-interests and supplement (E1)–(E4c) with the following prima facie reasons and defeaters:

permanent-ultimate-epistemic-interests:

(U1) Find a w such that w is an suitable goal.
When the belief that w is an suitable goal is produced:
insert "Find an x such that x is a minimally good plan for achieving w" into ultimate-epistemic-interests.

(U2) Find an x such that x is an adoptable plan.
When this belief is acquired:
insert "Find a y such that y is a plan for achieving the same goals as x and y is rationally preferable to x" into ultimate-epistemic-interests.

(U3) Find an x such that x is a disjunctively-adoptable plan-set.
When the belief that x is a disjunctively-adoptable plan-set is produced, for each initial node z of a member of x:
insert "z's if-condition was satisfied when z was first called, and its when-condition is satisfied but soon to become unsatisfiable" into ultimate-epistemic-interests.
When this belief is acquired, choose some x in y at random, and have introspection supply the belief that x was randomly chosen for adoption.

forwards directed prima facie reasons:

(E5) Desiring w is a prima facie reason for believing "w is an suitable goal".

(E6) "x is an adoptable plan and w is a situation-type consisting of executing a non-basic node of x if it is called" is a prima facie reason for "w is an suitable goal". (A non-basic node is one whose operation is not a basic act; a basic act is an act that can be performed directly.)

forwards directed conclusive reasons:

(E7) "w is a situation-type having positive relative expected situation-liking" is a conclusive reason for "w is an suitable goal".

(E8) "y is a disjunctively-adoptable plan-set, and x was chosen randomly from the members of y" is a conclusive reason for "x is an adoptable plan".

backwards directed conclusive reasons:

(E9) "x is a situation-type having a non-positive relative expected situation-liking" is a conclusive reason for "x is not an suitable goal".

(E10) "x is a situation-type having a non-positive relative expected situation-liking" is a conclusive undercutting defeater for (E5).

Figure 22:
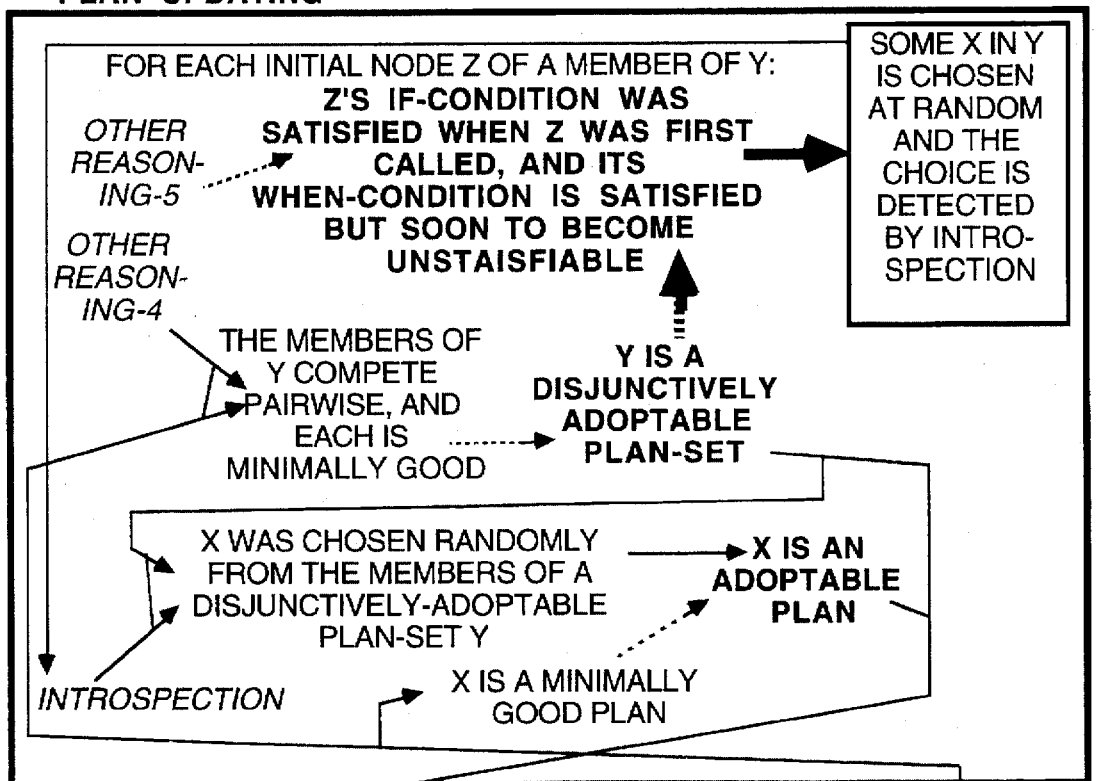
FIG. 22 is a generally diagrammatic view illustrating the flow of data in the doxastic implementation of the planning architecture of the invention.
Figure 22:
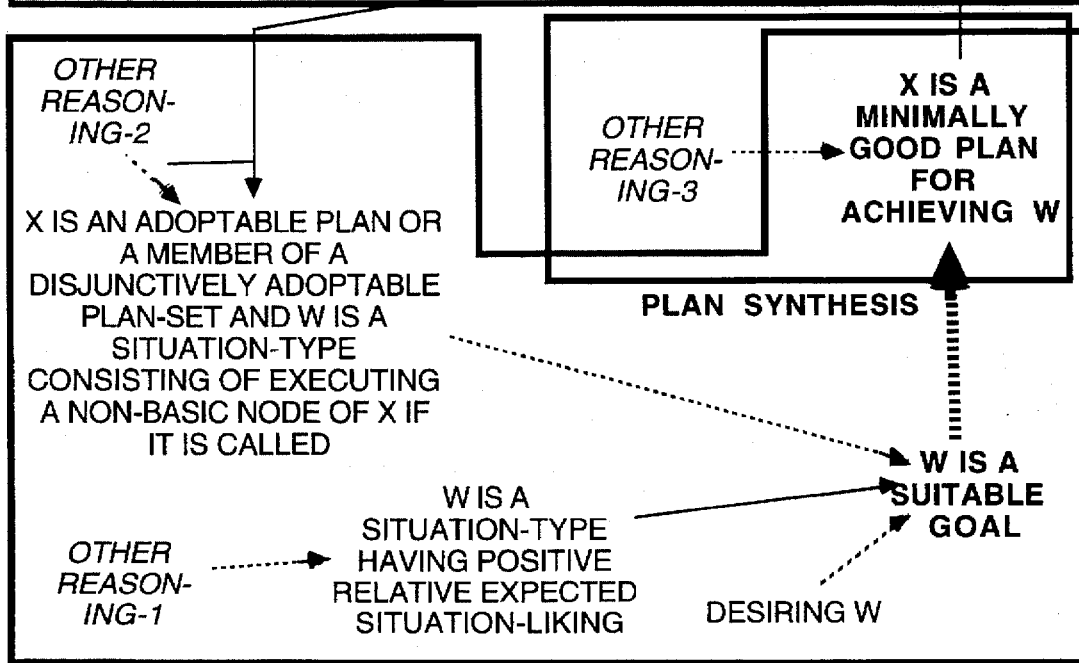

These will combine to give us the reasoning diagramed in FIG. 22. The arrows of the form '➞' signify that finding an instance of one member of ultimate-epistemic-interests leads to the insertion of a new query.

It should be noted that no particular way of reasoning about indefinite queries (those of the form "find an x") is presupposed here. That can be done however the user wants by providing the reasoner with appropriate inference-rules.

To see how this works, let us step through the operation of a reasoner supplied with these permanent-ultimate-epistemic-interests and reasons, as diagramed in FIG. 22. The reasoner begins with a permanent interest in finding suitable goals. 'suitable goal' is now treated as an undefined placeholder, just like 'adoptable plan' or 'disjunctively-adoptable plan-set'. It is a paraphrase of 'goal that should (from a practical point of view) be adopted'. The reasoner has three ways of finding suitable goals. If optative dispositions produce the desire for w, by (E5), this constitutes a prima facie reason for concluding that w is an suitable goal. This automatically queries epistemic cognition about whether w is a situation-type having positive relative expected situation-liking, because the defeasible epistemic reasoner always adopts interest in defeaters for its inferences, and (E10) formulates a defeater for (E5). (E7) formulates the "direct epistemic reason" for adopting goals. (E6) will be considered in the paragraphs that follow.

Once the reasoner concludes that w is an suitable goal, in accordance with (U1), it sends an interest in finding minimally good plans for achieving w to ultimate-epistemic-interests. This leads to the epistemic reasoning that constitutes plan synthesis. The reasoning leading to the search for plans will be prioritized by epistemic cognition according to the degree of interest attached to finding the plan, and that will be determined by the importance of the goal.

When the reasoner draws the conclusion that a plan is minimally good, this leads, via (E1) or (E3), to the conclusion that it is adoptable or a member of a disjunctively-adoptable plan-set. In the latter case, in accordance with (U3), a query is sent to ultimate-epistemic-interests leading the reasoner to attend to the conditions under which a choice must be made between the members of the plan-set. When the reasoner concludes that a choice must be made, that is done and the information that it was done is supplied via introspection (still in accordance with (U3)) and constitutes a reason (by (E8)) for concluding that the randomly selected plan is adoptable.

When it is concluded that a plan is adoptable, (E6) provides a reason for thinking that executing its nodes if they are called constitutes an suitable goal. This corresponds to the production of instrumental desires.

The PLAN-EXECUTOR is the module that executes plans. It will proceed roughly as follows:

(1) Call initial nodes, and execute them.
(2) Recursively execute nodes called by nodes that have already been executed.

Several complications must be addressed. First, the epistemic reasoning presupposed by plan execution is defeasible, and the PLAN-EXECUTOR must accommodate that. The way to do that is, once more, through the doxastification of practical reasoning. As in the PLANNER, doxastification will allow the bulk of the reasoning involved in plan execution to be done by epistemic cognition. Second, having adopted a plan and begun its execution, a rational agent does not proceed blindly come-what-may. A rational agent monitors the course of plan execution. If things do not go as anticipated, the execution of the plan may be aborted. This monitoring consists of keeping a continual check on whether the part of the plan remaining to be executed (the tail of the plan) is, under the present circumstances, an adoptable plan in its own right. The computational module that does this will be called the TAIL-MONITOR. As long as the TAIL-MONITOR does not abort plan execution, the PLAN-EXECUTOR will proceed recursively to execute nodes as they are called. A common phenomenon will be that the tail of the plan is modified by further scheduling as plan execution proceeds. Typically, as we see how the execution of a complex plan develops and what is true of our current situation, we will acquire reasons for scheduling the remaining nodes more precisely than we did before plan execution began. This has the effect, via the TAIL-MONITOR, of replacing the tail of the plan by a modification of it that involves further scheduling, adopting that modification, and then beginning its execution. Of course, it too may be modified as execution progresses.

Figure 23:
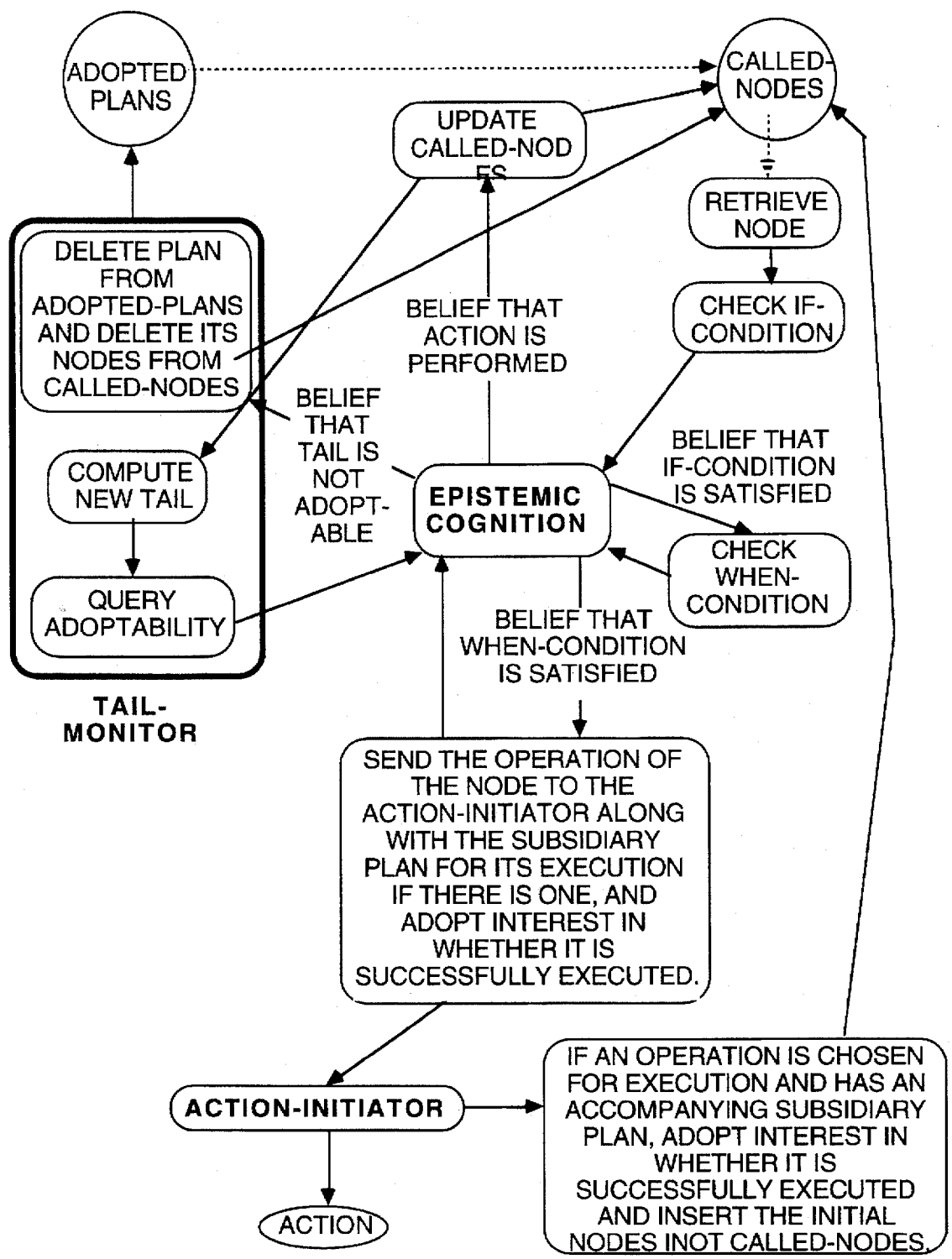
FIG. 23 is a generally diagrammatic view showing the flow of data in the plan-executor of the invention.

Schematically, the PLAN-MONITOR can be regarded, as in FIG. 23, as consisting of a loop. The loop begins by retrieving a node from a list of called-nodes (originally the initial-nodes of top-level adopted plans). It checks to see whether the if-conditions are satisfied. It does this by passing that question to epistemic cognition. If it is determined that the if-condition is not satisfied, execution of that node terminates. If it is determined that the if-condition is satisfied, the PLAN-EXECUTOR instructs epistemic cognition to become interested (and remain interested) in whether the when-condition is satisfied. If at some point epistemic cognition produces the belief that the when-condition is satisfied, it passes this information back to the PLAN-EXECUTOR. The PLAN-EXECUTOR then passes the operation of the node to the ACTION-INITIATOR, along with the subsidiary plan for its execution if there is one. The ACTION-INITIATOR will be discussed further in the paragraphs that follow. Among other things, it resolves last-minute scheduling questions. When it chooses an operation for execution, it checks to see whether it is accompanied by an execution plan. If not, the operation is assumed to be a basic act, for the performance of which the agent has hardwired routines. Those routines are then executed mechanically. If instead there is an execution plan, its initial nodes are inserted into the list of called-nodes, and its execution begins. If a time comes when the TAIL-MONITOR decides the plan is no longer adoptable even if a subsidiary plan is adopted, then execution will be aborted. The ACTION-INITIATOR must monitor the execution of an operation to ensure that it is successful. It does this by querying epistemic cognition. If epistemic cognition concludes that the operation was successfully executed, the PLAN-EXECUTOR concludes that the node was executed, and updates the list of called-nodes and inserts the new tails that begin with each newly called node into the set of adopted-plans. Then the whole routine begins again.

Running in parallel with this is the TAIL-MONITOR. As soon as a node is called, the TAIL-MONITOR instructs epistemic cognition to be continually interested in whether the tail of the plan is adoptable. If at any point epistemic cognition concludes that it is not, the TAIL-MONITOR aborts the plan execution. The epistemic conclusion that the tail is not adoptable may be accompanied by another epistemic conclusion to the effect that a modification of it is adoptable, and then the PLAN-EXECUTOR will automatically begin executing the modification just as it executes other adopted plans.

It would be straightforward to write a program to perform these operations mechanically, but that would not accommodate the defeasibility of the agent's access to whether if- and when-conditions are satisfied, operations have been successfully executed, etc. If the agent's beliefs about these matters change, this must alter the course of plan execution. It seems that the best way to handle this is by doxastifying plan execution. In other words, implement the PLAN-EXECUTOR in terms of epistemic reasoning. This can be done by making one addition to the permanent-ultimate-epistemic-interests, and adding the following reason schemas:

permanent-ultimate-epistemic-interests:

(U2*) Find an x such that x is an adoptable plan.
When the belief that x is an adoptable plan is acquired: insert "Find a y such that y is a plan for achieving the same goals as x and y is rationally preferable to x" into ultimate-epistemic-interests;
for each initial node z of x: insert "z is executable" into ultimate-epistemic-interests.

(U4) Find a v such that v is an executable operation.
When the belief that v is an executable operation is acquired, send v to the ACTION-INITIATOR. (The ACTION-INITIATOR will insert "v has been executed" into ultimate-epistemic-interests when it tries to execute v.)

forwards directed prima facie reasons:

(E11) "x is the tail of y with respect to z and z was an executable node and z has been executed" is a prima facie reason for "x is an adoptable plan".

(E12) ⌈z is an executable plan-node of expected-value δ, and x is the (nonempty) subsidiary plan of z⌉ is a prima facie reason for ⌈x is an adoptable plan⌉.

forwards directed conclusive reasons:

(E12) "y is the subsidiary plan for z, and z is an executable node, and y has been fully executed" is a conclusive reason for "node z has been executed ".

(E13) "Node z was executable, v is the operation prescribed by node z, and v was executed during the time z was executable" is a conclusive reason for "z was executed".

(E14) "x is an adoptable plan and z is an initial node of x" is a conclusive reason for "z is called".

(E15) "x was an executable node of plan y and x has been executed" is a conclusive reason for "x is no longer executable ".

backwards directed conclusive reasons:

(E16) "z is called, its if-condition was satisfied when it was first called, and its when-condition is satisfied" is a conclusive reason for "z is an executable plan-node".

(E17) "v is the operation prescribed by an executable plan-node z of expected-value δ" is a conclusive reason for "v is an executable operation of strength δ".

(E18) "x is not prescribed by any executable plan-node of expected-value δ" is a conclusive reason for "x is not an executable operation of strength δ".

Figure 24:
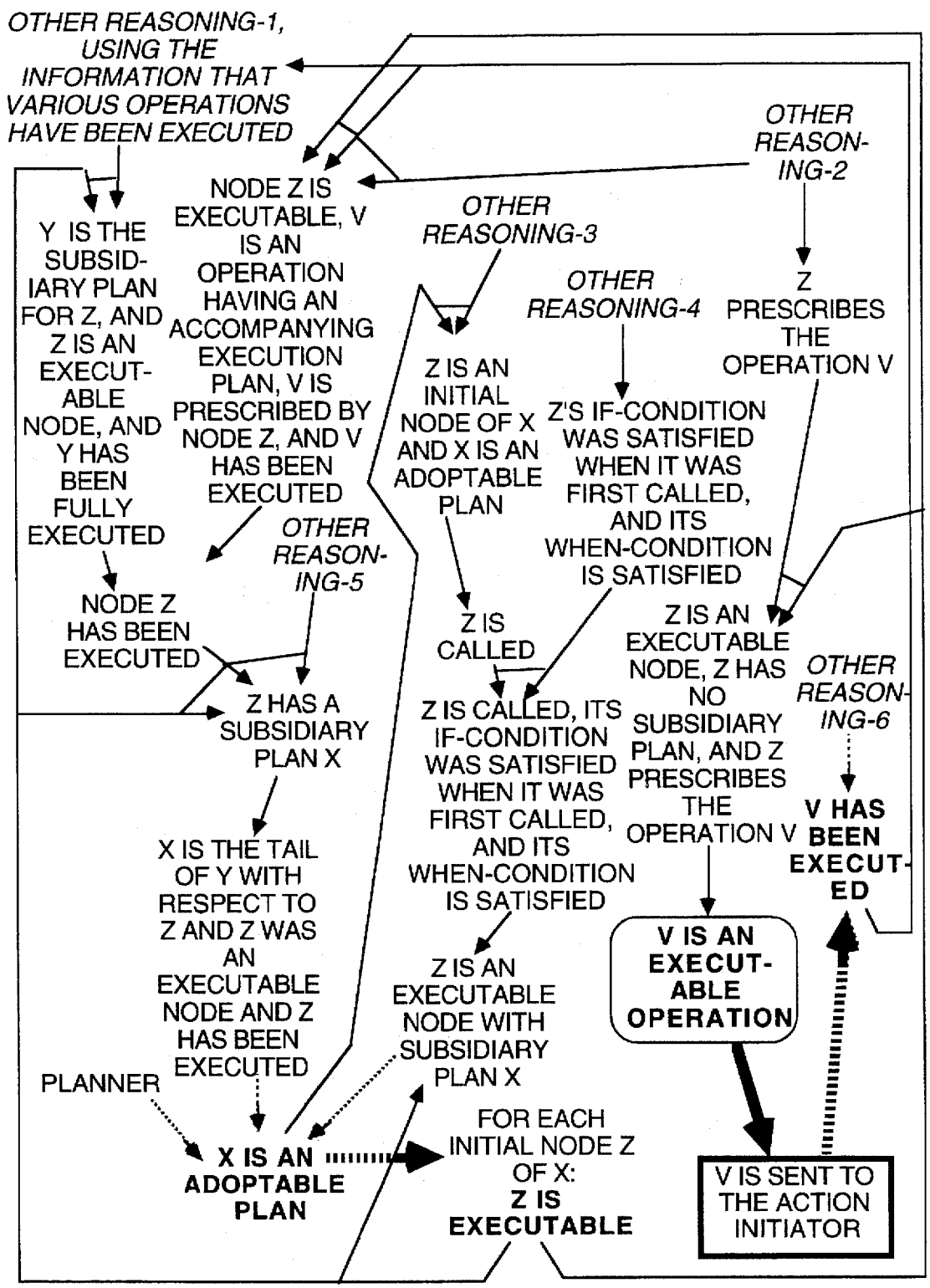
FIG. 24 is a generally diagrammatic view showing the flow of data in the doxastic implementation of the plan execution architecture of the invention.

These combine to yield the reasoning diagramed in FIG. 24. This constitutes a doxastic implementation of the plan execution architecture diagramed in FIG. 22. To verify this, let us step through the operation of a reasoner supplied with these permanent-ultimate-epistemic-interests and reason schemas. We begin with beliefs of the form "x is adoptable", supplied by the planning architecture just described. The pursuit of such beliefs was already among the permanent-ultimate-epistemic-interests, but (U2*) adds an instruction to the effect that whenever such a belief is acquired, queries about whether the initial nodes of x are executable should be inserted into ultimate-epistemic-interests. These queries are answered in terms of (E16) and (E17). If the reasoner concludes that an initial node z is executable, and it also concludes that z prescribes an operation v, then it concludes, by (E18), that v is an executable operation, and by (U4), it sends v to the ACTION-INITIATOR and that initiates interest in whether v has been executed. Information to the effect that various operations have been executed is used to conclude that nodes prescribing them have been executed (by (E13)) and that plans have been fully executed. When it is concluded that an initial node z has been executed, it is inferred by (E11) that the tail of x with respect to z is an adoptable plan, and the loop begins again. Thus we have a doxastic implementation of the PLAN-EXECUTOR.

In "doxastic" architecture for practical reasoning that is part of the method of the present invention, action initiation begins with a permanent-ultimate-epistemic-interest in finding executable plan-nodes. When reasoning reasoning in accordance with the method of the invention produces a belief that a certain node is executable and has no subsidiary-plan, the positive-query-instruction for the query initiating the search is executed. That query-instruction inserts a pair <A,δ> into the list of executable-operations. A is the term designating the operation, taken from the formula expressing the belief that the plan-node is executable. This term will have the form of a list whose first member is an operation type and the remaining members are parameters determining the specific character of the operation to be executed. For example, the operation might be of the type move-your-index-finger, and the parameters would specify a direction and distance. δ is a real number encoding the strength of the desire to perform the operation. A is assumed to be a basic action and it is executed by executing built-in subroutines. INITIATE-ACTIONS then operates on the list executable-acts. It chooses a maximally desired act, and tries to perform it:

INITIATE-ACTIONS

Let <A,δ> be the first member of executable-operations such that δ is greater than or equal to any γ such that for some b,<B,γ> is a member of executable-operations:

Delete <A,δ> from the list of executable-acts.

Try to perform the operation designated by A.

Query epistemic cognition about whether A was successfully executed. Let the strength of the query be δ, the query-formula be "A was not executed when the agent tried to execute it", the positive-query-instruction be to reinsert <A,δ> into the list of executable-operations, and the negative-query-instruction be to delete <A,δ> from the list of executable-operations.

Trying to perform an executable act A relative to the null plan consists of performing some built-in routines that activate extensors. This will be implemented using a list act-executors consisting of pairs <act-type, routine>. TRY-TO-PERFORM searches act-executors for a pair <act-type, routine> such that act-type matches the first member of A, and then it applies the function routine to the remaining members of A.

It is compatible with this architecture that pairs <A,δ> are inserted into the list of executable-operations in other ways as well. In particular, an agent may have built-in or conditioned reflexes that accomplish the same thing more quickly than planning in special cases.

Conclusions, Ramifications, and Scope of the Invention

Thus the reader can see that in accordance with the method of the present invention, sophisticated reasoning and decision-making can be performed and harnessed for use in multitudes of applications. Obvious examples are robot control, control of manufacturing processes, and automated medical diagnosis.

While the aforegoing description, and the accompanying computer code, contain many detailed specifications, these should not be construed as limitations on the scope of the invention, but rather as an exemplification of one preferred embodiment thereof. Obviously, many modifications and variations of the present invention are possible in light of the foregoing teachings. It is therefore to be understood that, within the scope of the appended claims, the invention may be practiced otherwise than as specifically described.

What is claimed is:

1. A computer implemented method for defeasible reasoning, comprising the steps of:
   (a) generating a list of conclusions by monotonic reasoning and recording said conclusions in a selected one of a simple inference-graph and an and/or inference-graph each having nodes corresponding to said conclusions;
   (b) computing defeat-status for said nodes of said inference-graph, using a method comprising the steps of:
      (i) computing a list of status-assignments;
      (ii) computing the defeat-status of a selected node by one of the following:
         (A) a method for computing the defeat-status of a selected node wherein said inference-graph is an and/or inference-graph and said node is judged undefeated only if every status-assignment assigns a nonzero defeat-status to said node; and
         (B) a method for computing the defeat-status of a selected node wherein said inference-graph is an and/or inference-graph and said node is judged undefeated if said inference-graph contains nodes that constitute an argument for said node and all of said nodes in said argument are assigned an undefeated defeat-status by every status-assignment.

2. The method of claim 1, in which said monotonic reasoning proceeds by a method comprising the steps of:
   (a) selecting a set of sequents in a list input, and a set of sequents in a list ultimate-epistemic-interests;
   (b) categorizing said sequents in said list input as conclusions and inserting said sequents into an ordered list inference-queue,
   (c) categorizing said sequents in said list ultimate-epistemic-interests as interests and inserting said interests into said list inference-queue;
   (d) retrieving in order said conclusions and said interests of said list inference-queue;
   (e) for each said conclusion retrieved, performing forwards reasoning to produce new conclusions and storing said new conclusions in a data structure inference-graph and also placing said new conclusions on said list inference-queue;

(f) for each said interest retrieved performing, backwards reasoning to produce new interests and storing said new interests in a data structure interest-graph and also placing said new interests list on said list inference-queue;

(g) comparing each said new conclusion with said interests recorded in said interest-graph and discharging from said inference graph each said new conclusion that is the same as an interest recorded in said interest graph; and (h) comparing each said new interest with said conclusions recorded in the inference-graph, and discharging from said interest graph each said new interest that is the same as a conclusion recorded in said inference graph.

3. A method as defined in claim 2 comprising repeating indefinitely, steps (a) through (h) whereby the reasoning never terminates.

4. A method as defined in claim 2 comprising repeating steps (a) through (h) until said inference-graph is empty.

5. The method of claim 1, wherein one node of the inference-graph defeats a second node only if the maximal-degree-of-support of the first node is at least as great as the maximal degree-of-support of the second node.

6. The method of claim 1, wherein maximal-degrees of support for members of the inference-graph are computed in accordance with the weakest-link principle.

7. The method of claim 1, as exemplified by the operation make-inference-from-link, wherein a new conclusion is drawn in accordance with an interest-link only when the maximal-degree-of-support for said new conclusion is at least as great as the degree-of-interest of the link-interest for said interest-link.

8. The method of claim 1, as exemplified by the operation discharge-interest-in, wherein interest in a conclusion is discharged only when the maximal-degree-of-support for said conclusion is at least as great as the degree-of-interest for some interest that said conclusion discharges.

9. The method of claim 1, wherein undefeated-degrees-of support and degrees-of-interest are used in prioritizing the inference-queue.

10. The method of claim 1 wherein said list of conclusions is maintained and forward reasoning makes inference only from elements of that list, whereby the method avoids duplicating reasoning in connection with inference-rules and reason schemes having multiple premises.

11. The method of claim 1, wherein:

(a) conclusions and interests are stored in c-lists and i-lists;

(b) for each c-list, the list of corresponding-i-lists is maintained;

(c) for each i-list, the list of corresponding-c-lists is maintained; and (d) searches for appropriately related interests and inference-nodes are performed by searching the corresponding-c-lists of their i-lists and corresponding-i-lists of their c-lists, as exemplified by the operations discharge-interest-in, discharge-link, make-inference-from-link, and replicate-discharges, thereby avoiding replicating searches when matching or unifying conclusions and interests.

12. The method of claim 1, wherein interest-schemes are used to direct the portion of backward-reasoning that results from instantiating backward-reasoning by instantiating the conclusion of said reasons with an interest.

13. The method of claim 1, wherein interest-links are used to direct the portion of backward-reasoning that results from instantiating interest-schemes by instantiating the forward premises of said interest-schemes with conclusions.

14. The method of claim 1, as exemplified by the operation replicate-discharges, wherein the list of discharged-right-links for an interest is maintained, and searched when new conclusions are drawn, whereby the effect of interest-discharge is repeated when said new conclusions are drawn.

15. The method of claim 1, exemplified by the operations discharge-link and discharge-interest-in, wherein backward reasoning cancels interest in inference-nodes and interests that are no longer of use, whereby said inference-nodes and interests do not occupy the resources of the reasoning.

16. The method of claim 1, wherein the list of status assignments is computed by compute-assignments.

17. The method of claim 1, as exemplified by the operation compute-assignment-tree, wherein the list of status-assignments is computed by building the assignment-tree and taking said list of status-assignments to be the list of tree-assignments for all subtrees of said assignment-tree.

18. The method of claim 1, as exemplified by the operation update-assignment-tree, wherein the list of status-assignments is updated by recomputing only those parts of the assignment-tree containing inference/defeat-descendants of newly added support-links.

19. A computer-implemented method of directing plan adoption, comprising the use of defeasible reasons governing terms comprising suitable-goals, adoptable plans, and disjunctively-adoptable-plans, wherein said terms can be taken as place-holders irrespective of whether said terms are contentful expressions.

20. A computer-implemented method of directing plan-execution, comprising the use of defeasible reasoning relating terms comprising adoptable-plans, disjunctively-adoptable-plans, and executable-operations, where said terms can be taken as place-holders in the reasoning irrespective of whether said terms are contentful expressions.

21. A computer implemented method for defeasible reasoning, comprising the steps of:

(a) generating a list of conclusions by monotonic reasoning and recording said conclusions in a selected one of a simple inference-graph and an and/or inference graph each having nodes corresponding to said conclusions:

(b) computing defeat-statuses for said nodes of said inference-graph, using a method comprising the steps of:

(i) computing a list of status-assignments;

(ii) computing the defeat-status of a selected node by employing a method selected from the group consisting of:

(A) a method for computing the defeat-status of a selected node wherein said inference-graph is an and/or inference-graph and said node is judged undefeated only if every status-assignment assigns a nonzero defeat status to said node; and (B) a method for computing the defeat-status of a selected node wherein said inference-graph is an and/or inference-graph and said node is judged undefeated if said inference-graph contains nodes that constitute an argument for said node and all of said nodes in said argument are assigned an undefeated defeat-status by every status-assignment;

(c) through the use of monotonic reasoning, selecting a set of sequents in a list input, and a set of sequents in a list ultimate-epistemic-interests;

(d) categorizing said sequents in said list input as conclusions and inserting sequents into an ordered list inference-queue;

(e) categorizing said sequents in said list ultimate-epistemic-interests as interests and inserting said interests into said list inference-queue;

(f) retrieving in order said conclusions and said interests of said list inference-queue;

(g) for each said conclusion retrieved, performing forward reasoning to produce new conclusions and storing said new conclusions in a data structure inference-graph and also placing said new conclusions on said list inference-queue;

(h) for each said interest retrieved performing, backward reasoning to produce new interests and storing said new interests in a data structure interest-graph and also placing said new interests list on said list inference-queue;

(i) comparing each said new conclusion with said interests recorded in said interest-graph and discharging from said inference graph each said new conclusion that is the same as an interest recorded in said interest graph; and (j) comparing each said new interest with said conclusions recorded in the inference-graph, and discharging from said interest graph each said new interest that is the same as a conclusion recorded in said inference graph.

22. The method of claim 21, wherein one node of the inference-graph defeats a second node only if the maximal-degree-of-support of the first node is at least as great as the maximal degree-of-support of the second node.

23. The method of claim 22, wherein maximal-degrees of support for members of the inference-graph are computed in accordance with the weakest-link principle.

24. The method of claim 23, as exemplified by the operation make-inference-from-link, wherein a new conclusion is drawn in accordance with an interest-link only when the maximal-degree-of-support for said new conclusion is at least as great as the degree-of-interest of the link-interest for said interest-link.

25. The method of claim 24, as exemplified by the operation discharge-interest-in, wherein interest in a conclusion is discharged only when the maximal-degree-of-support for said conclusion is at least as great as the degree-of-interest for some interest that said conclusion discharges.

26. The method of claim 25, wherein interest-links are used to direct the portion of backward-reasoning that results from instantiating interest-schemes by instantiating the forwards premises of said interest-schemes with conclusions.

27. A computer-implemented method of directing plan adoption and plan-execution comprising the steps of:

(a) directing plan adoption using defeasible reasons governing terms comprising suitable-goals, adoptable plans, and disjunctively-adoptable-plans, wherein said terms can be taken as place-holders irrespective of whether said terms are contentful expressions; and (b) directing plan-execution using defeasible reasons relating adoptable-plans, disjunctively-adoptable-plans, and executable-operations, where said terms can be taken as place-holders in the reasoning irrespective of whether said terms are contentful expressions.

28. A computer implemented method for reasoning, comprising the steps of:

(a) using forward-inference rules EI and UI and backward-logical reasons EG and UG to skolemize interest-formulas and conclusion formulas;

(b) using unification to compute common instances of forwards-reasons and the node-formulas in inference-nodes, and using unification to compute conclusions to be inferred from said inference-nodes in accordance with said forwards-reasons;

(c) when a supposition is generated by an interest, the interest-variables of the interest are made the node-variables of the inference-node recording the supposition; and (d) discharging interests by unifying the node-formula of an inference-node and the interest-formula of an interest to produce a unifier, applying said unifier to their suppositions, and then unifying the resulting node-supposition into the resulting interest-supposition.

29. A computer implemented method for reasoning, comprising the steps of:

(a) using procedure adopt-reductio-interest to create reductio-interests having schematic supposition; and (b) using procedures discharge reductios and discharge-retrospective-reductios to discharge reductio-interests having schematic suppositions.

* * * * *